United States Patent
Shanbhogue et al.

(10) Patent No.: US 11,743,240 B2
(45) Date of Patent: Aug. 29, 2023

(54) SECURE STREAM PROTOCOL FOR SERIAL INTERCONNECT

(71) Applicant: Intel Corporation, Santa Clara, CA (US)

(72) Inventors: Vedvyas Shanbhogue, Austin, TX (US); Siddhartha Chhabra, Portland, OR (US); David J. Harriman, Portland, OR (US); Raghunandan Makaram, Northborough, MA (US); Ioannis T. Schoinas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 16/445,019

(22) Filed: Jun. 18, 2019

(65) Prior Publication Data

US 2019/0306134 A1    Oct. 3, 2019

Related U.S. Application Data

(60) Provisional application No. 62/815,554, filed on Mar. 8, 2019.

(51) Int. Cl.
*H04L 9/40* (2022.01)
*G06F 21/60* (2013.01)
(Continued)

(52) U.S. Cl.
CPC ...... *H04L 63/0457* (2013.01); *G06F 13/4282* (2013.01); *G06F 21/606* (2013.01);
(Continued)

(58) Field of Classification Search
CPC ............. H04L 63/0457; H04L 63/0464; H04L 9/3242; H04L 63/04; G06F 13/4282;
(Continued)

(56) References Cited

U.S. PATENT DOCUMENTS 8,064,600 B2 * 11/2011 Bates .................... H04L 9/0869
                                                   380/255
9,363,684 B2 *  6/2016 Gustafsson ............. H04L 69/40
(Continued)

FOREIGN PATENT DOCUMENTS

| CN | 101640629 B | * | 8/2012 |
| JP | 2007300370 A | * | 11/2007 |
| JP | 2012010254 A | * | 1/2012 |

OTHER PUBLICATIONS

EPO; Extended European Search Report issued in EP Patent Application No. 20154933.4, dated Jul. 31, 2020; 9 pages.
(Continued)

*Primary Examiner* — Shin-Hon (Eric) Chen
*Assistant Examiner* — Ethan V Vo
(74) *Attorney, Agent, or Firm* — Alliance IP, LLC

(57) ABSTRACT

Methods, systems, and apparatuses associated with a secure stream protocol for a serial interconnect are disclosed. An apparatus comprises a first device comprising circuitry to, using an end-to-end protocol, secure a transaction in a first secure stream based at least in part on a transaction type of the transaction, where the first secure stream is separate from a second secure stream. The first device is further to send the transaction secured in the first secure stream to a second device over a link established between the first device and the second device, where the transaction is to traverse one or more intermediate devices from the first device to the second device. In more specific embodiments, the first secure stream is based on one of a posted transaction type, a non-posted transaction type, or completion transaction type.

22 Claims, 26 Drawing Sheets

(51) Int. Cl.
    *G06F 21/64*     (2013.01)
    *G06F 13/42*     (2006.01)
    *H04L 9/32*     (2006.01)

(52) U.S. Cl.
    CPC ...... *G06F 21/64* (2013.01); *G06F 2213/0026* (2013.01); *H04L 9/3242* (2013.01); *H04L 63/0464* (2013.01)

(58) Field of Classification Search
    CPC ............... G06F 21/606; G06F 21/64; G06F 2213/0026; G06F 13/4027
    See application file for complete search history.

(56) References Cited

U.S. PATENT DOCUMENTS

| | | | | |
|---|---|---|---|---|
| 9,596,075 | B2* | 3/2017 | Winslow | .......... H04L 9/12 |
| 2004/0128553 | A1* | 7/2004 | Buer | .......... H04L 63/0272 |
| | | | | 713/154 |
| 2005/0154804 | A1* | 7/2005 | Stewart | .......... G06F 13/4022 |
| | | | | 710/36 |
| 2009/0006932 | A1* | 1/2009 | Biran | .......... G06F 13/4282 |
| | | | | 714/E11.032 |
| 2010/0251055 | A1 | 9/2010 | Murakami et al. | |
| 2010/0312928 | A1* | 12/2010 | Brownell | .......... G06F 13/387 |
| | | | | 710/57 |
| 2012/0166582 | A1 | 6/2012 | Binder | |
| 2013/0086586 | A1* | 4/2013 | Lakshmanamurthy | .......... |
| | | | | G06F 15/7807 |
| | | | | 718/100 |
| 2013/0089099 | A1 | 4/2013 | Pollock et al. | |
| 2014/0040618 | A1* | 2/2014 | Liu | .......... H04L 9/0891 |
| | | | | 713/168 |
| 2014/0304450 | A1 | 10/2014 | Maeda et al. | |
| 2015/0319231 | A1 | 11/2015 | Naouri | |
| 2016/0149696 | A1 | 5/2016 | Winslow et al. | |
| 2017/0213054 | A1* | 7/2017 | Chen | .......... H04L 9/083 |
| 2017/0220494 | A1* | 8/2017 | Shacham | .......... G06F 21/85 |
| 2018/0183581 | A1 | 6/2018 | Elbaz et al. | |
| 2019/0050365 | A1 | 2/2019 | Kopzon et al. | |
| 2019/0052617 | A1 | 2/2019 | Chen et al. | |
| 2019/0058675 | A1 | 2/2019 | Schubert et al. | |
| 2019/0220601 | A1 | 7/2019 | Sood et al. | |
| 2019/0220617 | A1 | 7/2019 | Harriman et al. | |
| 2019/0243796 | A1 | 8/2019 | Ping | |
| 2019/0281025 | A1 | 9/2019 | Harriman et al. | |
| 2021/0344653 | A1 | 11/2021 | Harriman et al. | |

OTHER PUBLICATIONS

Trusted Computing Group Incorporated, "TCG Storage Security Subsystem Class: Opal, Specification Version 2.01, Revision 1.00," Aug. 5, 2015 (80 pages).

M. Shahidul Islam; A common-path optical coherence tomography based electrode for structural imaging of nerves and recording of action potentials; spiedigitallibrary; 2013; p. 1-8.

USPTO Non-Final Office Action in U.S. Appl. No. 16/372,353 dated Sep. 9, 2020 (12 pages).

EPO, Office Action issued in EP Patent Application No. 20154933. 4, dated Feb. 3, 2022; 4 pages.

Intel Corporation, "PHY Interface For The PCI Express, Sata, USB 3.1, DisplayPort, and Converged IO Architectures, Version 5.2," Pub Date 2007-2019 (166 pages).

USPTO Notice of Allowance in U.S. Appl. No. 17/369,824 dated Jan. 26, 2023 (8 pages).

* cited by examiner

| ROW PASS COLUMN? | POSTED REQUEST (COL 2) | NON-POSTED REQUEST | | COMPLETION REQUEST (COL 5) |
|---|---|---|---|---|
| | | READ REQUEST (COL 3) | NPR WITH DATA (COL 4) | |
| POSTED REQUEST (ROW A) | (a) NO (b) Y/N  610 | YES  612 | YES  614 | (a) Y/N (b) YES  616 |
| NON-POSTED REQUEST — READ REQUEST (ROW B) | (a) NO (b) Y/N  620 | Y/N  622 | Y/N  624 | Y/N  626 |
| NON-POSTED REQUEST — NPR WITH DATA (ROW C) | (a) NO (b) Y/N  630 | Y/N  632 | Y/N  634 | Y/N  636 |
| COMPLETION REQUEST (ROW D) | (a) NO (b) Y/N  640 | YES  642 | YES  644 | (a) Y/N (b) NO  646 |

FIG. 6

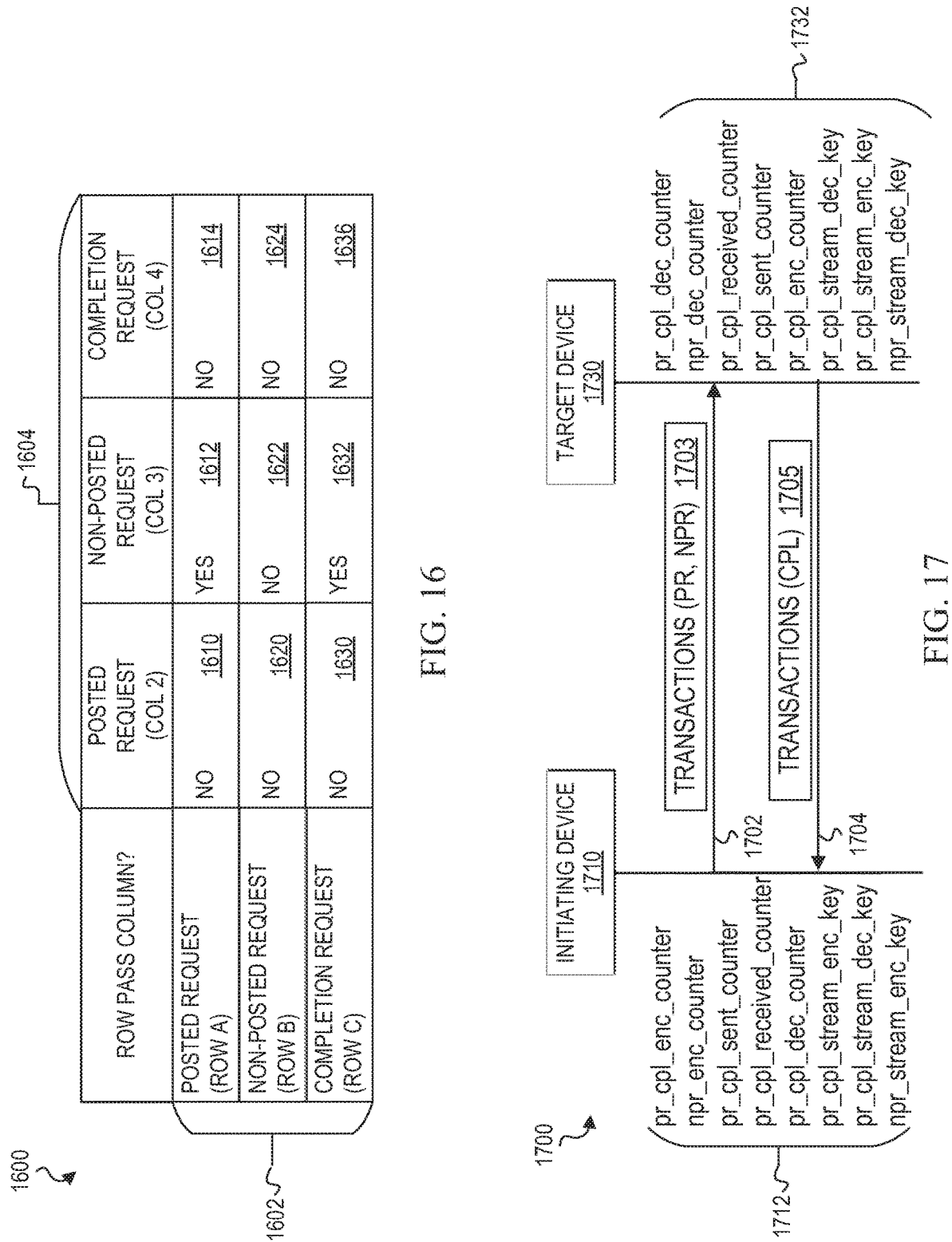

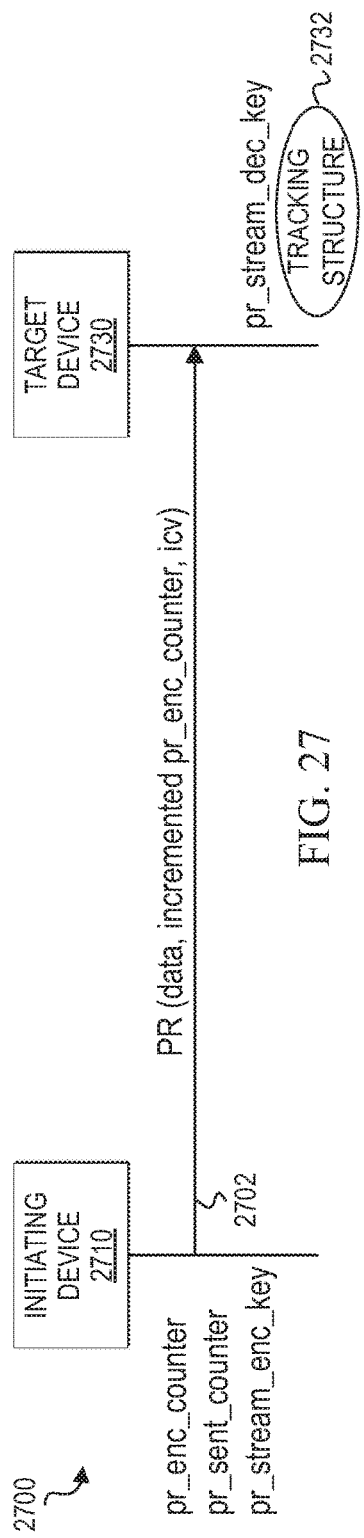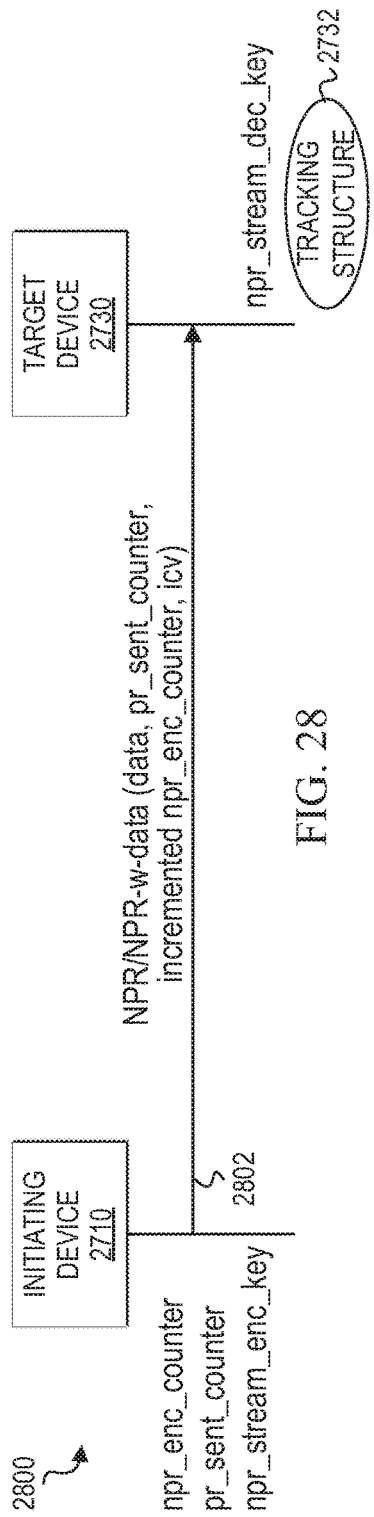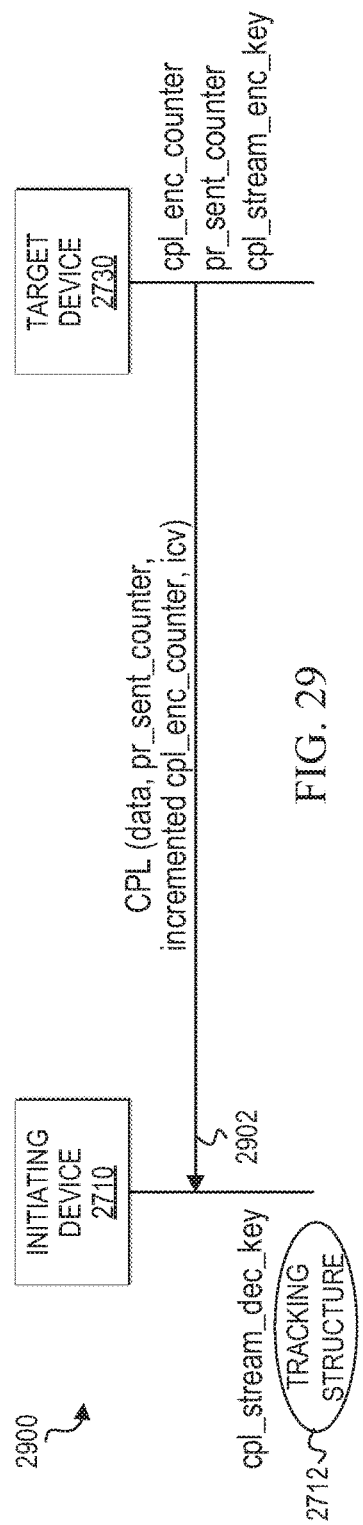
FIG. 27
FIG. 28
FIG. 29

SECURE STREAM PROTOCOL FOR SERIAL INTERCONNECT

CROSS-REFERENCE TO RELATED APPLICATION

This application is a nonprovisional patent application and claims the benefit of priority under 35 U.S.C. § 119(e) to U.S. Provisional Patent Application Ser. No. 62/815,554, filed on Mar. 8, 2019, and entitled A SECURE STREAM PROTOCOL FOR SERIAL INTERCONNECT, the disclosure of which is hereby incorporated by reference in its entirety.

TECHNICAL FIELD

Various embodiments generally may relate to the technical field of computing, and in particular, to secure stream protocol for serial interconnect, such as Peripheral Component Interconnect Express (PCIe) link.

BACKGROUND

Advances in semi-conductor processing and logic design have permitted an increase in the amount of logic that may be present on integrated circuit devices. As a corollary, computer system configurations have evolved from a single circuit or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. As the processing power grows along with the number of devices in a computing system, the communication between sockets and other devices becomes more critical. Accordingly, interconnects, have grown from more traditional multi-drop buses that primarily handled electrical communications to full blown interconnect architectures that facilitate fast communication. Unfortunately, as the demand for future processors to consume at even higher-rates increases, corresponding demand is placed on the capabilities of existing interconnect architectures. Interconnect architectures may be based on a variety of technologies, including Peripheral Component Interconnect Express (PCIe), Universal Serial Bus, and others.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 6 is a table showing types of packet reordering that can occur in a PCIe protocol.

FIG. 16 is a table showing possible packet reordering rules for a secure stream protocol operating in a restricted ordering mode using two streams according to at least one embodiment.

FIG. 17 is an interaction diagram illustrating example counters and keys that may be used in a secure stream protocol operating in restricted ordering mode using two streams according to at least one embodiment.

FIGS. 27-29 are interaction diagrams illustrating possible transactions in a secure stream protocol operating in an explicit counter mode according to at least one embodiment.

DETAILED DESCRIPTION

Figure 1:
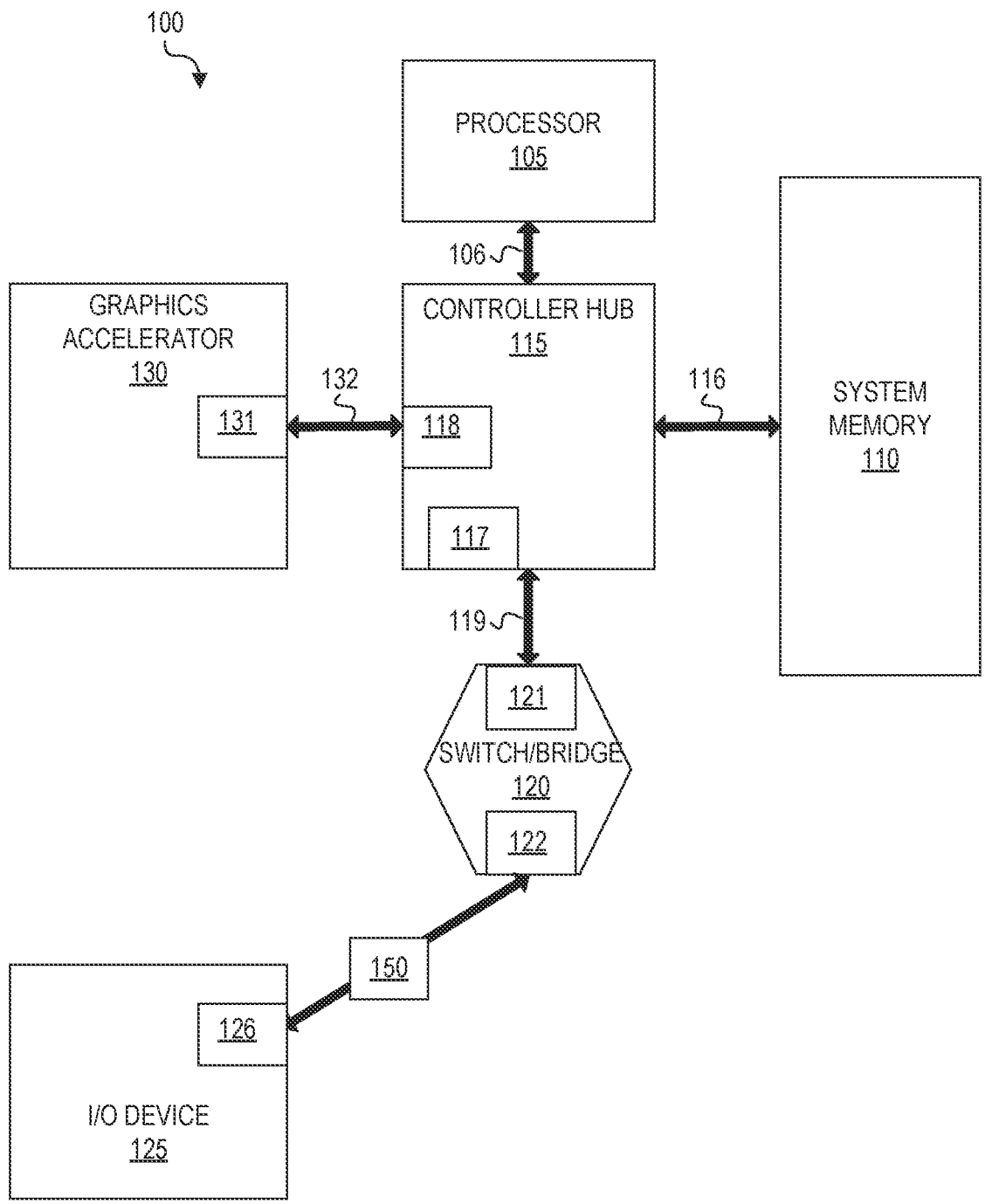
FIG. 1 illustrates an embodiment of a computing system including an interconnect architecture.

The present disclosure provides various possible embodiments, or examples, of systems, methods, architectures, and apparatuses for implementing a secure stream protocol (SEC_STREAM) for interconnect security, such as peripheral component interface express (PCIe) encryption. The disclosure, for ease of understanding, is described in the context of an extension to PCIe protocol to secure the PCIe links between a device or endpoint and a System-on-chip (SOC). However, the disclosure is not limited to PCIe systems and may be practiced with or adapted for other interconnects.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. For example, specific details may include specific types of processors and system configurations, specific hardware structures, specific architectural and micro architectural details, specific register configurations, specific instruction types, specific system components, specific measurements/heights, specific processor pipeline stages and operation etc. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means at least one (A), at least one (B), or (at least one A and at least one B). The description may use the phrases "in an embodiment," "in embodiments," "in at least one embodiment," "in one or more embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flow chart, a flow diagram, a data flow diagram, a structure diagram, or a block diagram. Although a flow chart may describe the operations as a sequential process, many of the operations may be performed in parallel, concurrently, or simultaneously. In addition, the order of the operations may be re-arranged. A process may be terminated when its operations are completed but may also have additional steps not included in the figure(s). A process may correspond to a method, a function, a procedure, a subroutine, a subprogram, and the like. When a process corresponds to a function, its termination may correspond to a return of the function to the calling function and/or the main function.

Embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules, embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

A computing system or a platform may use various devices coupled to a computer bus extensively. A computer bus may include related hardware components (e.g., wire, optical fiber, etc.) and software, including communication protocols. A peripheral component interconnect (PCI) bus or a PCI Express (PCIe, PCI-E) may be a computer bus based on a specification that provides a mechanism for system software, or a system driver, to perform various operations related to the configuration of a device coupled to the PCI bus or the PCIe bus. Devices, or components coupled to a computer bus may also be referred to as functions. PCIe may operate in consumer, server, and industrial applications, as a motherboard-level interconnect (to link motherboard-mounted peripherals), a passive backplane interconnect, and as an expansion card interface for add-in boards. PCIe devices communicate via a logical connection called an interconnect or link. A link is a point-to-point communication channel between two PCIe ports allowing both of them to send and receive ordinary PCI requests, e.g., configuration, input/output (I/O), or memory read/write, and interrupts. At the physical level, a link may be composed of one or more lanes. Low-speed peripherals, such as an 802.11 Wi-Fi card, use a single-lane (×1) link, while a graphics adapter typically uses a much wider and faster 16-lane link.

Although the following embodiments may be described with reference to a secure stream protocol in integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from a secure stream protocol. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the embodiments described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; clients (desktops and mobile), servers (standard, rack scale, and enterprise), and embedded and communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, switch-based technology, and packetized protocol to deliver new levels of performance and features. Power management, quality of service (QoS), hot-plug/hot-swap support, data integrity, and error handling are among some of the advanced features supported by PCI Express.

Referring to FIG. 1, an embodiment of a fabric composed of point-to-point links that interconnect a set of components is illustrated. A system 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller hub 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, a device is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
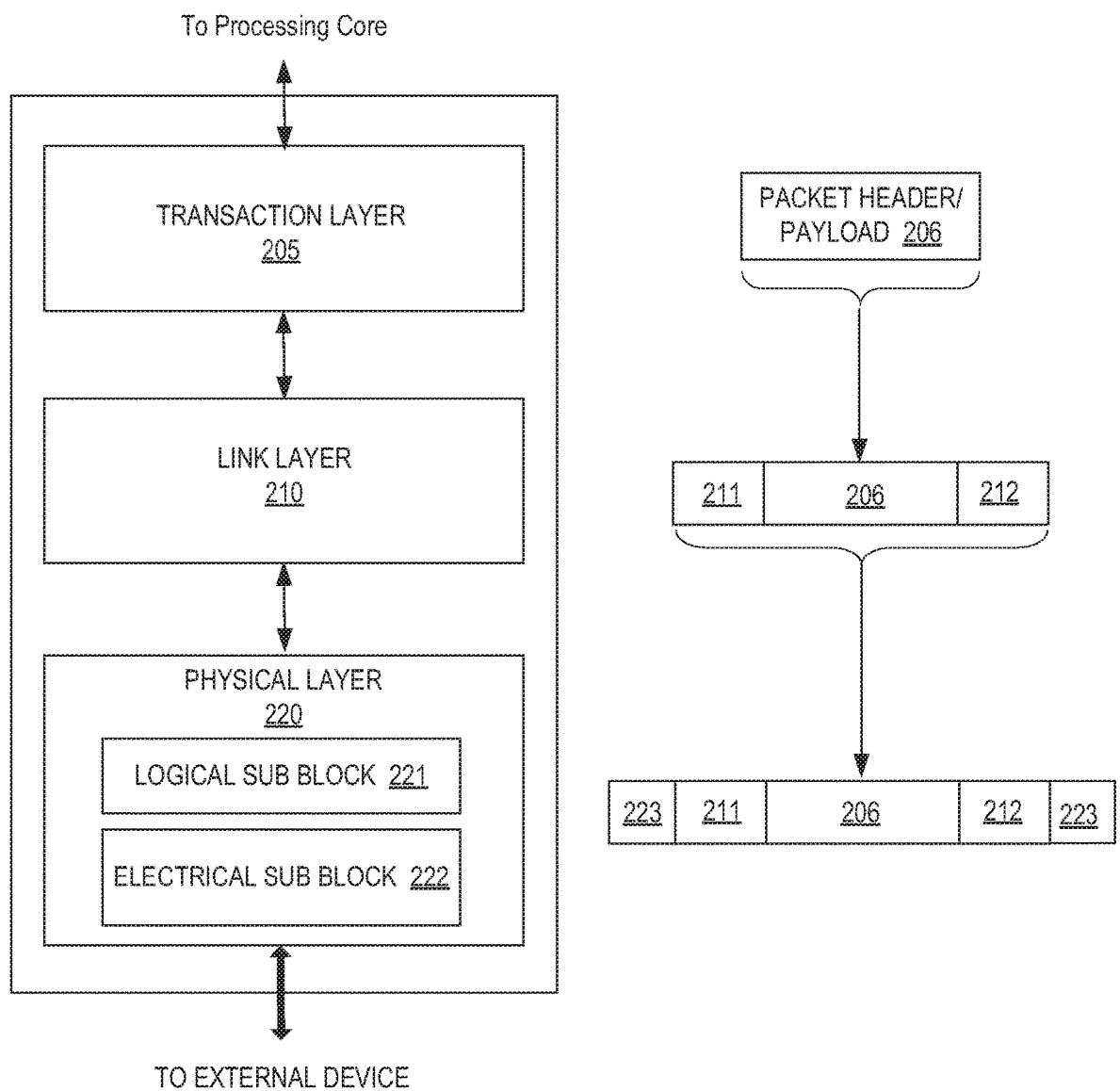
FIG. 2 illustrates an embodiment of an interconnect architecture including a layered protocol stack.
Figure 3:
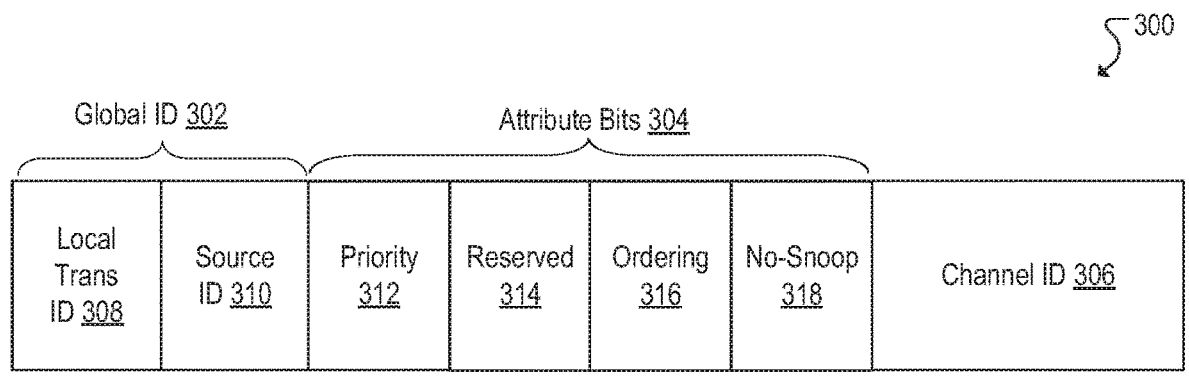
FIG. 3 illustrates an embodiment of a request or packet to be generated or received within an interconnect architecture.
Figure 4:
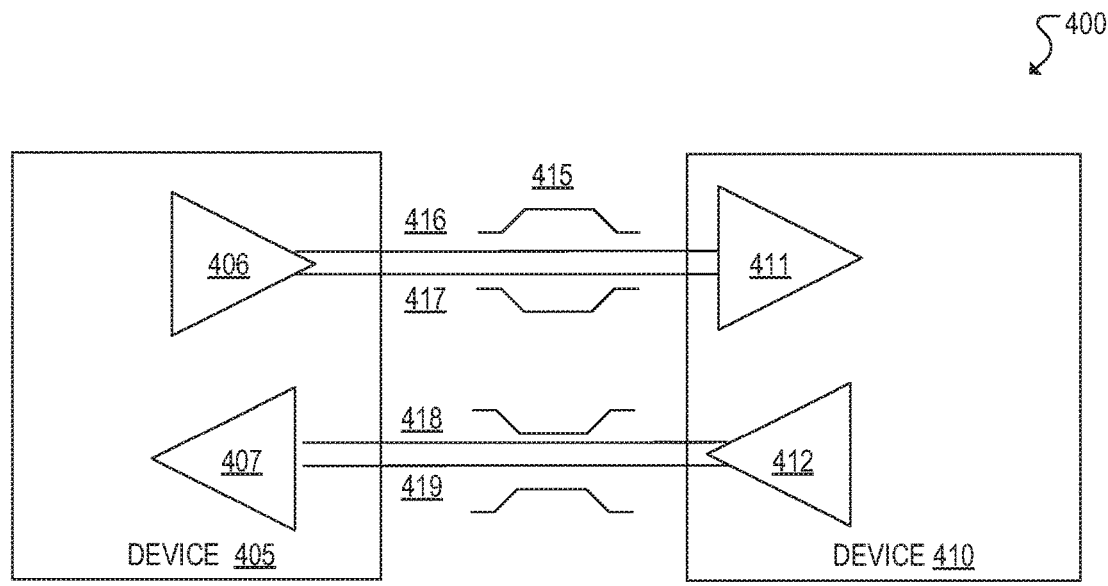
FIG. 4 illustrates an embodiment of a transmitter and receiver pair for an interconnect architecture.

Turning to FIG. 2 an embodiment of a layered protocol stack is illustrated, which may be implemented in one or more components of a mobile computing device, such as an application processor or baseband processor or modem, among other examples. Layered protocol stack 200 includes logic implemented in hardware circuitry and/or software to implement any form of a layered communication stack, such as a Quick Path Interconnect (QPI) stack, a PCIe stack, a next generation high performance computing interconnect stack, or other layered stack. Although the discussion immediately below in reference to FIGS. 2-4 are in relation to a PCIe stack, similar concepts may be applied to other interconnect stacks, such as OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centrig™ interconnect, among others. In one embodiment, protocol stack 200 is a PCIe protocol stack including transaction layer 205, link layer 210 (also referred to herein as 'data link layer'), and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the transaction layer 205 and data link layer 210 to carry the information from the transmitting component to the receiving component. As the transmitted packets flow through the other layers, they are extended with additional information necessary to handle packets at those layers. At the receiving side the reverse process occurs, and packets get transformed from their physical layer 220 representation to the data link layer 210 representation and finally (for transaction layer packets) to the form that can be processed by the transaction layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The transaction layer 205 typically manages credit-based flow control for TLPs. PCIe implements split transactions, i.e. transactions with request and response separated by time, allowing a link to carry other traffic while the target device gathers data for the response.

In addition, PCIe utilizes credit-based flow control. In this scheme, a device advertises an initial amount of credit for each of the receive buffers in transaction layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a memory address space, a configuration address space, a message address space, and an input/output address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global identifier field 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

With reference again to FIG. 2, link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components of a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub-block 221 and electrical sub-block 222 to physically transmit a packet to an external device. Here, logical sub-block 221 is responsible for the "digital" functions of physical layer 220. In this regard, the logical sub-block includes a transmit section to prepare outgoing information for transmission by electrical sub-block 222, and a receiver section to identify and prepare received information before passing it to the link layer 210.

Physical layer 220 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an $8b/10b$ transmission code is employed, where ten-bit symbols are transmitted/received. In other embodiments $128b/130b$ transmission coding is used, among other examples. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets (i.e., a transaction layer); a second layer to sequence packets (i.e., a link layer); and a third layer to transmit the packets (i.e., a physical layer). As a specific example, a common standard interface (CSI) layered protocol is utilized.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths (i.e., paths 416 and 417) and two receiving paths (i.e., paths 418 and 419) are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level (i.e., a rising edge), line 417 drives from a high logic level to a low logic level (i.e., a falling edge). Differential signals potentially demonstrate better electrical characteristics, such as better signal integrity (i.e., cross-coupling), voltage overshoot/undershoot, ringing, etc. This allows for better timing window, which enables faster transmission frequencies.

For purposes of illustrating certain example techniques for using a secure stream protocol for a serial interconnect in accordance with embodiments disclosed herein, it is important to understand the activities that may be occurring in systems in which link encryption is used in trusted domain environments. Accordingly, the following foundational information may be viewed as a basis from which the present disclosure may be properly explained.

Some new CPU capabilities include trust domains that provide a virtual computing environment without a hypervisor in a trusted computing base (TCB). The hypervisor (or virtual machine manager (VMM)) is removed from the trusted computing base for virtual machines it manages. A virtual machine in this trusted domain can protect the confidentiality of its memory contents and runtime central processing unit (CPU) state from any other software, including the hosting VMM, unless explicitly shared by the trusted domain virtual machine itself. The memory may also be protected from the VMM and other trust domains by a memory controller using encryption, for example. Generally, trust domains do not allow devices that are connected via a serial interconnect interface to access the trust domain protected memory. These connected devices, however, typically need access to protected data to perform their intended functions.

Example use cases of a virtual computing environment where the hypervisor has been removed from a trusted computing base for virtual machines it manages, include cloud service providers that host many tenant virtual machine (VM) workloads. Both the cloud service provider (CSP) and the cloud tenant may desire confidentiality for the VM workload. The tenant VM may not trust the VMM or any of the software in the cloud data center. Thus, running a trust domain VM for which the hypervisor has been removed from the trust boundary, ensures that the VM cannot be attacked by the VMM or malicious users operating or otherwise accessing the data center. To achieve this confidential VM execution, the memory and the runtime CPU state have to be kept confidential and integrity-protected to prevent data exfiltration or tamper attacks. A new CPU security capability can meet these security objectives via the use of a memory controller utilizing memory encryption and integrity protection, such as Intel® Multi-Key Total Memory Encryption (MK-TME).

A trust domain (TD) is a type of virtual machine guest that prevents attacks by running in a central processing unit (CPU) mode. Running in a CPU mode protects the confidentiality of its memory contents and runtime CPU state from any other software, including the hosting VMM, unless explicitly shared by the trust domain itself. The memory and runtime CPU state are isolated so that the memory is opaque and generally unmodifiable. To the extent that any modifications occur, those modifications can be detected.

Devices that are connected to a server platform in a cloud, however, are not trusted to access the memory of a trust domain. For a device connected to the server platform via a serial interconnect interface, such as peripheral component interface express (PCIe), enabling direct assignment of the device to TD memory requires the data flowing between the TD and the device over the PCIe link to be secured to enforce confidentiality, integrity, and replay protection of the data. In particular, to allow direct memory access by a device, a TD needs 1) the ability to establish trust in the device such that the device is recognized as a trusted entity, 2) the ability to secure the connection between the server and the device so that the data that flows on the link is secure, and 3) the ability to enforce rules for producer-consumer ordering of transactions.

Figure 5:
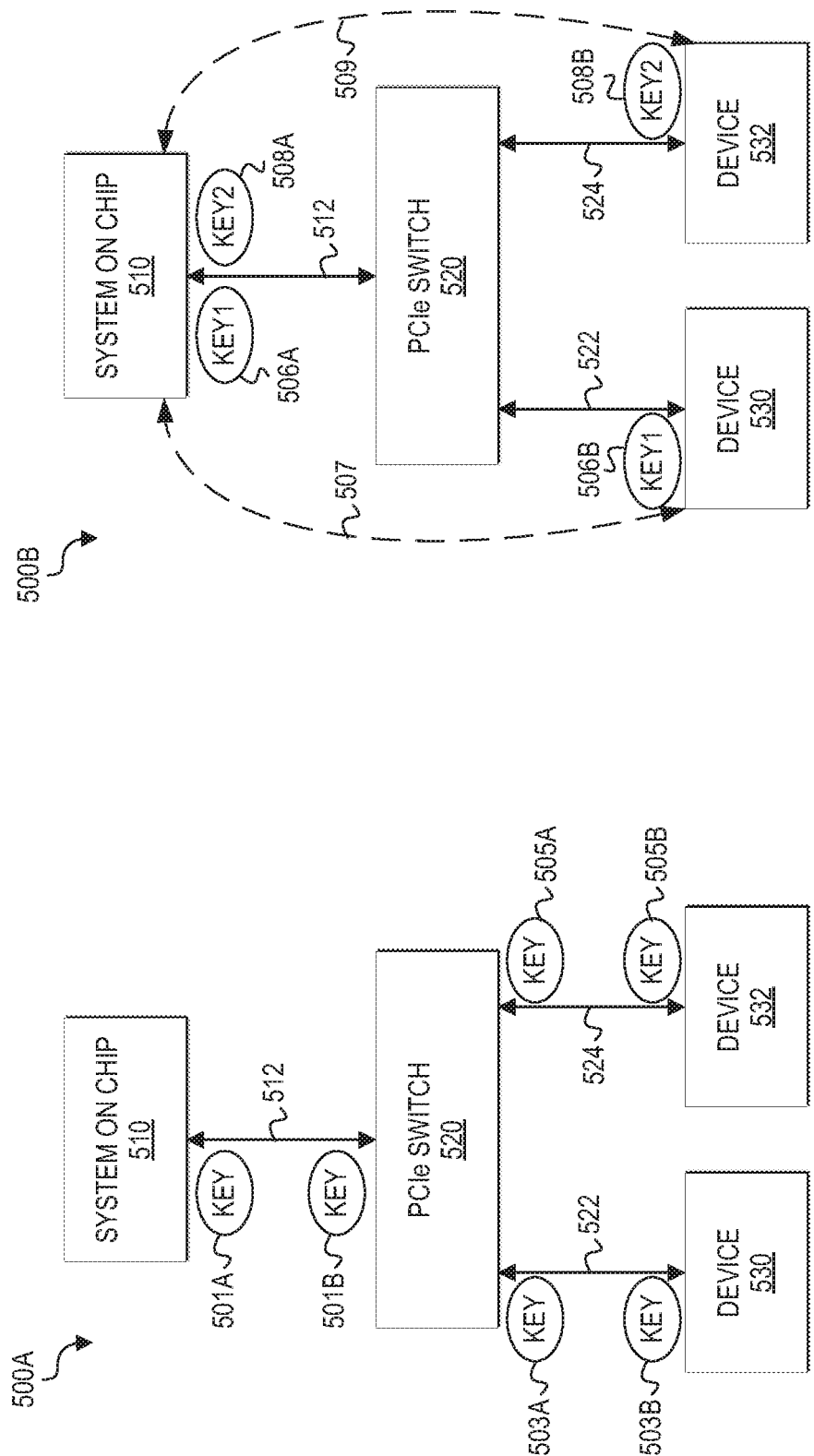
FIGS. 5A and 5B are simplified block diagrams illustrating hop-by-hop and end-to-end encryption, respectively, in a Peripheral Component Interconnect Express (PCIe) system architecture.

As shown in FIGS. 5A and 5B, encryption of transactions in PCIe can be performed using a hop-by-hop protocol (FIG. 5A) or an end-to-end protocol (FIG. 5B). FIGS. 5A and 5B illustrate the distinction between hop-by-hop and end-to-end encryption in an interconnect architecture that includes example devices 530 and 532 connected to a PCIe switch 520 via links 522 and 524, and the PCIe switch 520 connected to a system on chip (SoC) 510 via a link 512. In FIG. 5A, a hop-by-hop protocol includes a different key pair for each link to enable encryption at every transmitting port and decryption at every receiving port. Keys 501A and 501B are used as the key pair of link 512, keys 503A and 503B are used as the key pair of link 522, and keys 505A and 505B are used as the key pair of link 524. Consequently, data flowing through a hop-by-hop network with one or more intermediate devices, such as PCIe switch 520, gets encrypted and decrypted several times before it reaches its destination.

In an end-to-end protocol shown in FIG. 5B, different key pairs are provisioned for each end-to-end link 507 and 509. Keys are provided only at an initiating device and a target device. For example, keys 506A and 506B are used as the key pair for the end-to-end link 507, and keys 508A and 508B are used as the key pair for the end-to-end link 509. An initiating device encrypts data to be transmitted to a target device, the target device decrypts the data received from the initiating device, and intermediate devices simply route the encrypted transactions. For example, when SoC 510 sends data to device 530, SoC 510 is the initiating device and device 530 is the target device. Conversely, when device 530 sends data to SoC 510, device 530 is the initiating device and SoC 510 is the target device.

One key challenge for any end-to-end protocol is the transaction reordering that can occur between an initiating device and a target device. Relaxed reordering in PCIe allows switches in a path between an initiating device and a target device to reorder one or more transactions received prior to others that were previously received. In the PCIe protocol, reordering some types of transactions is required when needed to avoid deadlock. For other types of transactions, the protocol does not prohibit reordering from being performed in switches (and bridges), and the resulting behavior is implementation-specific to those components. The present disclosure enables end-to-end security while continuing to allow all of the existing required variations in ordering behavior. In addition, several variations that allow tradeoffs in the complexity and packet overhead versus restrictions in the allowed ordering behaviors are described.

FIG. 6 is a table 600 showing the types of reordering that can occur in a PCIe protocol. In PCIe, reordering of packets can occur in intermediate devices, which may create problems in end-to-end security techniques. In some scenarios, reordering may occur automatically, while in other scenarios, intermediate devices are allowed to reorder to avoid deadlocks. As shown in table 6, rows A-D 602 and columns 2-5 604 identify types of transactions in a PCIe system, which include posted requests, non-posted requests, and completion requests. Non-posted requests can include two different kinds of transactions: non-posted read requests and non-posted requests with data.

Each cell in table 600 indicates a type of reordering that can occur if the request in the associated row is enqueued after the request in the associated column. Each cell provides an answer to whether a request specified in the associated row can pass a request specified in the associated column. For example, cell 610 indicates whether a posted request (specified in row A) can pass another posted request (specified in column 2) based on condition (a) or condition (b). Condition (a) is followed if a relaxed ordering (RO) bit in a packet is not set (e.g., RO=0). Condition (b) is followed if the relaxed ordering bit in a packet is set (e.g., RO=1). Specifically, if the relaxed reordering bit is not set (e.g., RO=0), then condition (a) is followed and a posted request is not permitted to pass another posted request. If the relaxed reordering bit is set (e.g., RO=1), then condition (b) is followed. Condition (b) is 'YIN' or 'yes or no', which means that a posted request may be allowed, or may not be allowed, to pass another (e.g., older) posted request. For example, if transactions 1, 2, and 3 are sent, and if transaction 3 is marked with an RO bit, then the PCIe devices are allowed to send transaction 3 ahead of transactions 1 and 2.

If relaxed ordering is enabled (e.g., RO=1) or ID-based ordering is enabled, as shown in column 2, the PCIe protocol allows posted requests to pass posted requests at cell 610, non-posted requests to pass posted requests (cells 620 and 630), and completion requests to pass posted requests at cell 640. If the relaxed ordering bit is not set or if ID-based ordering is not enabled, then the PCIe protocol prohibits a posted request from being passed by any other requests.

Relaxed reordering can create several issues in an end-to-end protocol. First, one security rule is to require non-posted requests and completion requests to push older posted requests. However, this rule cannot be enforced in an end-to-end protocol without a tracking mechanism. Although the number of posted requests that are pushed ahead of non-posted requests (cells 612 and 614) can be tracked, without a sophisticated tracking mechanism, it is not possible to detect whether all posted requests were pushed or if some of the posted requests were replayed. In addition, a posted request is required to pass a non-posted request, which can make a tracking mechanism more complicated as it has to track epochs demarcated by non-posted requests.

Second, a transaction with a relaxed ordering (RO) bit that is not set (e.g., RO=0) is not allowed to pass posted requests (cells 610, 620, 630 and 640). Any packet marked with a relaxed ordering bit that is set (e.g., RO=1), is allowed to pass posted requests, including older posted requests without a sophisticated tracking mechanism. A simple watermark or transaction counting scheme to detect the closure of a reordering window on an RO=0 request arriving is not feasible because, without a more sophisticated tracking mechanism, it is not possible to ensure that all RO=1 write requests ahead of the RO=0 request were actually received and not dropped/replayed. Generally, a posted request with a reordering bit set (e.g. RO=1) is allowed to pass a posted request with a reordering bit that is not set (e.g., RO=0). This could make a tracking mechanism more complicated as it would need to track epochs demarcated by RO=0.

Third, although relaxed reordering creates several issues, it is desirable in the initiating devices and target devices of PCIe transactions, such as a root-complex and endpoints.

The PCIe protocol also allows read requests to pass other read requests (cells 622, 624, 632, 634). Generally, read requests do not need replay protection. When a read request targets a register, however, the replaying of reads may cause undesired side effects. Detecting replays while allowing reads to be reordered also requires a more elaborate tracking mechanism to track the read requests.

Other reordering rules include posted requests and completion requests being required to pass non-posted requests (cells 612, 614, 642, and 644) regardless of the relaxed ordering bit contents. When the relaxed ordering bit is set, posted requests are required to pass completion requests and completion requests are not allowed to pass completion requests (cells 616 and 646). When the relaxed ordering bit is not set, the posted requests are required to pass completion requests and completion requests are allowed to pass completion requests (cells 616 and 646). Finally, regardless of whether the relaxed ordering bit is set, non-posted requests are allowed to pass non-posted requests.

A secure stream protocol for a serial interconnect system as disclosed herein resolves many of the aforementioned issues (and more). This protocol is an end-to-end protocol to secure the links between two endpoints of an encrypted session. The two endpoints of an encrypted session include an initiating device and a target device. The initiating device and target device may comprise a system on chip (SoC) and a peripheral device, or any other pair of suitable devices utilizing a serial interconnect architecture such as PCIe. Additionally, it should be noted that each endpoint may perform appropriate operations as an initiating device when sending transaction data and may perform appropriate operations as a target device when receiving transaction data. Intermediate switches and bridges are not in the trust boundary and accordingly, cannot access cleartext data. Transaction headers of transactions sent from an initiating device are in cleartext and are used by intermediate switches and bridges to route the transactions. The transaction headers, however, are integrity protected such that they cannot be modified without detection. In some implementations, this capability can be utilized in trusted domain environments that implement end-to-end security and can also be applied to other security approaches that are similar to trusted domains.

The secure stream protocol can be configured based on different modes of operation related to reordering transactions according to the interconnect protocol (e.g., PCIe). One mode of operation is referred to herein as a 'restricted ordering mode' or 'ROM.' in which restrictions related to reordering transactions are placed on intermediate devices, such as switches, in a path between two endpoints (e.g., SoC and peripheral device). In one or more embodiments of the restricted ordering mode, if the interconnect protocol allows but does not require reordering of a first type of transaction over a second type of transaction, then in most cases, reordering the first type of transaction over the second type of transaction is not allowed. If reordering of a first type of transaction over a second type of transaction is required in the interconnect protocol, then reordering is required in the restricted ordering mode of the secure steam protocol.

The restricted ordering mode can be implemented using two streams or three streams. In a three-stream embodiment of the restricted ordering mode, posted transactions, non-posted transactions, and completion transactions are each treated as a separate stream in the secure stream protocol. In a two-stream embodiment of the restricted ordering mode, posted transactions and completion transactions together are treated as one stream and non-posted transactions are treated as another stream. The restrictions ensure that transactions within each stream are ordered, but may be out of order relative to transactions in other streams. Accordingly, transactions can be tracked without the use of sophisticated tracking mechanisms to detect whether all the packets were received in the order in which they were sent. In addition, bandwidth can be optimized because counters that are used for encryption do not need to be carried with the packets.

Another mode of operation is referred to herein as an 'explicit counter mode' or 'ECM' in which intermediate devices, such as switches, in a path between two endpoints (e.g., SoC and peripheral device), are allowed to reorder transactions in accordance with the interconnect protocol (e.g., PCIe). In the explicit counter mode, a counter used for encryption is carried along with a transaction as part of the packet payload. The two endpoints implement a tracking mechanism to detect dropped or replayed transactions. When a transaction is received by a target device, the tracking mechanism can determine whether the counter carried in the packet payload has previously been received at the target device. If the counter has not been previously received, then it is added to the tracking mechanism. If the counter has been previously received, then the transaction is marked as an error. Additionally, if the counter has not been received but there are missing packets between the last received counter and the counter in the current TLP, then the tracking mechanism may wait to process the current packet until all missing packets with counter values between the last received counter and the counter in the current packet are received. An embodiment may have limited buffering to hold packets that have arrived out of order and may declare an error if it runs out of buffer space.

Embodiments disclosed herein of an end-to-end secure stream protocol offer several advantages. For example, a smaller trusted computing base (TCB) may be provisioned to include only entities that process sensitive data (e.g., SoC, peripheral devices, etc.). Switches and bridges can remain outside the TCB. In addition, the software complexity in managing secure communication is lowered. For example, attestation and provisioning may be performed for only the trusted devices, instead of validating the entire topology. Embodiments of the end-to-end secure protocol also achieve several security objectives typically associated with a hop-by-hop link encryption scheme. These security objectives can include confidentiality, integrity, and replay protection on transaction layer protocol (TLP) data, and integrity on TLP data, headers, and prefixes. Embodiments also can enable detection and prevention of replay of transactions. Additionally, producer-consumer ordering can be enforced. Specifically, non-posted requests (e.g., reads) push posted requests (e.g., writes), and completion requests push posted requests (e.g., writes).

Figure 7:
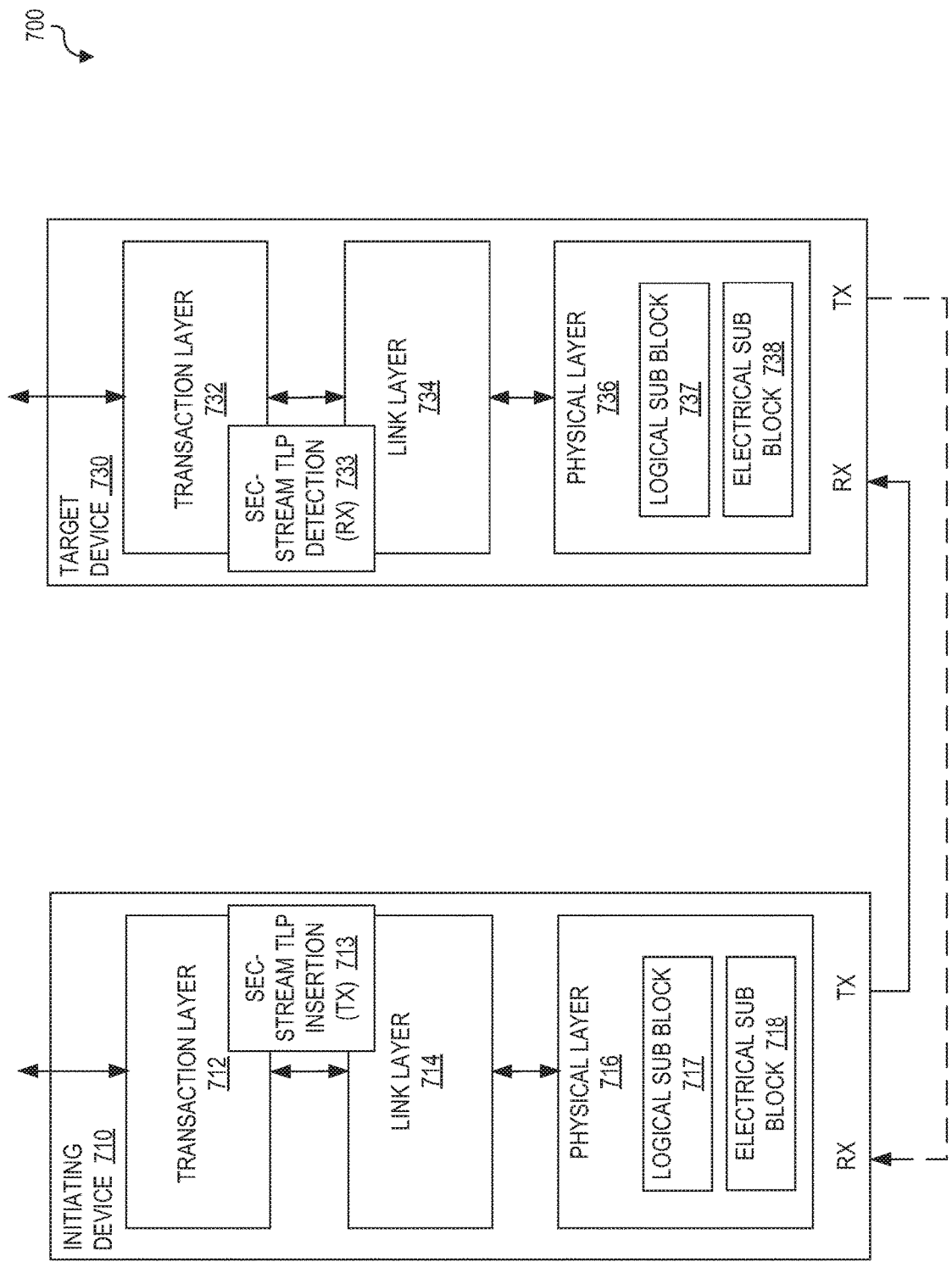
FIG. 7 is a simplified block diagram illustrating a system with sockets for a secure stream protocol according to at least one embodiment.

Turning to FIG. 7, FIG. 7 is a simplified block diagram illustrating an embodiment of an interconnect architecture including a layered protocol stack with sockets of a secure stream protocol, according to at least one embodiment. The interconnect architecture includes an initiating device 710 and a target device 730. As previously described herein, the layered protocol stacks include logic implemented in hardware circuitry and/or software to implement any form of a layered communication stack, such as a Quick Path Interconnect (QPI) stack, a PCIe stack, a next generation high performance computing interconnect stack, or other layered stack. For ease of discussion, FIG. 7 and subsequent FIGURES herein may be primarily described in relation to a PCIe stack, although similar concepts may be applied to other interconnect stacks. In at least one embodiment, initiating device 710 and target device 730 each include a PCIe stack, such as PCIe protocol stack 200 described with reference to FIG. 2. The PCIe stack in initiating device 710 includes a transaction layer 712, a link layer 714, and a physical layer 716. The PCIe stack in target device 730 includes a transaction layer 732, a link layer 734, and a physical layer 736.

In at least one embodiment, initiating device 710 and target device 730 can secure a transaction layer packet according to a secure stream protocol. A transaction layer packet is also referred to herein as 'packet' and 'TLP'. As illustrated in FIG. 7, sockets where secure stream processing occurs include a secure stream TLP insertion point (STX) 713 between transaction layer 712 and link layer 714 of initiating device 710, and a secure stream TLP detection point (SRX) between transaction layer 732 and link layer 734 of target device 730.

In various embodiments, in the secure stream protocol (also referred to herein as "SEC-STREAM"), each transaction type (i.e., posted, non-posted, and completion) may be treated as a separate protected stream. As used herein, a 'protected stream' or 'secure stream' is intended to represent one or more transactions of a particular transaction type (or combination of particular transaction types) that have been confidentiality, integrity, and replay protected based on the particular transaction type (or combination of transaction types). The data payload of a transaction is confidentiality, integrity, and replay protected. The metadata (e.g., TLP secure stream prefixes, TLP Headers) of a transaction is integrity and replay protected. In various embodiments, Advanced Encryption Standard—Galois/Counter Mode (AES-GCM) construction with 96-bit counters and a 96-bit Message Authentication Code (MAC) can be used for cryptographically securing the traffic. It should be noted, however, that this approach can work equally well with similar types of security schemes and is not limited to these specifics. For example, other cryptographic constructs that provide replay protection and integrity protection may be used instead. In other embodiments, larger AES-GCM construction and/or a larger MAC may be used.

The present disclosure defines a new TLP secure stream prefix for TLPs to indicate whether the TLP is part of a trusted 10 session and to convey other secure stream information. The TLP may be part of a trusted 10 session if the request is originated by a trusted entity and is to be consumed by another trusted entity. Generally, a trusted entity is part of a trust domain. An initiating device and a target device can each be provisioned with trusted entities as well as non-trusted entities. The presence of secure stream information (e.g. in a prefix of the TLP or otherwise stored in the TLP) indicates that the TLP is secured in a secure stream that provides confidentiality (e.g., encrypted data), integrity protection (e.g., integrity code value for encrypted data, secure stream information, and TLP header), and replay protection (e.g., encryption/decryption counters). It should be noted that the use of the TLP secure stream prefix is for convenience in adding this capability to existing implementations, and in other variations the TLP headers could be modified, or an additional "security layer" could potentially be added to carry secure stream information in a transaction. In one alternative embodiment, some or all of the secure stream information carried in the secure stream prefix could be embedded in the payload of the packet. While the prefix approach is described in detail below, it should be understood that any manner of conveying the needed secure stream information can provide an equivalent result, although possibly with different implementation and/or bandwidth overhead tradeoffs. Thus, the encrypted payload is transparent to intermediate switches. Intermediate switches can use metadata for buffer management and routing, but any tampering or replay can be detected.

Operationally, in at least one embodiment, a packet is formed in transaction layer 712 of initiating device 710. The packet can include, but is not necessarily limited to, a header with routing information and payload data to be communicated to the target device. At 713, before passing the packet to link layer 714, data in the packet is encrypted, a TLP secure stream prefix is generated, the prefix is inserted into the packet, an integrity code value (ICV) such as a MAC is generated over the packet (e.g., prefix, header, data), and the ICV is added to the packet. After the link layer 734 in target device 730 processes the received transaction, at 733, data in the packet is decrypted, the ICV is verified, and the TLP secure stream prefix is stripped from the packet before further processing by the transaction layer 732. Hardware and/or software to perform secure stream processing at 713 and 733 may be integrated in their respective transaction layers 712 and 732 or may be implemented separately as sub-layers between transaction layers 710, 732 and link layers 714, 734.

The present disclosure defines two modes of operation for a secure stream protocol to address the issues related to relaxed ordering and read replays that may occur. The modes include a restricted ordering mode (ROM) and explicit counter mode (ECM).

In the restricted ordering mode, certain restrictions are placed on the switches in the path. For a given scenario in a switch, if the PCIe protocol allows, but does not require, reordering based on the types of transactions that are enqueued, then the switch is prohibited from performing the reordering. Thus, link bandwidth can be optimized because counters that are used for encryption do not have to be carried along with the transactions. Also, tracking is simplified because a complex tracking mechanism (e.g., with counters to detect whether all transactions were received in the order in which they were sent) is not required.

In one example of restrictions in the restricted ordering mode, switches are required to treat relaxed ordering or ID based ordering bit (RO/IDO) in a TLP header of a transaction as RO/IDO=0 for SEC-STREAM TLPs. Alternatively, an initiating device could be prohibited from setting RO/IDO=1 for SEC-STREAM TLPs. In these examples, switches do not allow IO/Cfg completion requests to pass posted requests even if the IO/Cfg completion requests can be distinguished from other completion requests. The initiating device (e.g., root complex) and the target device (e.g., endpoint), however, can reorder transactions based on the RO/IDO bit.

In another example of restrictions in the restricted ordering mode, switches are prevented from allowing non-posted requests (reads) from passing other non-posted requests. Thus, switches cannot reorder reads against reads and therefore, in table 600, cells 622, 624, 632, and 634 are treated as "No" for SEC-STREAM TLPs. In addition, switches are prohibited from reordering completion requests against completion requests, and so cell 646 is treated as a "No" for SEC-STREAM TLPs. The initiating device (e.g., root complex) and the target device (e.g., endpoint), however, can reorder read requests against read requests and completion requests against completion requests normally.

In the explicit counter mode (ECM), intermediate devices such as switches are not restricted from reordering transactions. In ECM, counters that are used with authenticated encryption of a TLP packet are carried with the TLP packet. In at least one embodiment, the counters used for encryption may be part of the data payload of the TLP packet. A tracking mechanism is implemented at each endpoint of a SEC-STREAM session that tracks receipt of sequence numbers to enforce the TLP ordering rules. In at least one embodiment encryption counters may be used as the sequence numbers to be tracked. The window of tracking is implementation specific and implementations may add drains/fences to avoid tracking overflows. The tracking mechanism may have a finite capacity to track sequence numbers. If the tracking mechanism is nearing its capacity, then an initiating device may insert a "fence" to temporarily stop sending new transactions until everything that is older than the fence drains, the target device has received every transaction that was sent, and the tracking mechanism is cleared. This technique limits the number of outstanding read requests.

Figure 8:
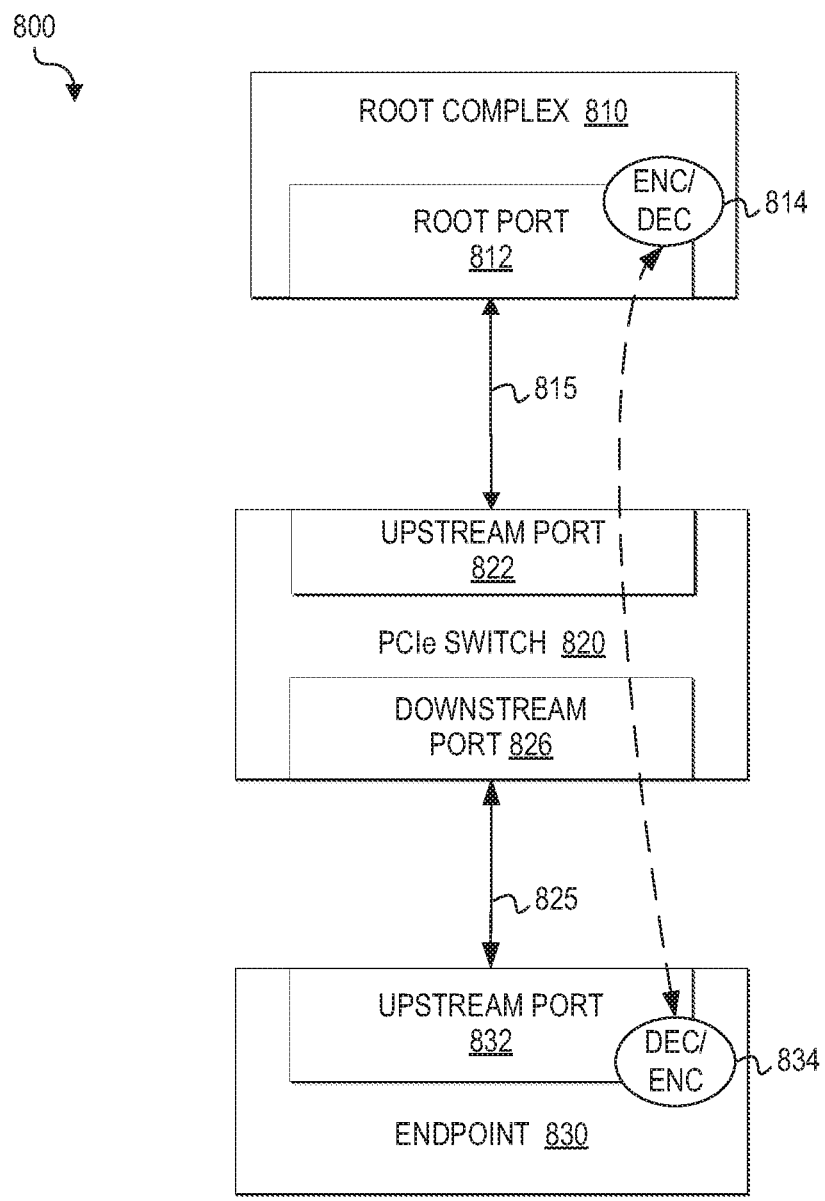
FIG. 8 is a simplified block diagram illustrating a system implementing an end-to-end secure stream protocol according to at least one embodiment.

FIG. 8 is a simplified block diagram of a PCIe interconnect architecture 800 including a root complex 810 connected to an endpoint 830 via a PCIe switch 820. Root complex 810 includes a root port 812, where encryption or decryption 814 is performed (depending on whether the root complex is the transmitter or receiver) for a TLP packet in an end-to-end secured stream. Endpoint 830 includes an upstream port 832, where encryption or decryption 834 is performed (depending on whether the endpoint is the transmitter or receiver) on a TLP packet in an end-to-end secured stream. PCIe switch 820 includes an upstream port 822 connected to root port 812 via link 815, and a downstream port 826 connected to upstream port 832 of endpoint 830 via link 825. In a secured stream, transactions are not encrypted or decrypted at PCIe switch 820. Instead, PCIe switch uses header data in the TLP packet to route the transaction. Root port 812 can perform encryption of the data payload of a packet when the root port is the initiating device and can perform decryption of the data payload of the packet when it is the target device. Similarly, endpoint 830 can perform encryption of the data payload of a packet when the endpoint is the initiating device and can perform decryption of the data payload of the packet when the endpoint is the target device.

Figures 9, 10:
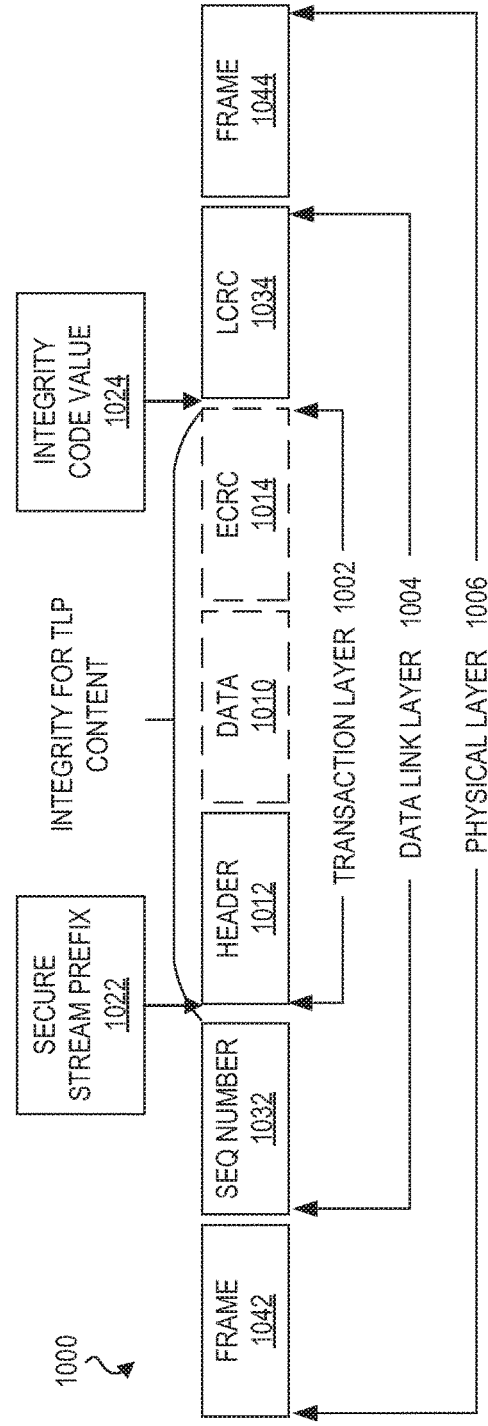
FIG. 9 is a table showing possible packet reordering rules for a secure stream protocol operating in a restricted ordering mode using three streams according to at least one embodiment.
FIG. 10 is an example of a packet flow through layers of a PCIe protocol according to at least one embodiment.

FIG. 9 is a table 900 showing potential reordering rules for a secure stream protocol operating in a restricted ordering mode using three streams. Table 900 includes rows A-C 902 and columns 2-4 904, which identify types of transactions (e.g., posted requests, non-posted requests, and completion requests). Non-posted requests can include two different kinds of transactions (i.e., non-posted read requests and non-posted requests with data), which are consolidated in table 900 for simplicity. Like table 600 of FIG. 6, each cell 910-936 in table 900 specifies possible rules of reordering for transactions that are enqueued in PCIe switch (e.g., 820) and secured based on three streams defined for the secure stream protocol. The three streams include a posted stream, a non-posted stream and a completion stream.

In the example reordering rules shown in table 900, reordering by the PCIe switch is required for posted requests and completion requests passing non-posted requests. This is indicated by the "YES" in cells 912 and 932. In at least one embodiment, reordering is allowed in these scenarios to avoid deadlocks. If reordering was not allowed for these scenarios, significant modifications may be needed to PCIe operation. Reordering is also required for posted requests passing completion requests if the relaxed ordering bit is set (e.g., RO=1), as indicated by the "YES" in cell 914(*b*).

Reordering is allowed (but not required) for certain transactions in the three stream embodiment. For example, reordering is allowed for posted requests passing completion requests if a relaxed ordering bit is not set (e.g., RO=0), as indicated by the "YIN" in cell 914(*a*). Reordering is also allowed (but not required) for non-posted requests passing completion requests, as indicated by the "YIN" in cell 924.

As indicated by the "NO" in cells 910, 920, and 930, no requests are allowed to pass posted requests. Note that, in ECM, this reordering could be allowed. The rules that prevent non-posted and completion requests from passing posted requests (i.e., 920 and 930) help to enforce producer-consumer ordering. Because it is rarely beneficial for non-posted requests to pass non-posted requests or for completion requests to pass completion requests, these types of reordering are not allowed as indicated by the "NO" in cells 922 and 936.

These restricted ordering rules are one possible example of rules that may be used to simplify end-to-end security at a minimum performance impact. The restricted ordering rules along with tracking posted requests help avoid deadlocks that may occur and ensure that transactions within a particular stream are received by a target device in the order in which they were sent by an initiating device. It should be noted, however, that other more restrictive rules may be used, although this could potentially result in a performance tradeoff.

Turning to FIG. 10, a flow 1000 of a secure transaction layer packet is shown through secure stream protocol layers. In a transaction layer 1002, a transaction layer packet (TLP) is generated with data 1010 to be transmitted from a first device (e.g., initiating device, transmitter) to a second device (e.g., target device, receiver). The data 1010 is referred to as the 'payload' of the packet. An endpoint cyclic redundancy check (ECRC) 1014 can be appended (or otherwise added) to the payload, and a header 1012 can be prepended (or otherwise added) to the payload. Header 1012 may contain addressing and routing information that is not encrypted (e.g., in cleartext) and that can be used by intermediate switches to route the transaction.

Before the TLP is processed by data link layer 1004, a secure stream prefix 1022 is inserted in the TLP. Prefix 1022 can contain an indication that the end-to-end secure stream protocol is to override link per TLP. An integrity check value (ICV) 1024 is also appended (or otherwise added) to the TLP. In at least one embodiment, ICV 1024 can be a message authentication code (MAC), which can be computed over secure stream prefix 1022, header 1012, data 1010, and ECRC 1014, in order to ensure the integrity of the transaction layer packet. Accordingly, prefix 1022, TLP header 1012, data 1010, ECRC 1014, and ICV 1024 form a transaction layer packet.

When the TLP has been passed to data link layer 1004, a link cyclic redundancy check (LCRC) 1034 is appended to the TLP, and a sequence number 1032 is prepended to the TLP. When the packet is passed to a physical layer 1006, frames 1042 and 1044 are appended and prepended to the ends of the data link layer packet to indicate the beginning and end of the transaction.

Figure 11:
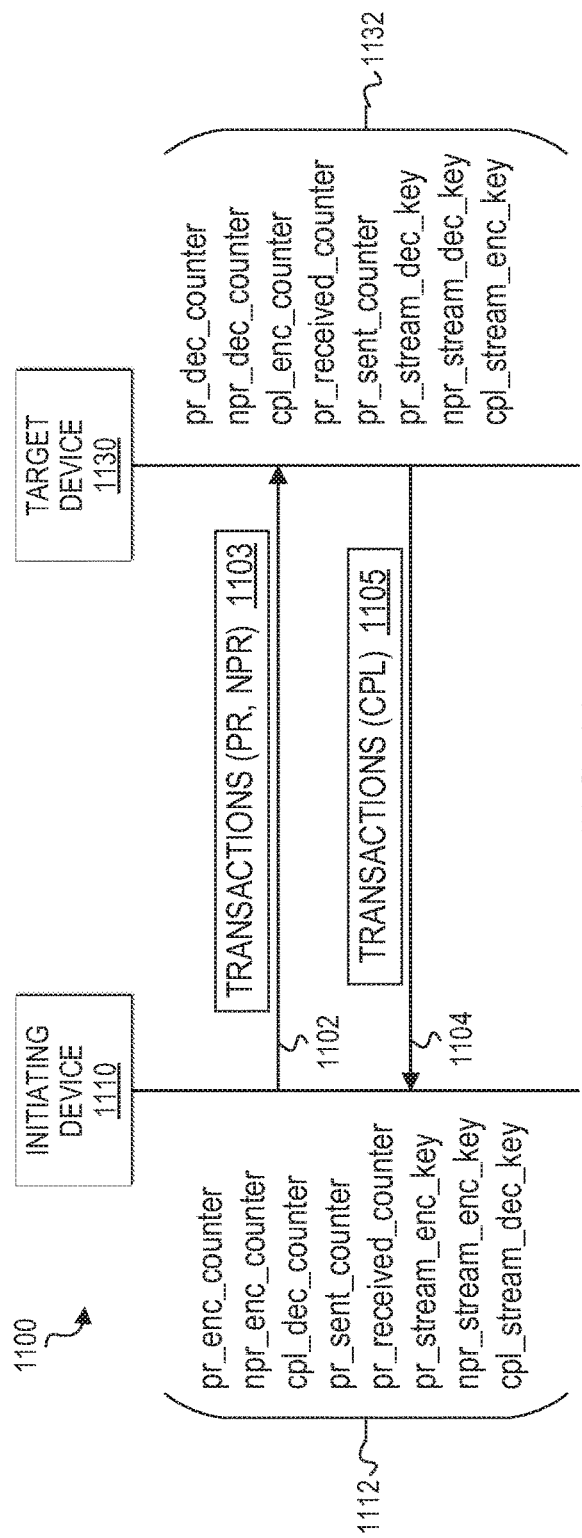
FIG. 11 is an interaction diagram illustrating example counters and keys that may be used in a secure stream protocol according to at least one embodiment.

FIG. 11 is an interaction diagram 1100 that illustrates the various possible counters and keys that can be used a secure stream protocol operating in a restricted ordering mode (ROM) using three secure streams according to at least one embodiment. Interaction diagram 1100 shows an initiating device 1110 and a target device 1130. Two connections 1102 and 1104 are established between initiating device 1110 and target device 1130. Connections 1102 and 1104 can include one or more intermediate devices (e.g., switches, bridges), which are not shown for ease of illustration. Initiating device 1110 can send a transaction 1103 (e.g., posted or non-posted) to target device 1130 via connection 1102. In some scenarios, a transaction 1105 may be sent to initiating device 1110 from target device (e.g., completions) via connection 1104. Completion requests are sent in response to transactions that require a response, such as non-posted (NPR) transactions. For example, NPR transactions can include read requests or write requests that require a response.

The counters and keys shown in FIG. 11 may be used in an implementation of a secure stream protocol where each transaction type is treated as a separate protected stream with separate counters and keys. Three streams correspond respectively to posted transactions, non-posted transactions, and completion transactions. One or more embodiments may implement a counter-based scheme for encryption. Example counters and keys that may be used by initiating device 1110 are shown at 1112. Example counters and keys that may be used by target device 1130 are shown at 1132. For each direction of transaction flows, the initiating device and the target device of that direction maintain the following counters, which may be initialized during setup of the secure stream protocol:

COUNTERS FOR POSTED REQUESTS (pr_enc_counter, pr_dec_counter)—These counters can be 64 bit counters with a 32 bit random prefix. This counter pair can be used for authenticated encryption and decryption of posted requests.

COUNTERS FOR NON-POSTED REQUESTS (npr_enc_counter, npr_dec_counter)—These counters can be 64 bit counters with a 32 bit random prefix. This counter pair can be used for authenticated encryption and decryption of non-posted requests.

COUNTERS FOR COMPLETION REQUESTS (cpl_enc_counter, cpl_dec_counter)—These counters can be 64 bit counters with a 32 bit random prefix. This counter pair can be used for authenticated encryption and decryption of completion requests.

COUNTER FOR POSTED REQUESTS SENT (pr_sent_counter)—This counter can be a 16 bit counter. This counter can be used to detect dropped/delayed posted requests. This counter contains a value representing the number of posted requests sent since the last non-posted or completion request was sent. This counter also acts as a check to enforce producer-consumer ordering such that non-posted requests and completion requests are not reordered ahead of posted requests.

COUNTER FOR POSTED REQUESTS RECEIVED (pr_received_counter)—This counter can be a 32 bit counter. This counter can be used to detect dropped/delayed posted requests. This counter contains a value representing the number of posted requests received since the last non-posted or completion request was received. This counter also acts as a check to enforce producer-consumer ordering such that non-posted requests and completion requests are not reordered ahead of posted requests.

In addition to encryption and decryption counters, encryption and decryption keys for the secure stream protocol may be maintained at both the initiating device and the target device. The encryption and decryption keys may be initialized per session and a different pair of encryption keys may be initialized per transaction type. For example, for posted transactions (e.g., 1103) sent from initiating device 1110 to target device 1130, initiating device 1110 can maintain PR encryption key identified as pr_stream_enc_key for encrypting PR data to be sent to target device 1130, and target device 1130 can maintain a corresponding PR decryption key identified as pr_stream_dec_key for decrypting PR data received by initiating device 1110. The encryption and decryption can be performed in conjunction with the PR encryption and decryption counters, respectively. In addition, the PR encryption key and PR encryption counter can also be used by the initiating device to generate an integrity code value (ICV) over the TLP (e.g., TLP secure stream prefix, TLP header(s), encrypted data). The target device that receives the posted transaction can use the corresponding PR decryption key and PR decryption counter to verify the ICV of the received posted transaction.

For non-posted transactions (e.g., 1103) sent from initiating device 1110 to target device 1130, initiating device 1110 can maintain NPR encryption key identified as npr_stream_enc_key for encrypting NPR data to be sent, and target device 1130 can maintain a corresponding NPR decryption key identified as npr_stream_dec_key for decrypting received NPR data. The encryption and decryption can be performed in conjunction with the NPR encryption and decryption counters, respectively. In addition, the NPR encryption key and NPR encryption counter can also be used by the initiating device to generate an integrity code value (ICV) over the TLP (e.g., TLP secure stream prefix, TLP header(s), encrypted data). The target device that receives the non-posted transaction can use the corresponding NPR decryption key and NPR decryption counter to verify the ICV of the received non-posted transaction.

For completion transactions sent from target device 1130 to initiating device 1110, target device 1130 can maintain a CPL encryption key identified as cpl_stream_enc_key for encrypting CPL data to be sent, and initiating device 1110 can maintain a corresponding CPL decryption key identified as cpl_stream_dec_key for decrypting received CPL data. The encryption and decryption can be performed in conjunction with the CPL encryption and decryption counters, respectively. In addition, the CPL encryption key and CPL encryption counter can also be used by the target device to generate an integrity code value (ICV) over the TLP (e.g., TLP secure stream prefix, TLP header(s), encrypted data). The initiating device that receives the completion transaction can use the corresponding CPL decryption key and CPL decryption counter to verify the ICV of the received completion transaction.

In at least one embodiment, symmetric encryption can be used. In this embodiment, for each pair of keys used for a type of transaction, the same key is used for both encryption and decryption. For example, pr_stream_enc_key is equivalent to pr_stream_dec_key, npr_stream_enc_key is equivalent to npr_stream_dec_key, and cpl_stream_enc_key is equivalent to cpl_stream_dec_key.

In one example, Advanced Encryption Standard-Galois Counter Mode (AES-GCM) of operation may be used to provide counter mode encryption of data and a message authentication code for the data. Counter mode encryption uses symmetric key cryptographic block ciphers. Generally, a block cipher is an encryption algorithm that uses a symmetric key to encrypt a block of data in a way that provides confidentiality or authenticity. A counter mode of operation turns a block cipher into a stream cipher. An input block, which is an initialization vector (IV) concatenated with a counter value, is encrypted with a key by a block cipher. The output of the block cipher is used to encrypt (e.g., by an XOR function) a block of plaintext to produce a ciphertext. Successive values of the IV and counter value are used to encrypt successive blocks of plaintext to produce additional blocks of ciphertext.

In addition to producing ciphertext from input data, the GCM operation also calculates a Galois message authentication code (GMAC). A GMAC, which is more generally referred to as a 'tag' or 'authentication tag', is a few bytes of information used to authenticate a message (or transaction). A GMAC is one example of an ICV that can be generated over the TLP packet (e.g., TLP secure stream prefix, TLP header(s), encrypted data). In at least one embodiment, a multiplier function is used to calculate a GMAC based on the ciphertext blocks produced from the encryption of the plaintext blocks. The GMAC can be appended to the ciphertext. While AES-GCM is one possible type of encryption and authentication technique that may be used in one or more embodiments, it should be apparent to those in the art that any other suitable type of encryption and authentication may also be used (e.g., SHA-3, Hash message authentication code (HMAC), etc.).

Although the embodiment described above offers one possible approach in which the same encryption/decryption keys and counters are used to encrypt and decrypt data in a TLP and to verify the integrity of the TLP, it should be noted that any other suitable encryption/decryption and integrity verification schemes may be implemented to secure a transaction in a secure stream. In another embodiment for example, a different key may be used for encryption and ICV generation for each packet type. That is, encryption of a posted request payload may be done with a first posted key, and ICV generation over the posted request payload, header, and prefix may be done using a second posted key, which is different than the first posted key. Encryption of a non-posted request payload may be done with a first non-posted key, and ICV generation over the non-posted request payload, header, and prefix may be done using a second non-posted key, which is different than the first non-posted key. Encryption of a completion request payload may be done with a first completion key, and ICV generation over the completion request payload, header, and prefix may be done using a second completion key, which is different than the first completion key. It should be noted that an ICV can be generated over a TLP secure stream prefix, a TLP header (or headers if more than one is used), and encrypted payload data. However, in some embodiments, other fields of the TLP may also be included in the ICV (e.g., ECRC 1014).

Figure 12:
FIG. 12 illustrates a possible format of a TLP secure stream prefix that may be carried by each transaction according to at least one embodiment.

FIG. 12 illustrates a possible format of a TLP secure stream prefix 1200 that may be carried by each transaction in a system implementing a secure stream protocol operating in restricted ordering mode using either two secured streams or three secured streams according to at least one embodiment. The format includes a sec-stream prefix indicator 1202, a sec-stream prefix header 1204, and a pr_sent_counter value 1206. The pr_sent_counter value 1206 represents the number of posted transactions that have been sent from an initiating device to the target device since the last non-posted or completion transaction was sent from an initiating device to a target device. The sec-stream prefix indicator 1202 indicates a type of the TLP secure stream prefix 1200. For example, prefix indicator 1202 can indicate that TLP secure stream prefix 1200 contains information related to the secure stream protocol.

In at least one embodiment, three bits are defined in sec-stream header 1204. A first bit (e.g., BIT 0) may be a trusted bit that is an indication of whether the transaction is part of a trusted IO session. A trusted bit is used to differentiate software entities or functions at the two ends of a secure stream. The secure stream may be shared by trusted and non-trusted functions/software. Accordingly, the trusted bit indicates whether the transaction was originated by a trusted entity at one end (e.g., initiating device) and is to be consumed by a trusted entity on the other end (e.g., target device). For example, a device connected to a server platform and needing direct access to memory in a trust domain of the server platform may be a trusted entity. A memory storage controller is one possible example of a trusted entity.

A second bit (e.g., BIT 1) is an indication of whether pr_sent_counter value 1206 is included in TLP secure stream prefix 1200. In at least one embodiment, pr_sent_counter value 1206 is included in the TLP secure stream prefix for non-posted transactions and completion transactions and the second bit can be set to 1 to indicate the presence of the counter in the TLP secure stream prefix.

A third bit (e.g., BIT 2) may be used as an indication of whether the secure stream protocol is in a restricted ordering mode (ROM) or an explicit counter mode (ECM). In one example, if the third bit is set to 0, then the secure stream protocol is operating in the restricted ordering mode, and if the third bit is set to 1, then the secure stream protocol is operating in the explicit counter mode. When the mode is ECM, the counter used for encryption of data in a TLP and integrity verification of the TLP (e.g., pr_enc_counter, npr_enc_counter, cpl_enc_counter) may be carried as the first N bytes of the payload of the packet according to at least one embodiment.

Figure 13:
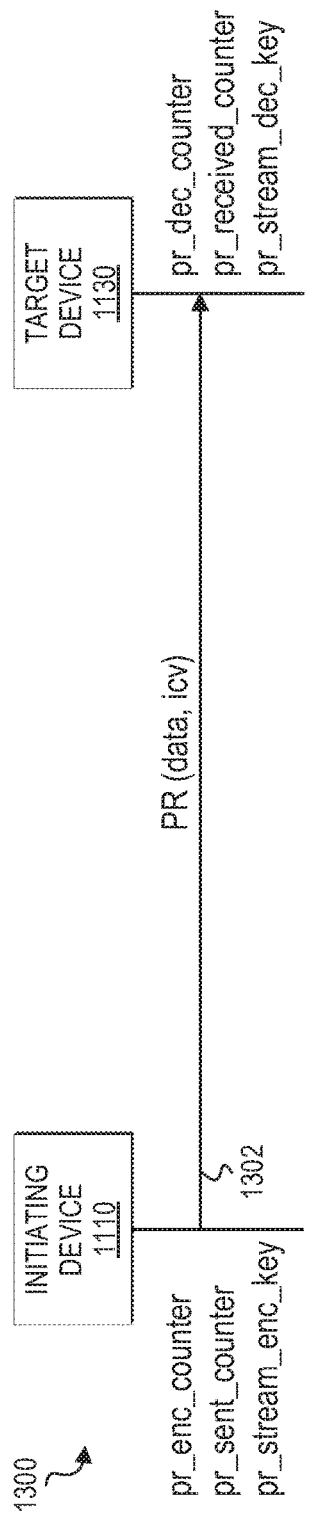
FIGS. 13-15 are interaction diagrams illustrating possible transactions in a secure stream protocol operating in restricted ordering mode using three streams according to at least one embodiment.
Figure 14:
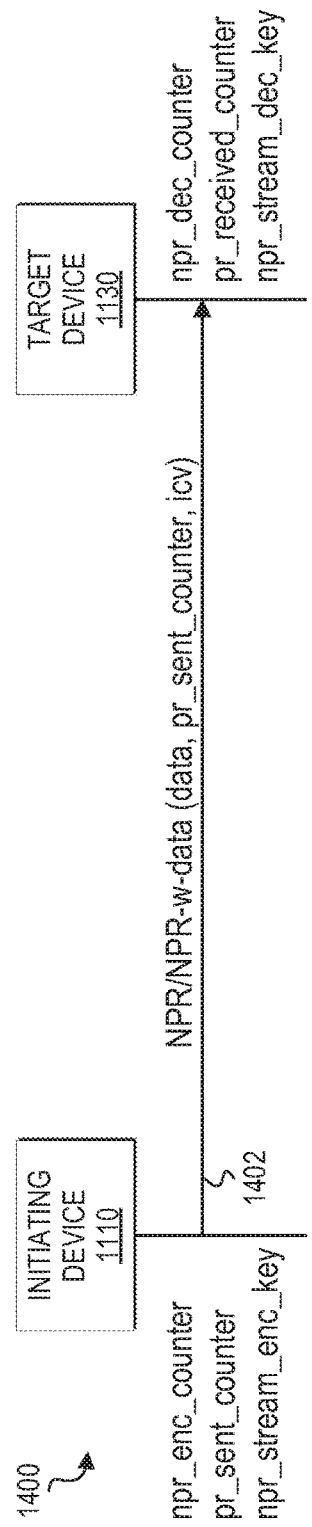
Figure 15:
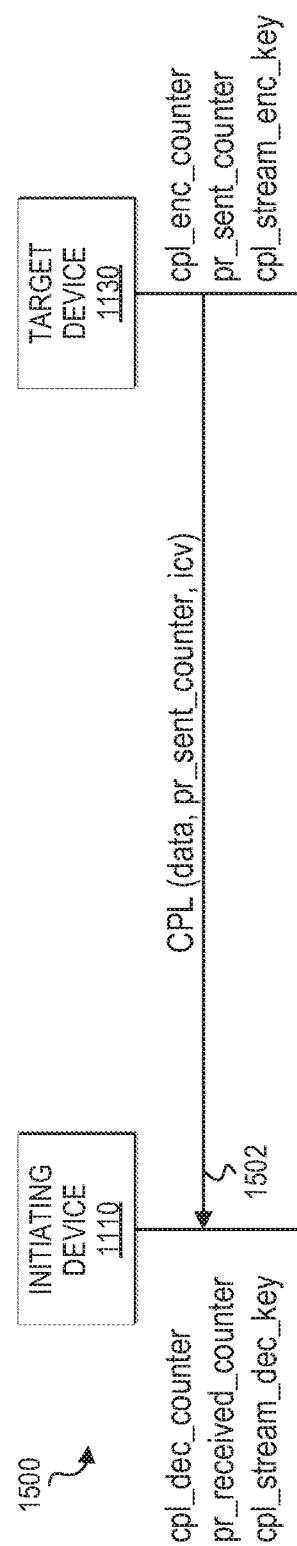

Turning to FIGS. 13-15, interaction diagrams illustrate the possible transactions that may occur in an interconnect architecture implementing a secure stream protocol operating in a restricted ordering mode (ROM) according to one or more embodiments. Transactions, counters, and keys illustrated in FIGS. 13-15 are based on a secure three-stream protocol implementation. The three streams correspond respectively to posted transactions, non-posted transactions, and completion transactions.

FIG. 13 is an interaction diagram 1300 illustrating a secure three-stream protocol for a posted request 1302 sent from initiating device 1110 to target device 1130. Initiating device 1110 samples its PR encryption counter (e.g., pr_enc_counter) and increments the sampled value. Initiating device 1110 also increments the value of its PR sent counter (e.g., pr_sent_counter). Sampling a counter can include obtaining the value of the counter and possibly storing it for quick access. Initiating device 1110 encrypts data of a transaction layer packet (TLP) used to form the posted request 1302. Encryption may be performed using the incremented value of the PR encryption counter and a PR encryption key (e.g., pr_stream_enc_key). An integrity code value (ICV), such as a MAC, is also computed over the TLP including the encrypted data, a TLP header, and a TLP secure stream prefix. Initiating device 1110 sends the posted request secured by the encrypted data and the ICV to target device 1130.

Target device 1130 samples the value of its PR decryption counter (e.g., pr_dec_counter) and increments the sampled value. Target device 1130 also increments the value of its PR received counter (e.g., pr_received_counter). Target device 1130 decrypts the data in the TLP of the received posted request using the incremented value of the PR decryption counter and a PR decryption key (e.g., pr_stream_dec_key).

In at least one embodiment, the encryption key and decryption key for posted requests are the same. Target device 1130 verifies the integrity of the TLP by verifying the ICV received for the TLP. In at least one embodiment, the ICV is a MAC, such as a GMAC, which is verified using the PR decryption counter and PR decryption key. In another embodiment, a different key and counter (e.g., pr_mac_key, pr_mac_counter) may be used to generate the ICV. If the ICV verification fails, then an error is raised (e.g., error message is logged, response to send to initiating device is generated, keys are reinitialized, etc.) Otherwise, the target device consumes the packet.

FIG. 14 is an interaction diagram 1400 illustrating a secure stream protocol operation for a non-posted request 1402 (with or without data) sent from initiating device 1110 to target device 1130. Initiating device 1110 samples the value of its NPR encryption counter (e.g., npr_enc_counter) and increments the sampled value. Initiating device 1110 also samples the value of its PR sent counter (e.g., pr_sent_counter) and then zeroes the value in the PR sent counter. Initiating device 1110 encrypts data of a TLP used to form non-posted request 1402. Encryption may be performed using the incremented value of the NPR encryption counter and an NPR encryption key (e.g., npr_stream_enc_key). An integrity code value (ICV), such as a MAC, is also computed over the TLP including the encrypted data, a TLP header, and a TLP secure stream prefix. Initiating device 1110 sends the non-posted request secured by the encrypted data and the ICV to target device 1130. In addition, the TLP also carries the sampled value of the PR sent counter to indicate how many posted requests have been sent by initiating device 1110 since the last non-posted or completion transaction.

Target device 1130 samples the value of its NPR decryption counter (e.g., npr_dec_counter) and increments the sampled value. Target device 1130 decrypts the data in the TLP of the received non-posted request using the incremented value of the NPR decryption counter and an NPR decryption key (e.g., npr_stream_dec_key). In at least one embodiment, the encryption key and decryption key for non-posted requests are the same. Target device 1130 verifies the integrity of the TLP by verifying the ICV received for the TLP. In at least one embodiment, the ICV is a MAC, which is verified using the incremented value of the NPR decryption counter and the NPR decryption key. If the ICV verification fails, then an error is raised (e.g., log an error message, generate a response to send to the target device, reinitialize keys, etc.). Otherwise, the value of a PR received counter (e.g., pr_received_counter) maintained by target device 1130 is decremented by the value of the PR sent counter in the TLP received from initiating device 1110. If the resulting value of the PR received counter is less than zero, this indicates that one or more posted requests have been dropped and/or delayed. Consequently, an error is raised (e.g., error message is logged, response is generated to notify initiating device, session is terminated, etc.). Otherwise the target device consumes the packet. In some embodiments, the PR received counter evaluation may occur before or parallel to the MAC verification.

FIG. 15 is an interaction diagram 1500 illustrating a secure stream protocol operation for a completion request 1502 sent from target device 1130 to initiating device 1110. Target device 1130 samples the value of its CPL encryption counter (e.g., cpl_enc_counter) and increments the sampled value. Target device 1130 also samples the value of its own PR sent counter (e.g., pr_sent_counter at target device 1130) and then zeroes the value in the PR sent counter. Target device 1130 encrypts data of a TLP used to form completion request 1502. Encryption may be performed using the incremented value of the CPL encryption counter and a CPL encryption key (e.g., cpl_stream_enc_key). An integrity code value (ICV), such as a MAC, is also computed over the TLP including the encrypted data, a TLP header, and a TLP secure stream prefix. Target device 1130 sends the completion request secured by the encrypted data and the ICV to target device 1130. In addition, the TLP also carries the sampled value of the PR sent counter to indicate how many posted requests have been sent by target device 1130 since the last non-posted or completion transaction was sent by target device 1130 to initiating device 1110.

Initiating device 1110 samples the value of its CPL decryption counter (e.g., cpl_dec_counter) and increments the sampled value. Initiating device 1110 decrypts the data in the TLP of the received completion request using the incremented value of the CPL decryption counter and a CPL decryption key (e.g., cpl_stream_dec_key). In at least one embodiment, the encryption key and decryption key for completion requests are the same. Initiating device 1110 verifies the integrity of the TLP by verifying the ICV received for the TLP. In at least one embodiment, the ICV is a MAC, which is verified using the incremented value of the CPL decryption counter and the CPL decryption key. If the ICV verification fails, then an error is raised (e.g., error message is logged, response to send to the target device is generated, keys are reinitialized, etc.). Otherwise, the value of a PR received counter (e.g., pr_received_counter) maintained by initiating device 1110 is decremented by the value of the PR sent counter (e.g., pr_sent_counter) received from target device 1130. If the resulting value of the PR received counter is less than zero, this indicates that one or more posted requests have been dropped and/or delayed. Consequently, an error is raised (e.g., error message is logged, response is generated to notify initiating device, session is terminated, etc.). Otherwise the initiating device 1110 consumes the packet. In some embodiments, the PR received counter evaluation may occur before the MAC verification.

It should be noted that operations of initiating device 1110 and target device 1130 were described with reference to sending posted and non-posted requests from initiating device 1110 and sending completion transactions from the target device 1130 in response to the non-posted transactions. It should be apparent, however, that initiating device 1110 can operate as a target device and that target device 1130 can operate as an initiating device.

FIG. 16 is a table 1600 showing potential reordering rules for a secure stream protocol operating in a restricted ordering mode using two streams. Table 1600 includes rows A-C 1602 and columns 2-4 1604, which identify types of transactions (e.g., posted requests, non-posted requests, and completion requests). Non-posted requests can include two different kinds of transactions (i.e., non-posted read requests and non-posted read requests with data), which are consolidated in table 900 for simplicity. Like table 600 of FIG. 6, each cell 1610-1636 in table 1600 specifies possible rules of reordering for transactions that are enqueued in a PCIe switch (e.g., 820) and secured based on two streams defined for the secure stream protocol. The two streams include a posted and completion stream and a non-posted stream.

In the example reordering rules shown in table 1600, reordering by the PCIe switch is required for posted requests and completion requests passing non-posted requests. This is indicated by the "YES" in cells 1612 and 1632. In at least one embodiment, reordering is allowed in these scenarios to avoid deadlocks. If reordering was not allowed for these scenarios, significant modifications may be needed to PCIe operation. It should also be noted that allowing reordering indicated by cells 1612, and 1632 implies that separate counters are required for non-posted requests versus posted requests and completion requests.

No other reordering is allowed in table 1600. As indicated by the "NO" in cells 1610, 1620, and 1630, no requests are allowed to pass posted requests. Note that, in ECM, this reordering could be allowed. The rules that prevent non-posted and completion requests from passing posted requests (i.e., 1620 and 1630) help to enforce producer-consumer ordering. Because it is rarely beneficial for non-posted requests to pass non-posted requests or for completion requests to pass completion requests, these types of reordering are not allowed as indicated by the "NO" in cells 1622 and 1636. Also, as indicated by the "NO" in cells 1614 and 1624, posted requests and non-posted requests are not allowed to pass completion requests.

These restricted ordering rules are one possible example of rules that may be used to simplify end-to-end security at a minimum performance impact. The restricted ordering rules along with tracking posted requests help avoid deadlocks that may occur and ensure that transactions within a particular stream are received by a target device in the order in which they were sent by an initiating device. The rules in table 1600 are more restrictive than the rules shown in table 900 of FIG. 9.

FIG. 17 is an interaction diagram 1700 that illustrates the various possible counters and keys that can be used in an alternative example implementation of a secure stream protocol operating in a restricted ordering mode using two secure streams according to at least one embodiment. Interaction diagram 1700 shows an initiating device 1710 and a target device 1730. Two connections 1702 and 1704 are established between initiating device 1710 and target device 1730. Connections 1702 and 1704 can include one or more intermediate devices (e.g., switches, bridges), which are not shown for ease of illustration. Initiating device 1710 can send a transaction 1703 (e.g., posted or non-posted) to target device 1730 via connection 1702. In some scenarios, a transaction 1705 may be sent to initiating device 1710 from target device (e.g., completions) via connection 1704. Completion requests 1705 are sent in response to transactions that require a response, such as non-posted (NPR) transactions. For example, NPR transactions can include read requests or write requests that require a response.

The counters and keys shown in FIG. 17, may be used in an implementation of a secure two-stream protocol, rather than a secure three-stream protocol. In the secure two-stream protocol, posted transactions and completion transactions together are treated as a separate protected stream, and non-posted transactions are treated as a separate protected stream. Example counters and keys that may be used by initiating device 1710 with a secure two-stream protocol implementation are shown at 1712. Example counters and keys that may be used by target device 1730 with a secure two-stream protocol implementation are shown at 1732. For each direction of transaction flows, the initiating device and the target device of that direction maintain the following counters, which may be initialized during setup of the secure stream protocol:

COUNTERS FOR POSTED REQUESTS AND COMPLETION REQUESTS (pr_cpl_enc_counter, pr_cpl_dec_counter)—These counters can be 64 bit counters with a 32 bit random prefix. This counter pair can be used for authenticated encryption of posted requests and completion requests.

COUNTERS FOR NON-POSTED REQUESTS (npr_enc_counter, npr_dec_counter)—These counters can be 64 bit counters with a 32 bit random prefix. This counter pair can be used for authenticated encryption of non-posted requests.

COUNTER FOR POSTED AND COMPLETION REQUESTS SENT (pr_cpl_sent_counter)—This counter can be a 16 bit counter. This counter can be used to detect dropped/delayed posted requests (e.g., improper read-pass-write reordering). This counter is a value representing the number of posted requests and completion requests sent since the last non-posted request was sent. This counter also acts as a check to enforce producer-consumer ordering such that non-posted requests are not reordered ahead of posted requests. Note that in a two-stream model, since posted and completion requests are in one ordered stream, any reordering of posted and completion requests can lead to an ICV verification failure.

COUNTER FOR POSTED AND COMPLETION REQUESTS RECEIVED (pr_cpl_received_counter)—This counter can be a 32 bit counter. This counter can be used to detect dropped/delayed posted requests (e.g., improper read-pass-write reordering). This counter is a value representing the number of posted requests and completion requests received since the last non-posted request was received. This counter also acts as a check to enforce producer-consumer ordering such that non-posted requests are not reordered ahead of posted requests. Note that in a two-stream model, since posted and completion requests are in one ordered stream, any reordering of posted and completion requests can lead to an ICV verification failure.

In addition to encryption and decryption counters, encryption and decryption keys for the secure stream protocol may be maintained at both the initiating device and the target device. The encryption and decryption keys may be initialized per session and a different pair of encryption keys may be initialized per stream. For example, for posted transactions (e.g., 1703) and completion transactions (not shown in FIG. 17) sent from initiating device 1710 to target device 1730, initiating device 1710 can maintain PR-CPL encryption key identified as pr_cpl_stream_enc_key for encrypting PR data and CPL data to be sent to target device 1730. Target device 1730 can maintain a corresponding PR-CPL decryption key identified as pr_cpl_stream_dec_key for decrypting PR data and CPL data received from initiating device 1710. The encryption and decryption can be performed in conjunction with the PR-CPL encryption and decryption counters, respectively. In addition, the PR-CPL encryption key and PR-CPL encryption counter can also be used by the initiating device to generate an integrity code value (ICV) over the TLP (e.g., TLP secure stream prefix, TLP header(s), encrypted data). The target device that receives the posted transaction can use the corresponding PR-CPL decryption key and PR-CPL decryption counter to verify the ICV of the received posted transaction.

For completion transactions (e.g., 1705) sent from target device 1730 to initiating device 1710, target device 1730 can maintain PR-CPL encryption key identified as pr_cpl_stream_enc_key for encrypting CPL data to be sent to initiating device 1710. Initiating device 1710 can maintain a corresponding PR-CPL decryption key identified as pr_cpl_stream_dec_key for decrypting CPL data received from target device 1730. The encryption can be performed in conjunction with the PR-CPL encryption counter maintained by target device 1730, and the decryption can be performed in conjunction with PR-CPL decryption counter maintained by initiating device 1710. In addition, the PR-CPL encryption key and PR-CPL encryption counter can also be used by the target device to generate an integrity code value (ICV) over the TLP (e.g., TLP secure stream prefix, TLP header(s), encrypted data). The initiating device that receives the completion transaction can use the corresponding PR-CPL decryption key and PR-CPL decryption counter to verify the ICV of the received completion transaction.

For non-posted transactions (e.g., 1703) sent from initiating device 1710 to target device 1730, initiating device 1710 can maintain NPR encryption key identified as npr_stream_enc_key for encrypting NPR data to be sent to target device 1730, and target device 1730 can maintain a corresponding NPR decryption key identified as npr_stream_dec_key for decrypting NPR data received from initiating device 1710. The encryption and decryption can be performed in conjunction with the NPR encryption and decryption counters, respectively. In addition, the NPR encryption key and NPR encryption counter can also be used by the initiating device to generate an integrity code value (ICV) over the TLP (e.g., TLP secure stream prefix, TLP header(s), encrypted data). The target device that receives the non-posted transaction can use the corresponding NPR decryption key and NPR decryption counter to verify the ICV of the received non-posted transaction.

In at least one embodiment, symmetric encryption can be used. In this embodiment, for each pair of keys used for a type of transaction, the same key is used for both encryption and decryption. For example, for posted and completion transactions flowing from initiating device 1710 to target device 1730, pr_cpl_stream_enc_key at initiating device 1710 is equivalent to pr_cpl_stream_dec_key at target device 1730, pr_cpl_stream_enc_key at target device 1730 is equivalent to pr_cpl_stream_dec_key at initiating device 1710, and npr_stream_enc_key is equivalent to npr_stream_dec_key. Also, as previously described herein, Advanced Encryption Standard-Galois Counter Mode (AES-GCM) of operation may be used to provide counter mode encryption of data and an integrity counter value in the form of a message authentication code for the data. Additionally, as previously described herein, any other suitable encryption/decryption and integrity verification schemes may be used in one or more embodiments. In particular, for each stream, a different key may be used for encryption and ICV generation for packets in that stream.

It should also be noted that a TLP secure stream prefix in the two-stream embodiment may have the same format as TLP secure stream prefix 1200 of FIG. 12. In a two-stream embodiment, however, field 1206 can contain the PR-CPL counter value (rather than the PR counter value in the three-stream embodiment). Also, the second bit (bit 1) can be set to 1 to indicate the presence of the PR-CPL counter value in the TLP secure stream prefix and can be set to 0 to indicate the absence of the PR-CPL counter value.

Figure 18:
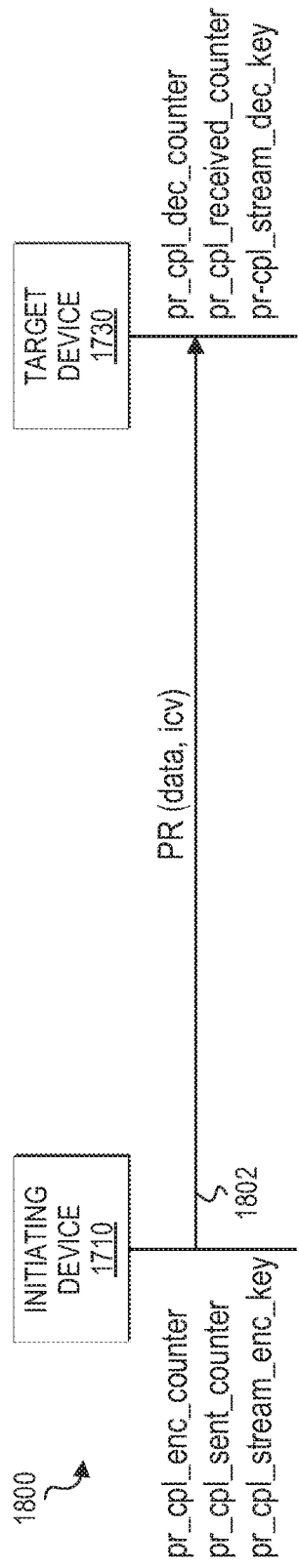
FIGS. 18-20 are interaction diagrams illustrating possible transactions in a secure stream protocol operating in a restricted ordering mode using two streams according to at least one embodiment.
Figure 19:
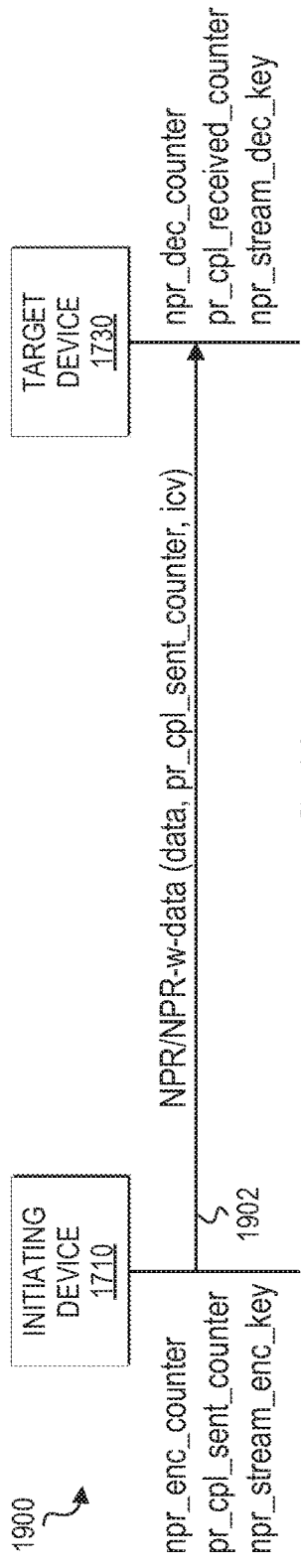
Figure 20:
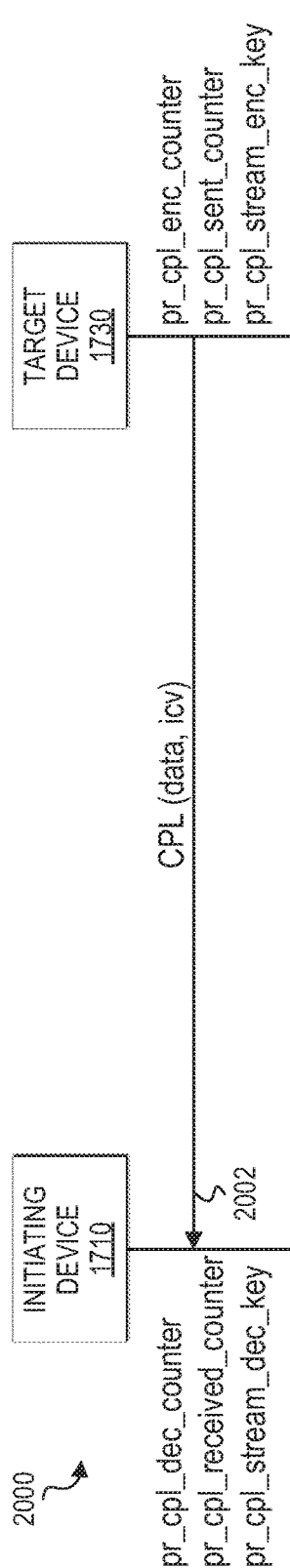

Turning to FIGS. 18-20, interaction diagrams illustrate the possible transactions that may occur in an interconnect architecture implementing a secure stream protocol configured in a restricted ordering mode according to the present disclosure. Transactions, counters, and keys illustrated in FIGS. 18-20 are based on a secure two-stream protocol implementation. The two streams correspond respectively to posted and completion transactions combined, and to non-posted transactions.

FIG. 18 is an interaction diagram 1800 illustrating a secure two-stream protocol for a posted request 1802 sent from initiating device 1710 to target device 1730. Initiating device 1710 samples its PR-CPL encryption counter (e.g., pr_cpl_enc_counter) and increments the sampled value. Initiating device 1710 also increments the value of its PR-CPL sent counter (e.g., pr_cpl_sent_counter at initiating device 1710). Sampling a counter can include obtaining the value of the counter and possibly storing the value for quick access. Initiating device 1710 encrypts data of a transaction layer packet (TLP) used to form posted request 1802. Encryption may be performed using the incremented value of the PR-CPL encryption counter and a PR-CPL encryption key (e.g., pr_cpl_stream_enc_key). An integrity code value (ICV), such as a MAC, is also computed over the TLP including the encrypted data, a TLP header, and a TLP secure stream prefix. Initiating device 1710 sends the posted request secured by the encrypted data and the ICV to target device 1730.

Target device 1730 samples the value of its PR-CPL decryption counter (e.g., pr_cpl_dec_counter) and increments the sampled value. Target device 1730 also increments the value of its PR-CPL received counter (e.g., pr_cpl_received_counter). Target device 1730 decrypts the data in the TLP of the received posted request using the incremented value of the PR-CPL decryption counter and a PR-CPL decryption key (e.g., pr_cpl_stream_dec_key). In at least one embodiment, the encryption key and decryption key for posted requests are the same. Target device 1730 verifies the integrity of the TLP by verifying the ICV received for the TLP. In at least one embodiment, the ICV is a MAC, which is verified using the PR-CPL decryption counter and PR-CPL decryption key. If the ICV verification fails, then an error is raised (e.g., error message is logged, response to send to initiating device is generated, keys are reinitialized, etc.) Otherwise, the target device consumes the packet.

FIG. 19 is an interaction diagram 1900 illustrating a secure two-stream protocol operation for a non-posted request 1902 (with or without data) sent from initiating device 1710 to target device 1730. Initiating device 1710 samples the value of its NPR encryption counter (e.g., npr_enc_counter) and increments the sampled value. Initiating device 1710 also samples the value of its PR-CPL sent counter (e.g., pr_cpl_sent_counter) and then zeroes the value in the PR-CPL sent counter. Initiating device 1710 encrypts data of a TLP used to form non-posted request 1902. Encryption may be performed using the incremented value of the NPR encryption counter and an NPR encryption key (e.g., npr_stream_enc_key). An integrity code value (ICV), such as a MAC, is computed over the TLP including the encrypted data, a TLP header, and a TLP secure stream prefix. Initiating device 1710 sends the non-posted request secured by the encrypted data and the ICV to target device 1730. In addition, the TLP also carries the sampled value of the PR-CPL sent counter to indicate how many posted requests and completion requests have been sent by initiating device 1710 since the last non-posted transaction.

Target device 1730 samples its NPR decryption counter (e.g., npr_dec_counter) and increments the sampled value. Target device 1730 decrypts the data in the TLP of the received non-posted request using the incremented value of the NPR decryption counter and an NPR decryption key (e.g., npr_stream_dec_key). In at least one embodiment, the encryption key and decryption key for non-posted requests are the same. Target device 1730 verifies the integrity of the TLP by verifying the ICV received for the TLP. In at least one embodiment, the ICV is a MAC, which is verified using the incremented value of the NPR decryption counter and the NPR decryption key. If the ICV verification fails, then an error is raised (e.g., log an error message, generate a response to send to the target device, reinitialize keys, etc.). Otherwise, the value of a PR-CPL received counter (e.g., pr_cpl_received_counter) maintained by target device 1730 is decremented by the value of the PR-CPL sent counter in the TLP received from initiating device 1710. If the resulting value of the PR-CPL received counter is less than zero, this indicates that one or more posted requests or completion requests have been dropped and/or delayed. Consequently, an error is raised (e.g., error message is logged, response is generated to notify initiating device, session is terminated, etc.). Otherwise, the target device consumes the packet. In some embodiments, the PR-CPL received counter evaluation may occur before or parallel to the ICV verification.

FIG. 20 is an interaction diagram 2000 illustrating a secure two-stream protocol operation for a completion request 2002 sent from target device 1730 to initiating device 1710. Target device 1730 samples the value of its PR-CPL encryption counter (e.g., pr_cpl_enc_counter) and increments the sampled value. Target device 1730 also samples the value of its own PR-CPL sent counter (e.g., pr_cpl_sent_counter at target device 1730) and then zeroes the value of its PR-CPL sent counter. Target device 1730 encrypts data of a TLP used to form completion request 2002. Encryption may be performed using the incremented value of the PR-CPL encryption counter and a PR-CPL encryption key (e.g., pr_cpl_stream_enc_key). An integrity code value (ICV), such as a MAC, is also computed over the TLP including the encrypted data, a TLP header, and a TLP secure stream prefix. Target device 1730 sends the completion request secured by the encrypted data and the ICV to initiating device 1110.

Initiating device 1710 samples its PR-CPL decryption counter (e.g., pr_cpl_dec_counter) and increments the sampled value. Initiating device 1710 decrypts the data in the TLP of the received completion request using the incremented value of the PR-CPL decryption counter and a PR-CPL decryption key (e.g., pr_cpl_stream_dec_key). In at least one embodiment, the encryption key and decryption key for completion requests are the same. Initiating device 1710 verifies the integrity of the TLP by verifying the ICV received for the TLP. In at least one embodiment, the ICV is a MAC, which is verified using the incremented value of the PR-CPL decryption counter and the PR-CPL decryption key. If the ICV verification fails, then an error is raised (e.g., error message is logged, response to send to the target device is generated, keys are reinitialized, etc.). Otherwise the initiating device 1110 consumes the packet.

Figure 21:
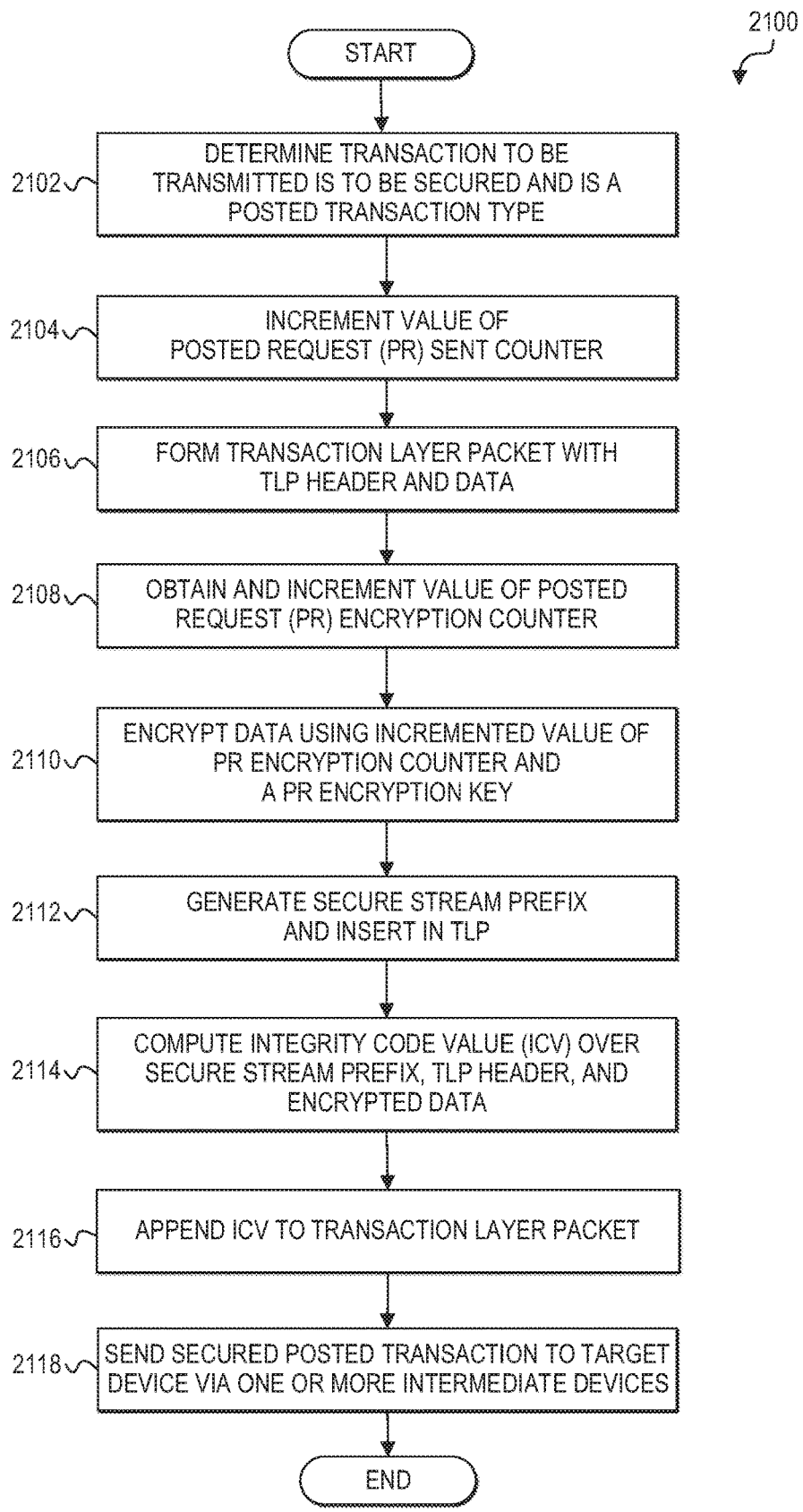
FIG. 21 is a simplified flow chart illustrating example operations that may be associated with a posted transaction and a secure stream protocol according to at least one embodiment.

FIG. 21 is a flow chart illustrating a flow 2100 of example operations that may be associated with sending a posted transaction and using a secure stream protocol operating in a restricted ordering mode with three-streams according to at least one embodiment. In at least one embodiment, one or more operations correspond to activities of FIG. 21. An endpoint that is an initiating device (e.g., 1110, 710) including a layered protocol stack (e.g., 712, 714, 716), or a portion thereof, may perform or utilize the one or more operations. In one example, a transaction layer (e.g., 710, 205) including hardware and/or software at SEC-STREAM TLP insertion point (e.g., 713), or a portion thereof, of the initiating device performs or utilizes the one or more operations.

At 2102, the initiating device determines that a posted transaction is to be transmitted to a target device and is to be secured in a trusted session using a secure stream protocol operating in a restricted ordering mode. In addition, the initiating device may also determine whether the transaction is originating from a trusted entity. At 2104, a value of a posted request (PR) sent counter is incremented. PR sent counter represents the number of posted transactions that the initiating device has sent to the target device since a last non-posted or completion transaction was sent from the initiating device to the target device.

At 2106, a transaction layer packet (TLP) may be formed with data for the posted request. A TLP header including address and routing information is also included in the TLP. At 2108, the value of a PR encryption counter is obtained and incremented. At 2110, data in the TLP is encrypted using the incremented value of the PR encryption counter and a PR encryption key.

At 2112, a TLP secure stream prefix, which includes a prefix indicator and a prefix header, is generated and inserted in the TLP. The prefix indicator indicates that the secure stream prefix contains secure stream protocol information. The prefix header may include at least a trusted bit, a PR sent counter bit, and a mode bit. For a posted transaction, the trusted bit (e.g., set to 1) indicates that the packet is part of a trusted session, the PR sent counter bit (e.g., set to 0) indicates that a value of the PR sent counter is not included in the TLP secure stream prefix, and a mode bit (e.g., set to 1) indicates that the secure stream protocol is operating in restricted ordering mode.

At 2114, an integrity code value (ICV), is computed over the secure stream prefix, a TLP header, and the encrypted data. In one example, the use of AES-GCM encryption performs the encryption and generation of a message authentication code (MAC) in a block cipher stream. At 2116, the ICV can be appended to the transaction layer packet. At 2118, the initiating device sends the secured posted transaction to a target device over a serial link via one or more intermediate devices. In one example, the secured posted transaction traverses one or more intermediate devices as it is transmitted to the target device. The intermediate devices can use cleartext data in the transaction headers to route the transaction to the target device, without decrypting or otherwise ascertaining the payload data.

Figure 22A:
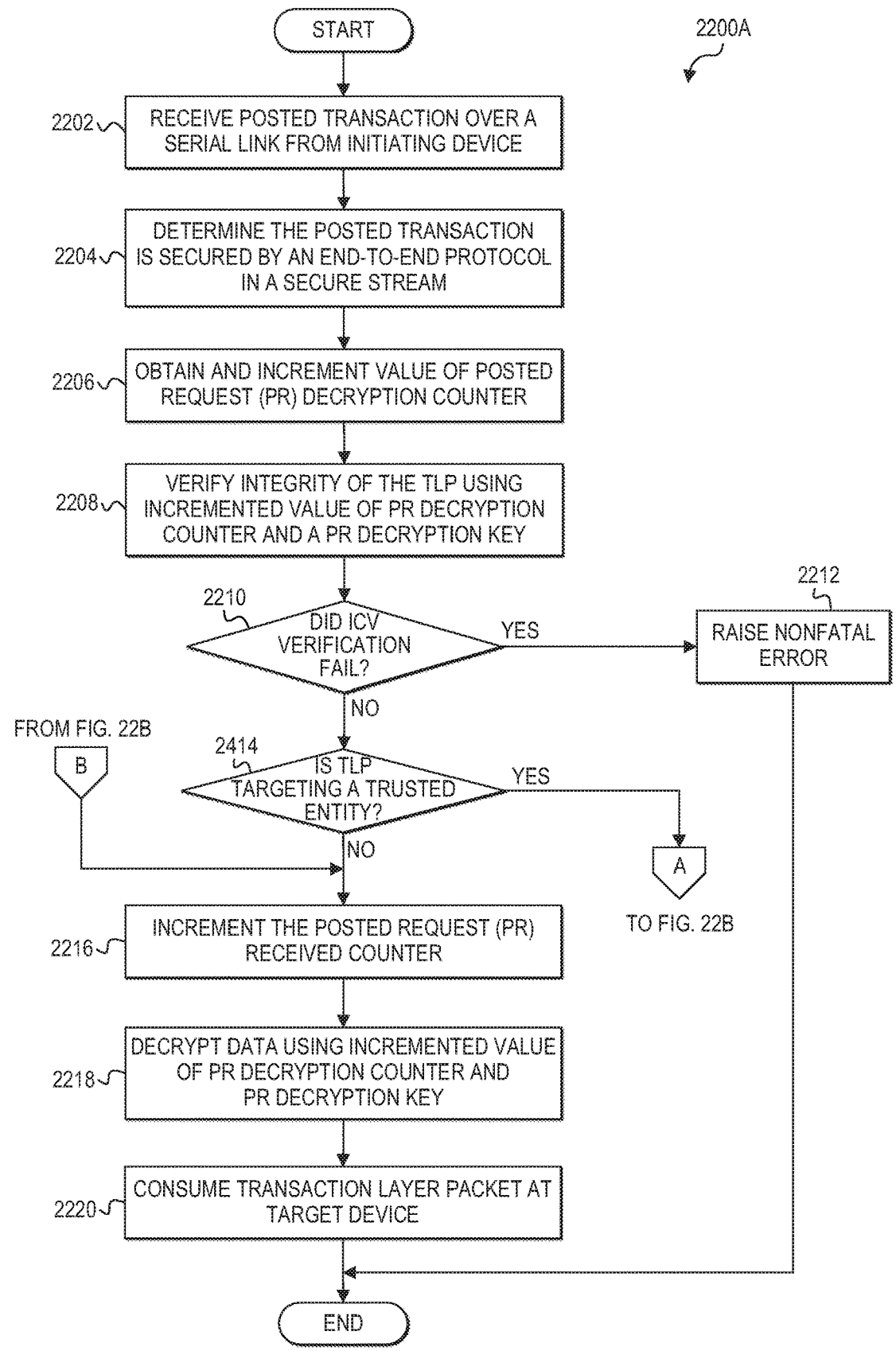
FIGS. 22A-22B are simplified flow charts illustrating further example operations that may be associated with a posted transaction and a secure stream protocol according to at least one embodiment.
Figure 22B:
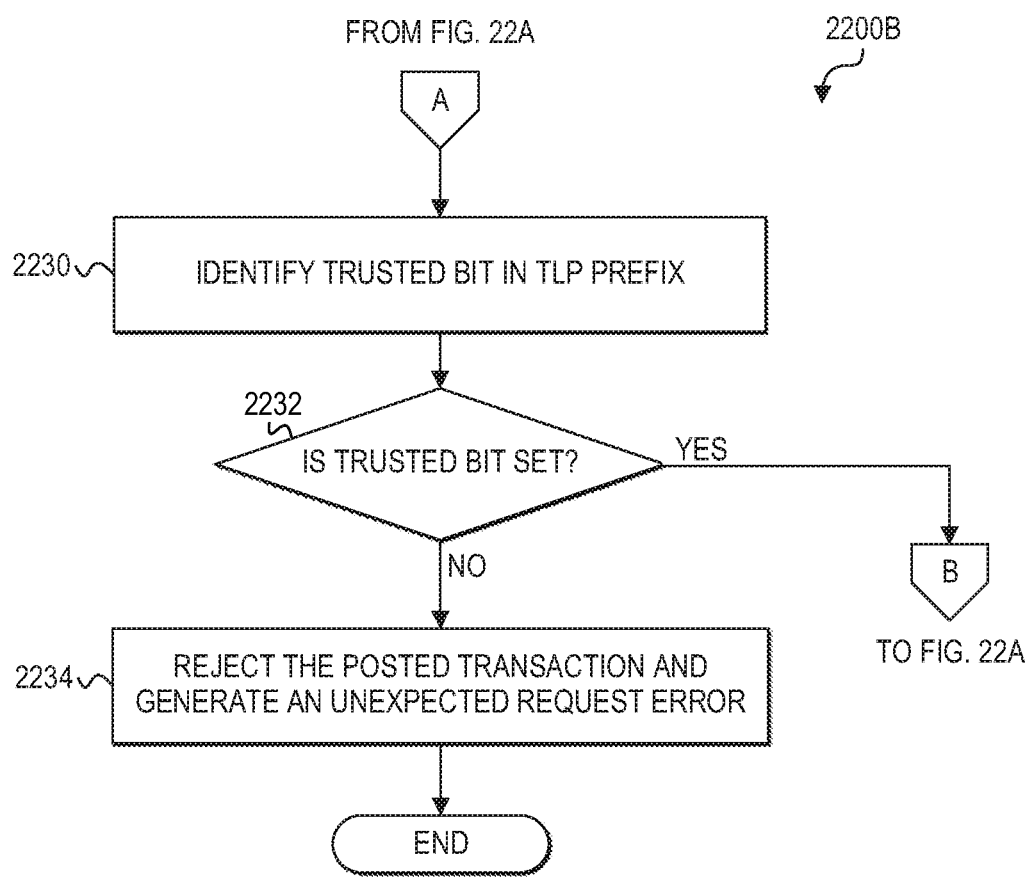

FIGS. 22A-22B are flow charts illustrating flows 2200A and 2200B of example operations that may be associated with receiving a posted transaction and using a secure stream protocol operating in a restricted ordering mode with three-streams according to at least one embodiment. In at least one embodiment, one or more operations correspond to activities of FIGS. 22A-22B. An endpoint that is a target device (e.g., 1130, 730) including a layered protocol stack (e.g., 732, 734, 736), or a portion thereof, may perform or utilize the one or more operations. In one example, a transaction layer (e.g., 730, 205) including hardware and/or software at SEC-STREAM TLP detection point (e.g., 733), or a portion thereof, of the target device performs or utilizes the one or more operations.

At 2202, target device receives a posted transaction from an initiating device over a serial link via one or more intermediate devices. At 2204, the target device determines that the posted transaction is secured in a secure stream for posted transactions by an end-to-end protocol operating in a restricted ordering mode. These determinations can be made based on the TLP secure stream prefix of the TLP of the posted transaction. In particular, the presence of the TLP secure stream prefix and the mode bit in the prefix header can be used to make these determinations.

At 2206, the value of a PR decryption counter maintained by the target device is obtained and incremented. At 2208, the integrity of the TLP is verified using the incremented value of the PR decryption counter and a PR decryption key. In one example, an integrity code value (ICV), is computed over the TLP, which includes a secure stream prefix, a TLP header, and encrypted data. At 2210, a determination is made as to whether the computed ICV is equivalent to the ICV appended to the TLP. If they are not equivalent, then verification fails, and at 2212, an error may be raised (e.g., error message is logged, generate response to send to initiating device, reinitialize keys, etc.). In one example, the use of AES-GCM encryption performs the encryption and generation of a message authentication code (MAC) in a block cipher stream.

If ICV verification does not fail (e.g., computed ICV is equivalent to the ICV of the posted transaction), then at 2214, a determination is made as to whether the transaction is targeting a trusted entity. For example, the TLP may be attempting to access an interface (e.g., virtual function, assignable device interface) configured in a trusted domain. If it is determined that the transaction is attempting to access a trusted entity, then flow may pass to 2230 in flow 2200B of FIG. 22B.

At 2230, a trusted bit in the TLP secure stream prefix (e.g., in the prefix header) is identified. At 2232, a determination is made as to whether the trusted bit is set. If the trusted bit is not set, then the transaction is targeting a trusted entity without an indication that it is itself a trusted entity. Accordingly, at 2234, the posted transaction is rejected, an unexpected request error may be generated, and the flow can end.

If it is determined at 2232 that the trusted bit is set, or if it is determined at 2414 that the transaction is not targeting a trusted entity, then at 2216 in FIG. 22A, the posted request (PR) received counter is incremented. At 2218, the encrypted data in the TLP is decrypted using the incremented value of the PR decryption counter and the PR decryption key. In one embodiment, symmetric encryption/decryption is used and so the PR decryption key at the target device is the same as the PR encryption key at the initiating device. Once the data is decrypted, at 2220, it may be consumed at the target device.

With some modifications, the flows of FIGS. 21 and 22A-22B are also applicable to a two-stream implementation of the secure stream protocol operating in restricted operating mode. In the two-stream implementation, the flows of FIGS. 21 and 22A-22B are applicable to both posted transactions and completion transactions, as these types of transactions are secured in a combined secure stream using the same encryption/decryption counters and the same encryption/decryption keys. In the two-stream embodiment, flow 2100 is performed if a transaction to be prepared and transmitted is determined to be either a posted transaction type or a completion transaction type. Flow 2200A is performed if a received transaction is determined to be either a posted transaction type or a completion transaction type. For either type of transaction, the flows are performed using the same encryption/decryption counters (e.g., pr_cpl_enc_counter, pr_cpl_dec_counter) and the same encryption/decryption keys (e.g., pr_cpl_stream_enc_key, pr_cpl_stream_dec_key), instead of the encryption/decryption counters (e.g., pr_enc_counter, pr_dec_counter) and encryption/decryption keys (e.g., pr_stream_enc_key, pr_stream_dec_key) that are used only for posted transactions. Also, in the two-stream embodiment, combined posted-completion sent and received counters (e.g., pr_cpl_sent_counter, pr_cpl_received_counter)

are used in flows 2100 and 2200A-2200B instead of posted sent and received counters (e.g., pr_sent_counter, pr_received_counter). The PR-CPL sent counter contains a value representing the number of posted requests and completion requests sent since the last non-posted request was sent. The PR-CPL received counter contains a value representing the number of posted requests and completion requests received since the last non-posted request was received.

Figure 23:
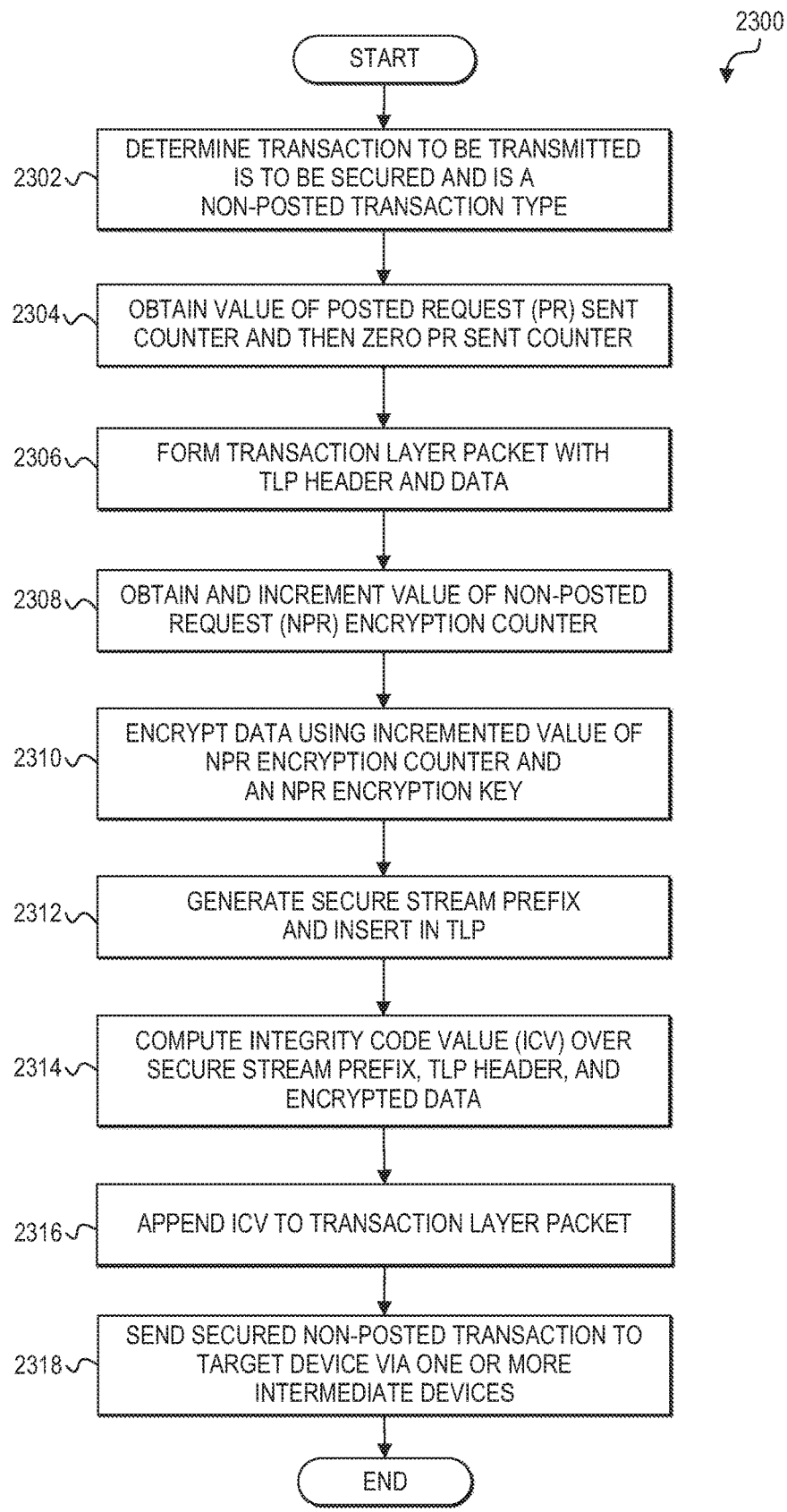
FIG. 23 is a simplified flow chart illustrating example operations that may be associated with a non-posted transaction and a secure stream protocol according to at least one embodiment.

FIG. 23 is a flow chart illustrating a flow 2300 of example operations that may be associated with a non-posted transaction and a secure stream protocol operating in a restricted ordering mode using three-streams according to at least one embodiment. In at least one embodiment, one or more operations correspond to activities of FIG. 23. An endpoint that is an initiating device (e.g., 1110, 710) including a layered protocol stack (e.g., 712, 714, 716), or a portion thereof, may perform or utilize the one or more operations. In one example, a transaction layer (e.g., 710, 205) including hardware and/or software at SEC-STREAM TLP insertion point (e.g., 713), or a portion thereof, of the initiating device performs or utilizes the one or more operations.

At 2302, the initiating device determines that a non-posted transaction is to be transmitted to a target device and is to be secured in a trusted session using a secure stream protocol operating in a restricted ordering mode. In addition, the initiating device may also determine whether the transaction is originating from a trusted entity. At 2304, a value of the PR sent counter maintained at the initiating device is obtained and the value in the PR sent counter is then zeroed.

At 2306, a transaction layer packet may be formed with data for the non-posted request. A TLP header including address and routing information is also included in the TLP. At 2308, the value of an NPR encryption counter is obtained and incremented. At 2310, data for the non-posted transaction is encrypted using the incremented value of the NPR encryption counter and an NPR encryption key.

At 2312, a TLP secure stream prefix, which includes a prefix indicator, a prefix header, and the obtained value of the PR sent counter, is generated and inserted in the TLP. The prefix indicator indicates that the secure stream prefix contains secure stream protocol information. The prefix header may include at least a trusted bit, a PR sent counter bit, and a mode bit. In this example, for a non-posted transaction, the trusted bit (e.g., set to 1) indicates that the packet is part of a trusted session, the PR sent counter bit (e.g., set to 1) indicates that a value of the PR sent counter is included in the TLP secure stream prefix, and a mode bit (e.g., set to 1) indicates that the secure stream protocol is operating in restricted ordering mode.

At 2314, an integrity code value (ICV), is computed over the secure stream prefix, the TLP header, and the encrypted data. In one example, the use of AES-GCM encryption performs the encryption and generation of a message authentication code (MAC) in a block cipher stream.

At 2316, the ICV can be appended to the TLP. At 2318, the initiating device sends the secured non-posted transaction to a target device over a serial link via one or more intermediate devices. In one example, the secured non-posted transaction traverses one or more intermediate devices as it is transmitted to the target device. The intermediate devices can use cleartext data in the transaction headers to route the transaction to the target device, without decrypting or otherwise ascertaining the payload data.

Figure 24A:
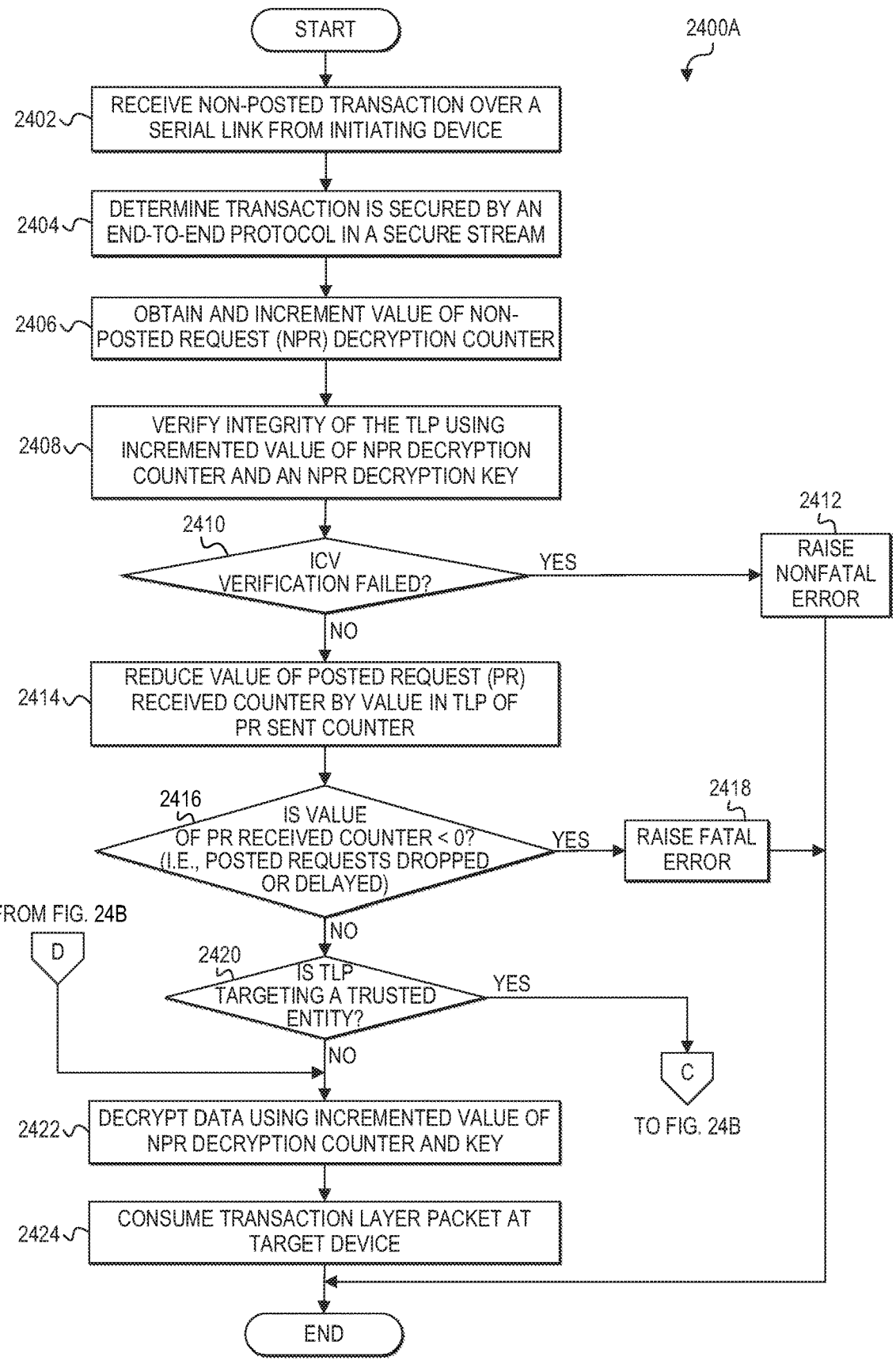
FIGS. 24A-24B are simplified flow charts illustrating further example operations that may be associated with a non-posted transaction and a secure stream protocol according to at least one embodiment.
Figure 24B:
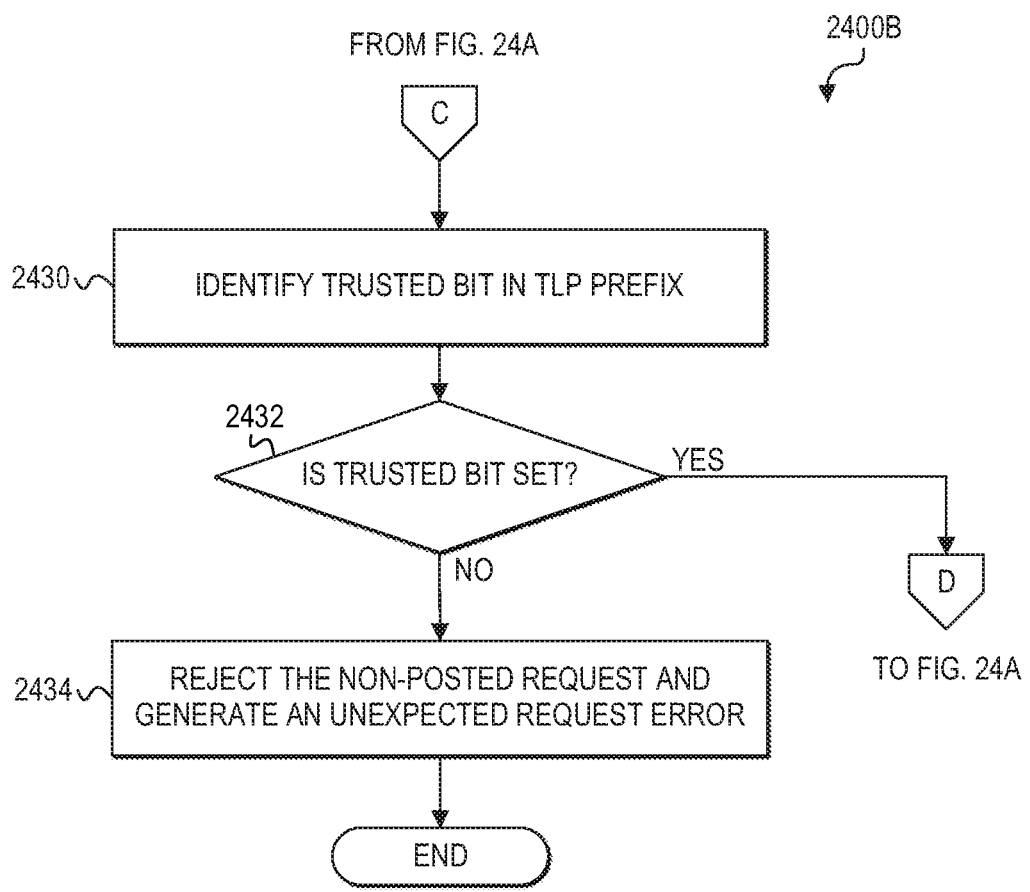

FIGS. 24A-24B are flow charts illustrating flows 2400A and 2400B of example operations that may be associated with receiving a non-posted transaction and using a secure stream protocol operating in a restricted ordering mode with three-streams according to at least one embodiment. In at least one embodiment, one or more operations correspond to activities of FIGS. 24A-24B. An endpoint that is a target device (e.g., 1130, 730) including a layered protocol stack (e.g., 732, 734, 736), or a portion thereof, may perform or utilize the one or more operations. In one example, a transaction layer (e.g., 730, 205) including hardware and/or software at SEC-STREAM TLP detection point (e.g., 733), or a portion thereof, of the target device performs or utilizes the one or more operations.

At 2402, a target device receives a non-posted transaction from an initiating device over a serial link via one or more intermediate devices. At 2404, the target device determines that the non-posted transaction is secured in a secure stream for non-posted transactions by an end-to-end protocol operating in a restricted ordering mode. These determinations can be made based on the TLP secure stream prefix of the transaction layer packet (TLP) of the non-posted transaction. In particular, the presence of the TLP secure stream prefix and the mode bit in the prefix header can be used to make the determinations.

At 2406, the value of an NPR decryption counter maintained by the target device is obtained and incremented. At 2408, the integrity of the TLP is verified using the incremented value of the NPR decryption counter and an NPR decryption key. In one example, an integrity code value (ICV), is computed over the TLP of the non-posted transaction, which includes a secure stream prefix, a TLP header, and encrypted data. At 2410, a determination is made as to whether the computed ICV is equivalent to the ICV appended to the TLP. If they are not equivalent, then verification fails, and at 2412, a nonfatal error may be raised (e.g., error message is logged, response is generated to send to initiating device, keys are reinitialized, etc.). In one example, the use of AES-GCM encryption performs the encryption and generation of a message authentication code (MAC) in a block cipher stream.

If ICV verification does not fail (e.g., computed ICV is equivalent to the ICV of the non-posted transaction), then at 2414, the value of a PR received counter maintained at the target device is reduced by the value of the PR sent counter contained in the secure stream prefix of the TLP. If the same number of posted requests were sent and received, then the resulting value of the PR received counter will be zero. If more posted requests were sent than were received, then the resulting value of the PR received counter will be negative, which indicates that at least some posted requests were dropped or delayed.

At 2416, a determination is made as to whether the resulting value of the PR received counter is less than zero, indicating that at least some posted requests were dropped or delayed. If so, then at 2418, a fatal error may be raised (e.g., error message is logged, response is generated to notify initiating device, session is terminated, etc.).

If a determination is made that the resulting value of the PR received counter is not less than zero, indicating that no posted transactions were dropped or delayed, then at 2420, a determination is made as to whether the non-posted transaction is targeting a trusted entity. For example, the TLP may be attempting to access an interface (e.g., virtual function, assignable device interface) configured in a trusted domain. If it is determined that the transaction is attempting to access a trusted entity, then flow may pass to 2430 in flow 2400B of FIG. 24B.

At 2430, a trusted bit in the TLP secure stream prefix (e.g., in the prefix header) is identified. At 2432, a determination is made as to whether the trusted bit is set. If the trusted bit is not set, then the transaction is targeting a trusted entity without an indication that it is itself a trusted entity. Accordingly, at 2434, the non-posted transaction is rejected and an unexpected request error may be generated.

If it is determined at 2432 that the trusted bit is set, or if it is determined at 2420 that the non-posted transaction is not targeting a trusted entity, then at 2422 in FIG. 24A, the encrypted data in the TLP is decrypted using the incremented value of the NPR decryption counter and the NPR decryption key. In one embodiment, symmetric encryption/decryption is used and so the NPR decryption key at the target device is the same as the NPR encryption key at the initiating device. Once the data is decrypted, at 2424, it may be consumed at the target device.

With some modifications, the flows of FIGS. 23 and 24A-24B are also applicable to a two-stream implementation of the secure stream protocol operating in restricted operating mode. In the two-stream implementation, the flows of FIGS. 23 and 24A-24B are also applicable to non-posted transactions. The encryption counter, encryption key, decryption counter, and decryption key can be the same as described in FIGS. 23 and 24A-24B for the three-stream embodiment. In the two-stream embodiment, flow 2300 is performed if a transaction to be prepared and transmitted is determined to be a non-posted transaction type. Flow 2400A is performed if a received transaction is determined to be a non-posted transaction type. The flows are performed using the same encryption/decryption counters (e.g., npr_enc_counter, npr_dec_counter) and encryption/decryption keys (e.g., npr_stream_enc_key, npr_stream_dec_key) as indicated in flows 2300 and 2400A-2400B. In the two-stream embodiment, however, sent and received counters that are combined for posted and completion transactions (e.g., pr_cpl_sent_counter, pr_cpl_received_counter) are used in flows 2300 and 2400A-2400B instead of sent and received counters for only posted transactions (e.g., pr_sent_counter, pr_received_counter). The PR-CPL sent counter contains a value representing the number of posted requests and completion requests sent since the last non-posted request was sent. The PR-CPL received counter contains a value representing the number of posted requests and completion requests received since the last non-posted request was received.

Figure 25:
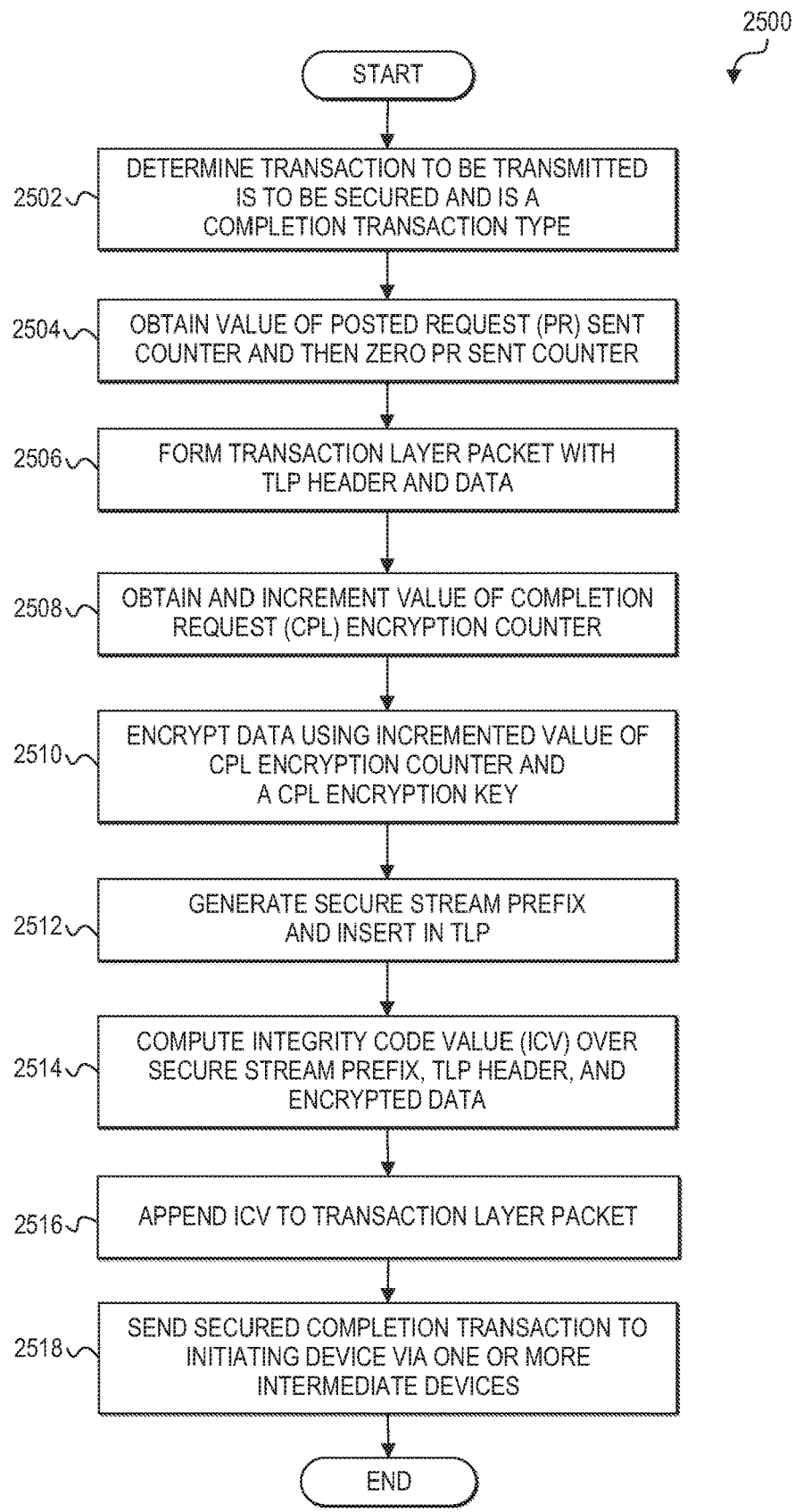
FIG. 25 is a simplified flow chart illustrating example operations that may be associated with a completion transaction and a secure stream protocol according to at least one embodiment.

FIG. 25 is a flow chart illustrating a flow 2500 of example operations that may be associated with sending a completion transaction using a secure stream protocol operating in a restricted ordering mode with three-streams according to at least one embodiment. In at least one embodiment, one or more operations correspond to activities of FIG. 25. In one example, an endpoint that is a target device (e.g., 1130, 730) of a previously received transaction requiring a response (e.g., non-posted transaction) and that includes a layered protocol stack (e.g., 732, 734, 736), or a portion thereof, may perform or utilize the one or more operations. In one example, a transaction layer (e.g., 732, 205) or a portion thereof, may perform or utilize the one or more operations. In one example, a transaction layer (e.g., 732, 205) including hardware and/or software at SEC-STREAM TLP insertion point (e.g., 733), or a portion thereof, of the target device performs or utilizes the one or more operations.

At 2502, the target device determines that a completion transaction is to be transmitted to an initiating device and is to be secured in a trusted session using a secure stream protocol operating in a restricted ordering mode. In addition, the target device may also determine whether the transaction is originating from a trusted entity. At 2504, a value of PR sent counter maintained at the target device is obtained and the value in the NPR sent counter is then zeroed.

At 2506, a transaction layer packet (TLP) may be formed with data for the completion transaction. A TLP header including address and routing information is also included in the TLP. At 2508, the value of a CPL encryption counter is obtained and incremented. At 2510, the data is encrypted using the incremented value of the CPL encryption counter and a CPL encryption key.

At 2512, a TLP secure stream prefix, which includes a prefix indicator, a prefix header, and the obtained value of the PR sent counter, is generated and inserted in the TLP. The prefix indicator indicates that the secure stream prefix contains secure stream protocol information. The prefix indicator indicates that the secure stream prefix contains secure stream protocol information. The prefix header may include at least a trusted bit, a PR sent counter bit, and a mode bit. In this example, for a completion transaction, the trusted bit (e.g., set to 1) indicates that the packet is part of a trusted session, the PR sent counter bit (e.g., set to 1) indicates that a value of the PR sent counter is included in the TLP secure stream prefix, and a mode bit (e.g., set to 1) indicates that the secure stream protocol is operating in restricted ordering mode.

At 2514, an integrity code value (ICV), is computed over the secure stream prefix, a TLP header (e.g., containing addressing/routing information for the packet), and the encrypted data. In one example, the use of AES-GCM encryption performs the encryption and generation of a message authentication code (MAC) in a block cipher stream.

At 2516, the ICV can be appended to the transaction layer packet. At 2518, the target device sends the secured completion transaction to the initiating device over a serial link via one or more intermediate devices. In one example, the secured completion transaction traverses one or more intermediate devices as it is transmitted to the initiating device. The intermediate devices can use cleartext data in the transaction headers to route the transaction to the initiating device, without decrypting or otherwise ascertaining the payload data.

Figure 26A:
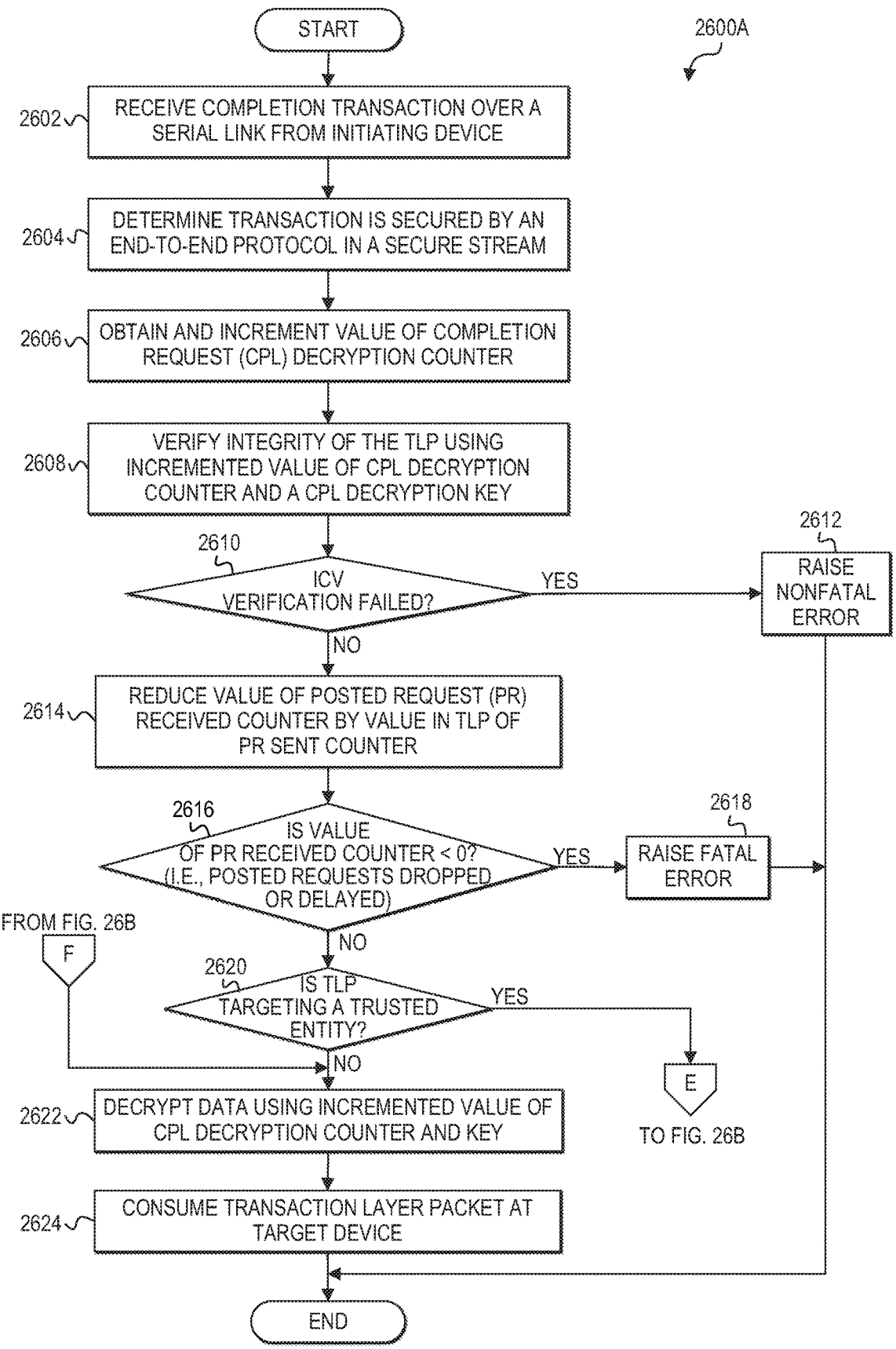
FIGS. 26A-26B are simplified flow charts illustrating further example operations that may be associated with a completion transaction and a secure stream protocol according to at least one embodiment.
Figure 26B:
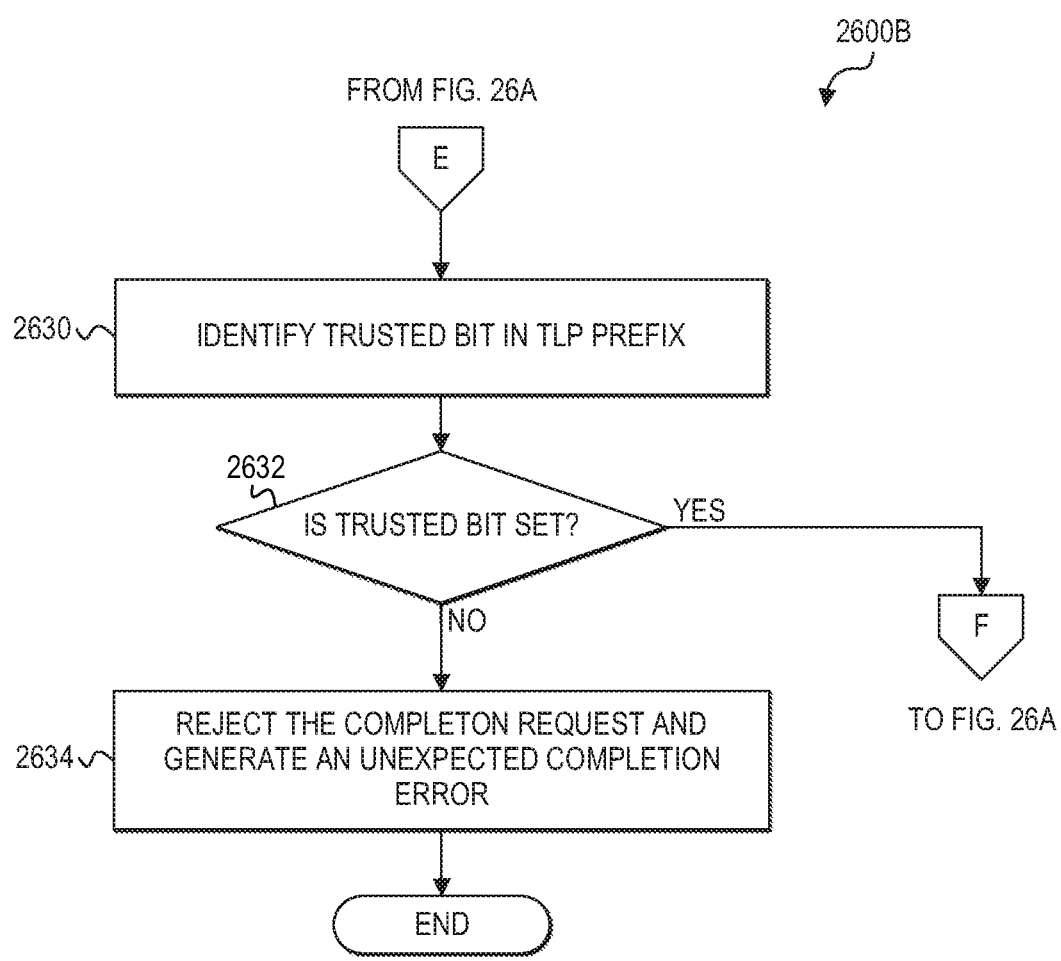

FIGS. 26A-26B are flow charts illustrating flows 2600A and 2600B of example operations that may be associated with receiving a completion transaction and using a secure stream protocol operating in a restricted ordering mode with three-streams according to at least one embodiment. In at least one embodiment, one or more operations correspond to activities of FIGS. 26A-26B. An endpoint that is an initiating device (e.g., 1110, 710) including a layered protocol stack (e.g., 712, 714, 716), or a portion thereof, may perform or utilize the one or more operations. In one example, a transaction layer (e.g., 712, 205) including hardware and/or software at SEC-STREAM TLP detection point (e.g., 713), or a portion thereof, of the initiating device performs or utilizes the one or more operations.

At 2602, an initiating device receives a completion transaction from a target device over a serial link via one or more intermediate devices. At 2604, the initiating device determines that the completion transaction is secured in a secure stream for completion transactions by an end-to-end protocol operating in a restricted ordering mode. These determinations can be made based on the TLP secure stream prefix of the transaction layer packet (TLP) of the completion transaction. In particular, the presence of the TLP secure stream prefix and the mode bit in the prefix header can be used to make the determinations.

At 2606, the value of a CPL decryption counter maintained by the initiating device is obtained and incremented. At 2608, the integrity of the TLP is verified using the incremented value of the CPL decryption counter and a CPL decryption key. In one example, an integrity code value (ICV), is computed over the TLP of the non-posted transaction, which includes a secure stream prefix, a TLP header, and encrypted data. At 2610 a determination is made as to whether the computed ICV is equivalent to the ICV appended to the TLP. If they are not equivalent, then verification fails, and at 2612, a nonfatal error may be raised (e.g., error message is logged, response is generated to send to target device, keys are reinitialized, etc.). In one example, the use of AES-GCM encryption performs the encryption and generation of a message authentication code (MAC) in a block cipher stream.

If ICV verification does not fail (e.g., computed ICV is equivalent to the ICV of the completion transaction), then at 2614, the value of a PR received counter maintained at the initiating device is reduced by the value of the PR sent counter contained in the secure stream prefix of the TLP. If the same number of posted requests were sent and received, then the resulting value of the PR received counter is zero. If more posted requests were sent than were received, then the resulting value of the PR received counter is negative, which indicates that at least some posted requests were dropped or delayed.

At 2616, a determination is made as to whether the resulting value of the PR received counter is less than zero, indicating that at least some posted requests were dropped or delayed. If so, then at 2418, a fatal error may be raised (e.g., error message is logged, response is generated to notify target device, session is terminated, etc.).

If a determination is made the resulting value of the PR received counter is not less than zero, indicating that no posted transactions were dropped or delayed, then at 2620, a determination is made as to whether the completion transaction is targeting a trusted entity. For example, the TLP may be attempting to access an interface (e.g., virtual function, assignable device interface) configured in a trusted domain. If it is determined that the completion transaction is attempting to access a trusted entity, then flow may pass to 2630 in flow 2600B of FIG. 26B.

At 2630, a trusted bit in the TLP secure stream prefix (e.g., in the prefix header) is identified. At 2632, a determination is made as to whether the trusted bit is set. If the trusted bit is not set, then the transaction is targeting a trusted entity without an indication that it is itself a trusted entity. Accordingly, at 2634, the completion transaction is rejected and an unexpected completion error may be generated.

If it is determined at 2632 that the trusted bit is set, or if it is determined at 2620 that the completion transaction is not targeting a trusted entity, then at 2622 in FIG. 26A, the encrypted data in the TLP is decrypted using the incremented value of the CPL decryption counter and the CPL decryption key. In one embodiment, symmetric encryption/decryption is used and so the CPL decryption key at the initiating device is the same as the CPL encryption key at the target device. Once the data is decrypted, it may be consumed at the initiating device at 2624.

Turning to FIGS. 27-29, interaction diagrams illustrate the possible transactions that may occur in an interconnect architecture implementing a secure stream protocol configured in an explicit counter mode (ECM) according to the present disclosure. Interaction diagrams 2700, 2800, and 2900 in FIGS. 27, 28, and 29 show an initiating device 2710 and a target device 2730, which may be configured in a similar manner as described with reference to initiating device 1110 and target device 1130 of FIG. 11. The keys illustrated in FIGS. 27-29 may be similar to the keys described with reference to FIG. 11. The encryption/decryption counters illustrated in FIGS. 27-29, however, may be shared by the endpoints. In addition, the endpoints may each include a tracking structure rather than a PR received counter to track the received posted requests.

When operating in explicit counter mode, switches disposed between endpoints (e.g., PCIe switch 820) are allowed to reorder packets. In order to detect dropped or replayed transactions, each endpoint is provisioned with a tracking structure to detect dropping or replaying of transactions. For example, initiating device 2710 is provisioned with a tracking structure 2712, and target device 2730 is provisioned with a tracking structure 2732, which are shown in FIGS. 27-29 based on their usage for the particular transactions that are illustrated. For each transaction, a sequence number is carried with the packet to enable the receiving device to track received packets, missing packets, and replayed packets. In at least one embodiment, the sequence number may be the counter that is used for encryption (e.g., pr_enc_counter, npr_enc_counter, cpl_enc_counter). In at least one embodiment, the sequence number can be carried as part of the TLP payload.

When a transaction is received at an endpoint, the tracking structure is searched to determine whether the sequence number in the packet has previously been received with a transaction. If the sequence number has not previously been received with a transaction, then the sequence number is added to the tracking structure. If the sequence number has previously been received with a transaction, then this indicates a replay is occurring and appropriate actions may be taken.

In at least some implementations, an endpoint may have a finite amount of capacity to track sequence numbers. To avoid having to track an infinitely large number of sequence numbers, the tracking structure may maintain a watermark scheme. In one example of a watermark scheme, once all packets up to a threshold sequence number have been received, a watermark may be updated and the sequence numbers lower than the watermark may be flushed out of the tracker structure. Sequence numbers sent with subsequent transactions can then be added to the tracking structure until all packets up to an updated threshold sequence number have been received and processing can continue as previously described to flush the tracking structure again.

The tracking structure can also be used to detect if a non-posted request or completion request has pushed all younger posted requests. For example, an endpoint can use its tracking structure to verify that the PR sent counter (e.g., pr_sent_counter) equals the number of posted requests that have been received by the endpoint since the last non-posted or completion request was received. If verification fails, where the PR sent counter does not equal the number of posted requests that have been received by the endpoint since the last non-posted or completion request was received, then an error can be raised (e.g., error message is logged, response is generated to notify initiating device, session is terminated, etc.). Otherwise the target device consumes the packet.

FIG. 27 is an interaction diagram 2700 illustrating a secure stream protocol operating in explicit counter mode for a posted request 2702 sent from initiating device 2710 to target device 2730. Initiating device 2710 samples the value of its PR encryption counter (e.g., pr_enc_counter) and increments the sampled value. Initiating device 2710 also increments its PR sent counter (e.g., pr_sent_counter). Sampling a counter can include obtaining the value of the counter and possibly storing the value for quick access. Initiating device 2710 encrypts data of a transaction layer packet (TLP) used to form the posted request 2702. Encryption may be performed using the incremented value of the PR encryption counter and a PR encryption key (e.g., pr_stream_enc_key). An integrity code value (ICV), such as a MAC, is also computed over the TLP including the encrypted data, a TLP header, a TLP secure stream prefix, and the PR sequence number. In at least one embodiment, the PR sequence number may be stored in the TLP secure stream prefix. In one example, AES-GCM is used for encryption and generating a message authentication code (MAC) in a block cipher stream. In at least some embodiments, the PR sequence number is the incremented value of the PR encryption counter (e.g., incremented pr_enc_counter) and is integrity protected by the ICV. Initiating device 2710 sends the posted request secured by the encrypted data and the ICV to target device 2730.

Target device 2730 obtains the PR sequence number from the TLP of posted request 2702. Target device 2730 searches tracking structure 2732 to determine whether the received PR sequence number has previously been received in another posted request. If the PR sequence number has previously been received with another posted request, then this indicates a replay has occurred and an error is raised (e.g., error message is logged, response is generated to notify initiating device, session is terminated, etc.). If the PR sequence number has not previously been received with another posted request, then it is added to the tracking structure. Target device 2730 decrypts the data in the TLP of the posted request using the PR sequence number (e.g., incremented pr_enc_counter) from the TLP and a PR decryption key (e.g., pr_stream_dec_key) maintained by target device 2730. Target device 2730 verifies the integrity of the TLP by verifying the ICV received with the TLP. In at least one embodiment, the ICV is a MAC, which is verified using the PR sequence number (e.g., incremented pr_enc_counter) in the TLP and the PR decryption key. If the ICV verification fails, then an error is raised (e.g., error message is logged, generate response to send to initiating device, reinitialize keys, etc.) Otherwise, the target device consumes the packet. If no error is raised, the PR sequence number is added to the tracking structure.

FIG. 28 is an interaction diagram 2800 illustrating a secure stream protocol operating in explicit counter mode for a non-posted request 2802 (with or without data) sent from initiating device 2710 to target device 2730. Initiating device 2710 samples the value of its NPR encryption counter (e.g., npr_enc_counter) and increments the sampled value. Initiating device 2710 also samples the value of its PR sent counter (e.g., pr_sent_counter) and then zeroes the value in the PR sent counter. Initiating device 2710 encrypts data of a TLP used to form non-posted request 2802. Encryption may be performed using the incremented value of the NPR encryption counter and an NPR encryption key (e.g., npr_stream_enc_key) maintained by the initiating device. An integrity code value (ICV), such as a MAC, is also computed over the TLP including the encrypted data, a TLP header, a TLP secure stream prefix, and an NPR sequence number. In one example, AES-GCM is used for encryption and generating a message authentication code (MAC) in a block cipher stream. In at least some embodiments, the NPR sequence number is the incremented value of the NPR encryption counter (e.g., incremented npr_enc_counter) and is integrity protected by the ICV. The TLP may also carry the sampled value of the PR sent counter to indicate how many posted requests have been sent by initiating device 2710 since the last non-posted or completion transaction. Initiating device 2710 sends the non-posted request secured by the encrypted data and the ICV to target device 2730.

Target device 2730 obtains the NPR sequence number from the TLP of non-posted request 2802. Target device 2730 searches tracking structure 2732 to determine whether the received NPR sequence number has previously been received in another non-posted request. If the NPR sequence number has previously been received with another non-posted request, then this indicates a replay has occurred and an error is raised (e.g., error message is logged, response is generated to notify initiating device, session is terminated, etc.). If the NPR sequence number has not previously been received with another non-posted request, then it is added to the tracking structure. Target device 2730 decrypts the data in the TLP of the non-posted request using the NPR sequence number (e.g., incremented npr_enc_counter) from the TLP and an NPR decryption key (e.g., npr_stream_dec_key) maintained by the target device. Target device 2730 verifies the integrity of the TLP by verifying the ICV received with the TLP. In at least one embodiment, the ICV is a MAC, which is verified using the NPR sequence number (e.g., incremented npr_enc_counter) in the TLP and the NPR decryption key. If the ICV verification fails, then an error is raised (e.g., error message is logged, generate response to send to initiating device, reinitialize keys, etc.) In at least some embodiments, the PR sent counter may also be evaluated, as previously described herein with reference to FIG. 14, for example. If no errors are raised, the PR sequence number is added to the tracking structure, and the target device consumes the packet.

FIG. 29 is an interaction diagram 2900 illustrating a secure stream protocol operating in explicit counter mode for a completion request 2902 sent from target device 2730 to initiating device 2710. Target device 2730 samples its CPL encryption counter (e.g., cpl_enc_counter) and increments the sampled value. Target device 2730 also samples the value in its own PR sent counter (e.g., pr_sent_counter at target device 2730) and then zeroes the value in the PR sent counter. Target device 2730 encrypts data of a TLP used to form completion request 2902. Encryption may be performed using the incremented value of the CPL encryption counter and a CPL encryption key (e.g., cpl_stream_enc_key) maintained by the target device.

An integrity code value (ICV), such as a MAC, is also computed over the TLP including the encrypted data, a TLP header, a TLP secure stream prefix, and a CPL sequence number. In one example, AES-GCM is used for encryption and generating a message authentication code (MAC) in a block cipher stream. In at least some embodiments, the CPL sequence number is the incremented value of the CPL encryption counter (e.g., incremented npr_enc_counter) and is integrity protected by the ICV. The TLP may also carry the sampled value of the PR sent counter to indicate how many posted requests have been sent by target device 2730 since the last non-posted or completion transaction. Initiating device 2710 sends the completion request secured by the encrypted data and the ICV to initiating device 2710.

Initiating device 2710 obtains the CPL sequence number from the TLP of the completion transaction. Initiating device 2710 searches a tracking structure 2712 to determine whether the received CPL sequence number has previously been received in another completion transaction. If the CPL sequence number has previously been received with another completion transaction, then this indicates a replay has occurred and an error is raised (e.g., error message is logged, response is generated to notify initiating device, session is terminated, etc.). If the CPL sequence number has not previously been received with another completion transaction, then it is added to the tracking structure 2712. Initiating device 2710 decrypts the data in the TLP of the completion transaction using the CPL sequence number (e.g., incremented cpl_enc_counter) from the TLP and a CPL decryption key (e.g., cpl_stream_dec_key) maintained by the initiating device. Initiating device 2710 verifies the integrity of the TLP by verifying the ICV received with the TLP. In at least one embodiment, the ICV is a MAC, which is verified using the CPL sequence number (e.g., incremented npr_enc_counter) in the TLP and the CPL decryption key. If the ICV verification fails, then an error is raised (e.g., error message is logged, generate response to send to initiating device, reinitialize keys, etc.) In at least some embodiments, the PR sent counter may also be evaluated, as previously described herein with reference to FIG. 15, for example. If no errors are raised, the CPL sequence number is added to the tracking structure, and the initiating device consumes the packet.

One example variation of the explicit counter mode is referred to herein as 'restricted explicit counter mode' or 'RECM'. The restricted explicit counter mode reduces the overhead of carrying counters. First, posted transactions are required to be in order. Therefore, posted transactions do not carry counters, which eliminates the additional counter bandwidth overhead. Second, non-posted requests can be reordered freely and can be checked against the tracking structure to ensure they are not replayed. Third, completion requests can be encrypted using a counter carried in the corresponding read TLP (e.g., of a non-posted request), but the counter is concatenated with a completion request encryption counter to do the encryption. Accordingly, completion encryption counter can be smaller (e.g. 32 bit) than the encryption counters used in the explicit counter mode. The completion request carries the completion encryption counter. When the completion request is received at the initiating device of the read, the initiating device uses the read counter (e.g., NPR encryption counter) that was used to generate the read request and concatenates it with the completion encryption counter received in the completion request to do the decryption of the completion request packet. This enforces that the completion requests and read requests are bound together since they are both encrypted based, in part, on the common read counter. This scheme thus allows the completion requests to be reordered without needing to be checked against any tracking structure. Because completion requests carry a shorter counter, they have a lower bandwidth overhead.

It may be desirable in some cases to introduce additional variations other than restricted ordering mode and explicit counter mode. For example, other variations may be desirable to gain more ordering flexibility than allowed in a restricted ordering mode, but with less implementation cost/complexity and/or bandwidth overhead than incurred in an explicit counter mode. In some of these variations, the TLP secure stream prefix could be modified or not included.

In some cases, it may be possible to infer that security is being used. For example, an inference could be based on system configuration, address ranges, etc. In this example, an explicit indication in the TLP (e.g., sec-stream prefix indicator 1202) may be omitted.

In another possible embodiment, reordering between posted requests and completion requests is disallowed, the total number of counters can be reduced. For example, the PR and CPL mechanisms (e.g., counters and keys) may be combined, where the combination of posted requests and completion requests is treated as a separate stream, as previously described herein.

Because ID based ordering (IDO) is rarely used, in at least some embodiments it can be disallowed or ignored without a significant impact to established use models. Even when IDO is used, for secure use models the end-to-end connection ensures that the requester ID remains constant, and so IDO will not affect the end-to-end ordering for traffic over the secure connection.

In a further embodiment, if relaxed ordering can be eliminated, then the explicit counter for posted requests (e.g., pr_sent_counter and pr_received_counter) can be omitted. Furthermore, if completion requests and posted requests are merged as previously discussed herein, the bandwidth overhead for those TLPs can be reduced.

Figure 30:
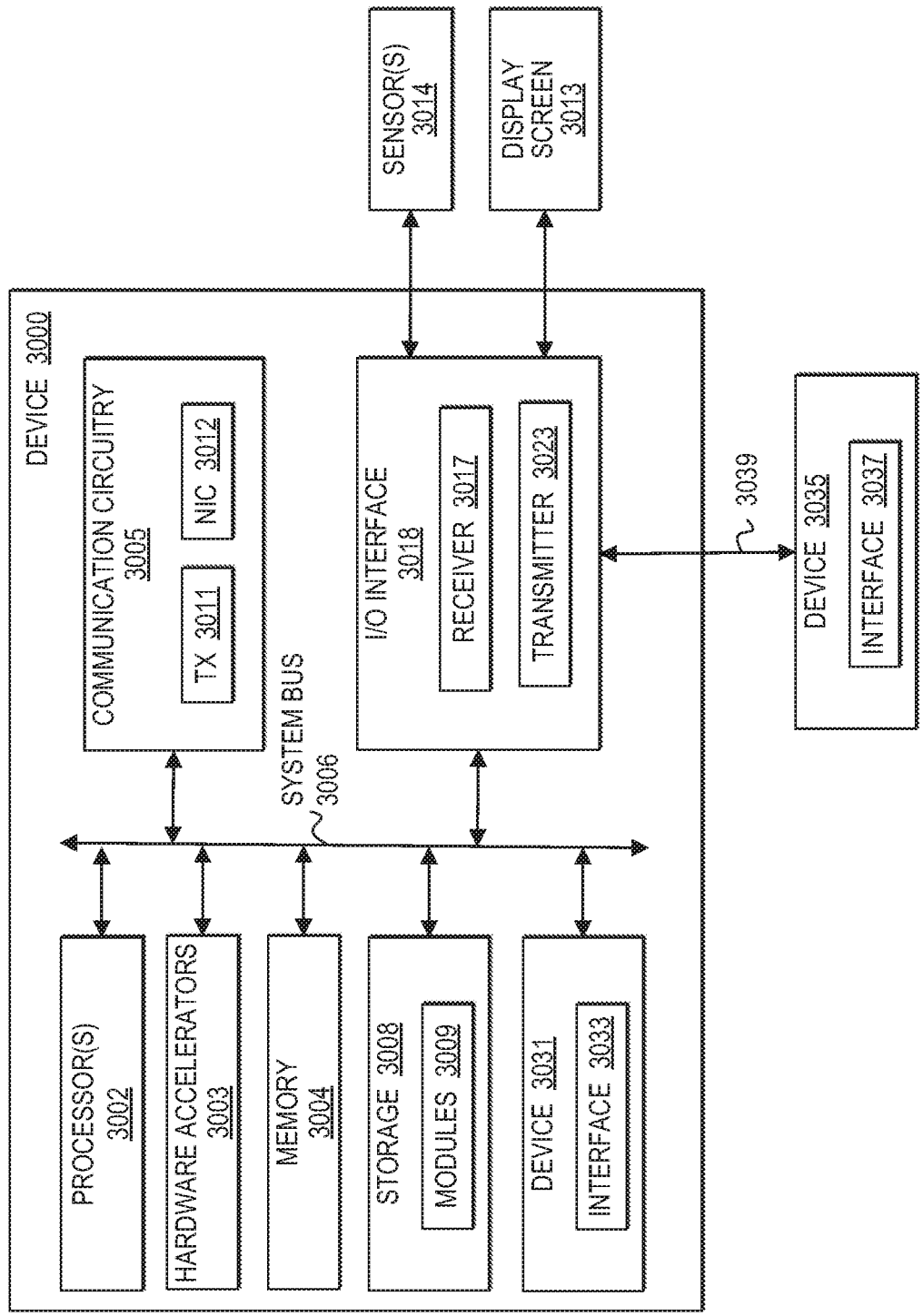
FIG. 30 illustrates an example device suitable for use to practice various aspects of the present disclosure, in accordance with various embodiments.

FIG. 30 illustrates an example device suitable for use to practice various programmatic aspects of the present disclosure, in accordance with various embodiments. The device 3000 may be used to implement programmatic aspects of the disclosed methodology. As shown, the device 3000 may include one or more processors 3002, each having one or more processor cores, or and optionally, a hardware accelerator 3003 (which may be an ASIC or a FPGA). In alternate embodiments, the hardware accelerator 3003 may be part of processor 3002, or integrated together on a SOC. Additionally, the device 3000 may include a memory 3004, which may be any one of a number of known persistent storage media, and a data storage circuitry 3008 including modules 3009. In addition, the device 3000 may include an I/O interface 3018, coupled to one or more sensors 3014, and a display screen 3013. The I/O interface 3018 may include a transmitter 3023 and a receiver 3017. Furthermore, the device 3000 may include communication circuitry 3005 including a transmitter (Tx) 3011, and network interface controller (NIC) 3012. The elements may be coupled to each other via system bus 3006, which may represent one or more buses, e.g., one or more PCIe buses. For various PCIe embodiments, communication circuitry 3005 and I/O interface 3018 may respectively include transmitter 3011 and NIC 3012, and transmitter 3023 and receiver 3017. In particular, respective transmitter 3011, NIC 3012, transmitter 3023, and receiver 3017 may include the flip-based packetization technology described herein with references to the FIGURES. In various embodiments, one or more of the other components, such as processor 3002, memory 3004, storage 3008 and so forth, may also likewise includes high speed serial link interface circuitry for coupling and operating with a high speed serial bus 3006, e.g., high speed PCIe bus, having the secure stream technology described herein with references to the FIGURES. In the case of multiple buses, they may be bridged by one or more bus bridges (not shown). A device 3031 may be coupled to the system bus 3006, and a device 3035 may be coupled to an I/O bus 3039. The device 3031 may include an interface 3033, and the device 3035 may include an interface 3037.

In embodiments, the processor(s) 3002 (also referred to as "processor circuitry 3002") may be one or more processing elements configured to perform basic arithmetical, logical, and input/output operations by carrying out instructions. Processor circuitry 3002 may be implemented as a standalone system/device/package or as part of an existing system/device/package. The processor circuitry 3002 may be one or more microprocessors, one or more single-core processors, one or more multi-core processors, one or more multithreaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 3002 may be a part of a SoC in which the processor circuitry 3002 and other components discussed herein are formed into a single IC or a single package. As examples, the processor circuitry 3002 may include one or more Intel Pentium®, Core®, Xeon®, Atom®, or Core M° processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the processor circuitry 3002 may include a sensor hub, which may act as a coprocessor by processing data obtained from the one or more sensors 3014. The sensor hub may include circuitry configured to integrate data obtained from each of the one or more sensors 3014 by performing arithmetical, logical, and input/output operations. In embodiments, the sensor hub may capable of timestamping obtained sensor data, providing sensor data to the processor circuitry 3002 in response to a query for such data, buffering sensor data, continuously streaming sensor data to the processor circuitry 3002 including independent streams for each sensor of the one or more sensors 3014, reporting sensor data based upon predefined thresholds or conditions/triggers, and/or other like data processing functions.

In embodiments, the memory 3004 (also referred to as "memory circuitry 3004" or the like) may be circuitry configured to store data or logic for operating the computer device 3000. The memory circuitry 3004 may include a number of memory devices that may be used to provide for a given amount of system memory. As examples, the memory circuitry 3004 can be any suitable type, number and/or combination of volatile memory devices (e.g., random access memory (RAM), dynamic RAM (DRAM), static RAM (SRAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package, dual inline memory modules (DIMMs) such as microDIMMs or Mini-DIMMs, and/or any other like memory devices. To provide for persistent storage of information such as data, applications, operating systems and so forth, the memory circuitry 3004 may include one or more mass-storage devices, such as a solid state disk drive (SSDD); flash memory cards, such as SD cards, microSD cards, xD picture cards, and the like, and USB flash drives; on-die memory or registers associated with the processor circuitry 3002 (for example, in low power implementations); a micro hard disk drive (HDD); three dimensional cross-point (3D XPOINT) memories from Intel® and Micron®, etc.

Where FPDs are used, the processor circuitry 3002 and memory circuitry 3004 (and/or data storage circuitry 3008) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 3002 to implement various logic functions. The memory cells may include any combination of various levels of memory/storage including, but not limited to, EPROM, EEPROM, flash memory, SRAM, anti-fuses, etc.

In embodiments, the data storage circuitry 3008 (also referred to as "storage circuitry 3008" or the like), with shared or respective controllers, may provide for persistent storage of information such as modules 3009, operating systems, etc. The data storage circuitry 3008 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 3002; hard disk drives (HDDs); micro HDDs; resistance change memories; phase change memories; holographic memories; or chemical memories; among others. As shown, the data storage circuitry 3008 is included in the computer device 3000; however, in other embodiments, the data storage circuitry 3008 may be implemented as one or more devices separated from the other elements of computer device 3000.

In some embodiments, the data storage circuitry 3008 may include an operating system (OS) (not shown), which may be a general purpose operating system or an operating system specifically written for and tailored to the computer device 3000. The OS may include one or more drivers, libraries, and/or application programming interfaces (APIs), which provide program code and/or software components for modules 3009 and/or control system configurations to control and/or obtain/process data from the one or more sensors 3014.

The modules 3009 may be software modules/components used to perform various functions of the computer device 3000 and/or to carry out functions of the embodiments discussed herein. In embodiments where the processor circuitry 3002 and memory circuitry 3004 include hardware accelerators (e.g., FPGA cells, the hardware accelerator 3003) as well as processor cores, the hardware accelerators (e.g., the FPGA cells) may be pre-configured (e.g., with appropriate bit streams, logic blocks/fabric, etc.) with the logic to perform at least some functions of the embodiments herein (in lieu of employment of programming instructions to be executed by the processor core(s)). For example, the modules 3009 may comprise logic for the corresponding entities discussed with regard to the display screen 3013, an on-screen input device, the on-screen input interface controller 3011, an off-screen input device, the transmitter 3023, and the receiver 3017.

The components of computer device 3000 may communicate with one another over the system bus 3006. The system bus 3006 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the system bus 3006 may be a controller area network (CAN) bus system, a Time-Trigger Protocol (UP) system, or a FlexRay system, which may allow various devices (e.g., the one or more sensors 3014, etc.) to communicate with one another using messages or frames.

The communications circuitry 3005 may include circuitry for communicating with a wireless network or wired network. For example, the communication circuitry 3005 may include transceiver (Tx) 3011 and network interface controller (NIC) 3012. Communications circuitry 3005 may include one or more processors (e.g., baseband processors, modems, etc.) that are dedicated to a particular wireless communication protocol.

NIC 3012 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 3012 may be included to allow connection to a second network (not shown) or other devices, for example, a first NIC 3012 providing communications to the network 150 over Ethernet, and a second NIC 3012 providing communications to other devices over another type of network, such as a personal area network (PAN) including a personal computer (PC) device. In some embodiments, the various components of the device 3000, such as the one or more sensors 3014, etc. may be connected to the processor(s) 3002 via the NIC 3012 as discussed above rather than via the I/O circuitry 3018 as discussed infra.

The Tx 3011 may include one or more radios to wirelessly communicate with a network and/or other devices. The Tx 3011 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 3000. In some embodiments, the various components of the device 3000, such as the one or more sensors 3014, etc. may be connected to the device 3000 via the Tx 3011 as discussed above rather than via the I/O circuitry 3018 as discussed infra. In one example, the one or more sensors 3014 may be coupled with device 3000 via a short range communication protocol.

The Tx 3011 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 3018 may include circuitry, such as an external expansion bus (e.g., Universal Serial Bus (USB), FireWire, Thunderbolt, PCI/PCIe/PCIx, etc.), used to connect computer device 3000 with external components/devices, such as one or more sensors 3014, etc. I/O interface circuitry 3018 may include any suitable interface controllers and connectors to interconnect one or more of the processor circuitry 3002, memory circuitry 3004, data storage circuitry 3008, communication circuitry 3005, and the other components of computer device 3000. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 3006), ports, slots, jumpers, interconnect modules, receptacles, modular connectors, etc. The I/O circuitry 3018 may couple the device 3000 with the one or more sensors 3014, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 3014 may be any device configured to detect events or environmental changes, convert the detected events into electrical signals and/or digital data, and transmit/send the signals/data to the computer device 3000. Some of the one or more sensors 3014 may be sensors used for providing computer-generated sensory inputs. Some of the one or more sensors 3014 may be sensors used for motion and/or object detection. Examples of such one or more sensors 3014 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 3014 may include a lens-less image capture mechanism comprising an array of aperture elements, wherein light passing through the array of aperture elements define the pixels of an image. In embodiments, the motion detection one or more sensors 3014 may be coupled with or associated with light generating devices, for example, one or more infrared projectors to project a grid of infrared light onto a scene, where an infrared camera may record reflected infrared light to compute depth information.

Some of the one or more sensors 3014 may be used for position and/or orientation detection, ambient/environmental condition detection, and the like. Examples of such one or more sensors 3014 may include, inter alia, microelectromechanical systems (MEMS) with piezoelectric, piezoresistive and/or capacitive components, which may be used to determine environmental conditions or location information related to the computer device 3000. In embodiments, the MEMS may include 3-axis accelerometers, 3-axis gyroscopes, and/or magnetometers. In some embodiments, the one or more sensors 3014 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 3002, the hardware accelerator 3003, the memory 3004, the data storage circuitry 3008 including the modules 3009, the input/output interface 3018, the one or more sensors 3014, the communication circuitry 3005 including the Tx 3011, the NIC 3012, the system bus 3006, the I/O bus 3039, the device 3031, the device 3035, may perform its conventional functions known in the art. In addition, they may be employed to store and host execution of programming instructions implementing various operating system functions and/or applications, in particular, operations associated with secure stream technology described above with references to the FIGURES. The various elements may be implemented by assembler instructions supported by processor(s) 3002 or high-level languages, such as, for example, C, that can be compiled into such instructions. Operations associated with the device 3000 not implemented in software may be implemented in hardware, e.g., via hardware accelerator 3003, and/or firmware.

The number, capability and/or capacity of these elements 3002-3039 may vary, depending on the number of other devices the device 3000 is configured to support. Otherwise, the constitutions of elements 3002-3039 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 31:
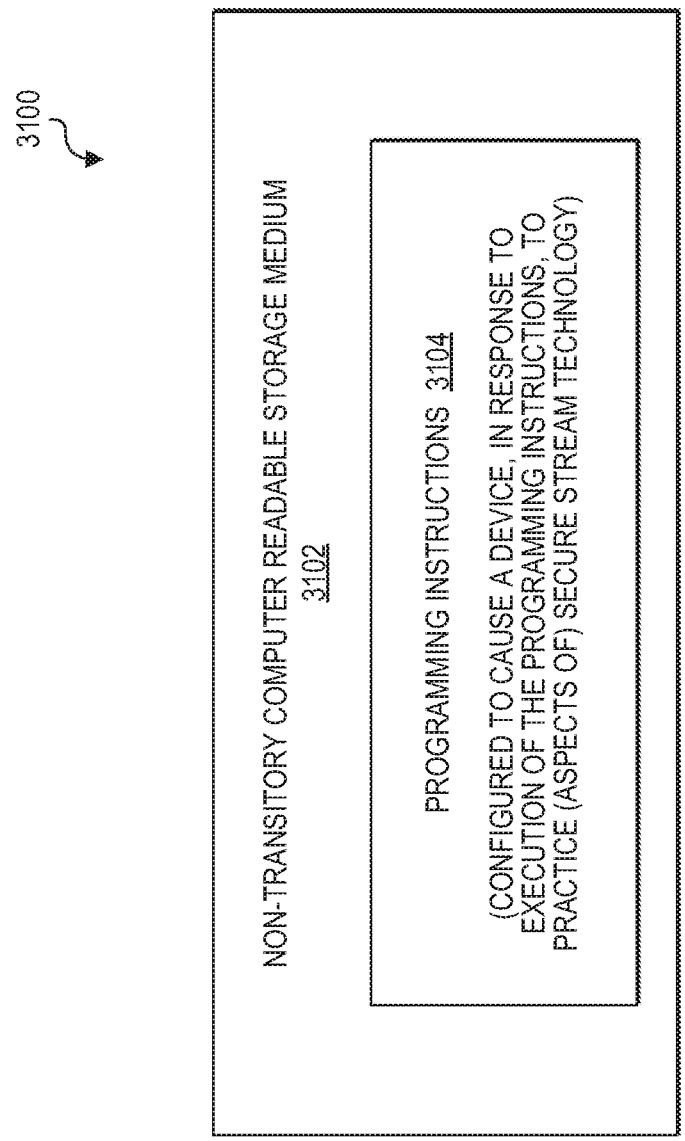
FIG. 31 illustrates a storage medium having instructions for practicing methods described with references to FIGS. 1-29, in accordance with various embodiments.

Furthermore, the present disclosure may take the form of a computer program product embodied in any tangible or non-transitory medium of expression having computer-usable program code embodied in the medium. FIG. 31 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 3102 may include a number of programming instructions 3104 (also referred to herein as 'instructions'). Programming instructions 3104 may be configured to enable a device, e.g., device 3000, in response to execution of the programming instructions, to perform, e.g., various programming operations associated with operating system functions and/or applications, in particular, operations associated with secure stream technology described above with references to the FIGURES.

In alternate embodiments, programming instructions 3104 may be disposed on multiple computer-readable non-transitory storage media 3102 instead. In alternate embodiments, programming instructions 3104 may be disposed on computer-readable transitory storage media 3102, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Figure 32:
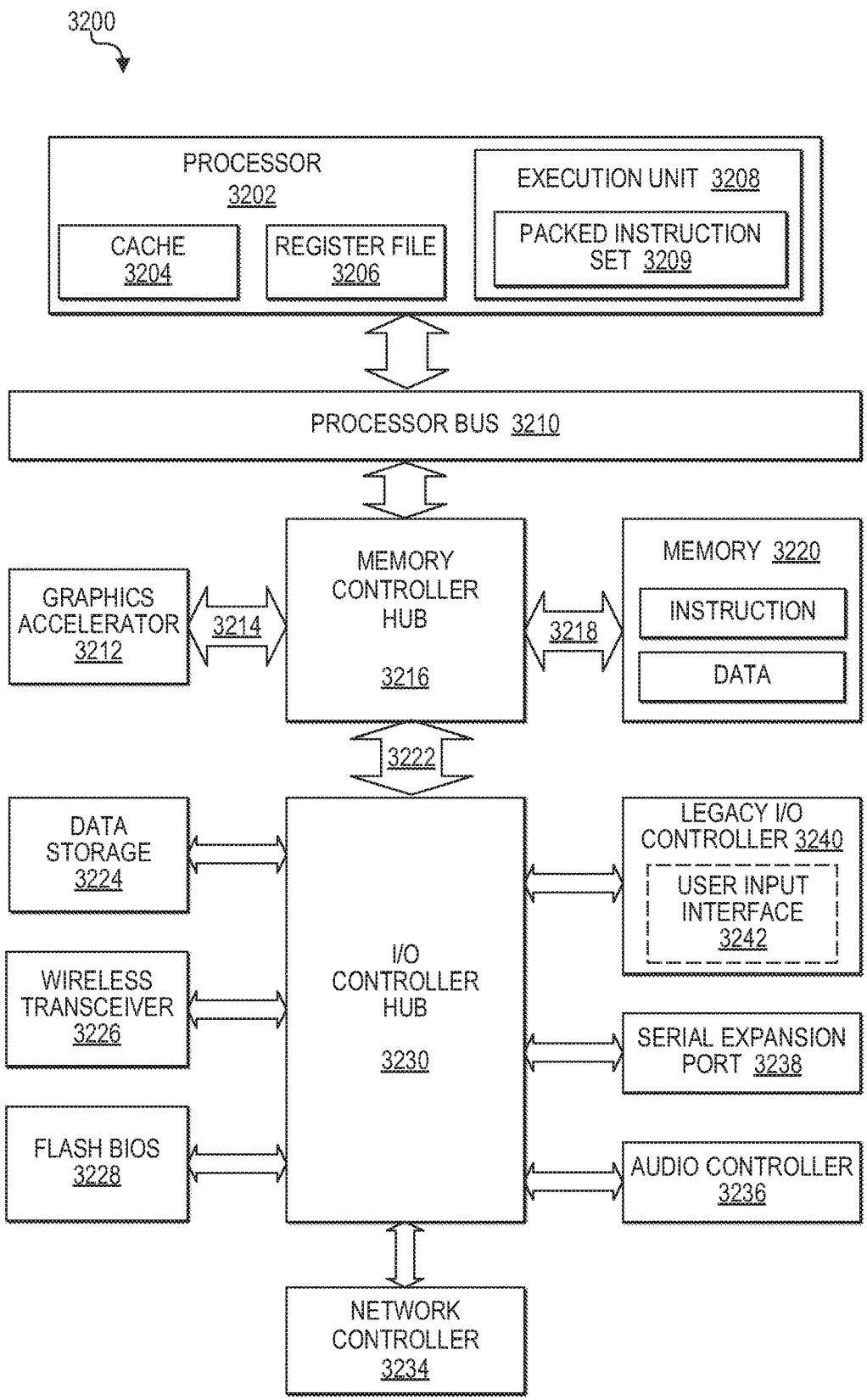
FIG. 32 is a block diagram that illustrates another embodiment of a computing system including a processor according to one or more embodiments.

Turning to FIG. 32, a block diagram of an exemplary computer system formed with a processor that includes execution units to execute an instruction, where one or more of the interconnects implement one or more features in accordance with at least one embodiment of the present disclosure is illustrated. System 3200 includes a component, such as a processor 3202 to employ execution units including logic to perform algorithms for process data, in accordance with the present disclosure, such as in the embodiment described herein. System 3200 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 3200 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip (SoC), network computers (NetPC), set-top boxes, network hubs, wide area network (WAN) switches, or any other system that can perform one or more instructions in accordance with at least one embodiment.

In this illustrated embodiment, processor 3202 includes one or more execution units 3208 to implement an algorithm that is to perform at least one instruction. One embodiment may be described in the context of a single processor desktop or server system, but alternative embodiments may be included in a multiprocessor system. System 3200 is an example of a 'hub' system architecture. The computer system 3200 includes a processor 3202 to process data signals. The processor 3202, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 3202 is coupled to a processor bus 3210 that transmits data signals between the processor 3202 and other components in the system 3200. The elements of system 3200 (e.g. a graphics accelerator 3212, a memory controller hub 3216, memory 3220, I/O a controller hub 3230, a wireless transceiver 3226, a Flash BIOS 3228, a network controller 3234, an audio controller 3236, a serial expansion port 3238, a legacy I/O controller 3240 with a user input interface 3242, etc.) perform their conventional functions that are well known to those familiar with the art.

In one embodiment, the processor 3202 includes a Level 1 (L1) internal cache memory 3204. Depending on the architecture, the processor 3202 may have a single internal cache or multiple levels of internal caches. Other embodiments include a combination of both internal and external caches depending on the particular implementation and needs. Register file 3206 is to store different types of data in various registers including integer registers, floating point registers, vector registers, banked registers, shadow registers, checkpoint registers, status registers, and instruction pointer register.

Execution unit 3208, including logic to perform integer and floating point operations, also resides in the processor 3202. The processor 3202, in one embodiment, includes a microcode (μcode) ROM to store microcode, which when executed, is to perform algorithms for certain macroinstructions or handle complex scenarios. Here, microcode is potentially updateable to handle logic bugs/fixes for processor 3202. For one embodiment, execution unit 3208 includes logic to handle a packed instruction set 3209. By including the packed instruction set 3209 in the instruction set of a general-purpose processor 3202, along with associated circuitry to execute the instructions, the operations used by many multimedia applications may be performed using packed data in a general-purpose processor 3202. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 3208 may also be used in micro controllers, embedded processors, graphics devices, DSPs, and other types of logic circuits. System 3200 includes a memory 3220. Memory 3220 includes a dynamic random access memory (DRAM) device, a static random access memory (SRAM) device, flash memory device, or other memory device. Memory 3220 stores instructions and/or data represented by data signals that are to be executed by the processor 3202.

Note that any of the aforementioned features or aspects of the embodiments described herein may be utilized on one or more interconnects illustrated in FIG. 32. For example, an on-die interconnect (ODI), which is not shown, for coupling internal units of processor 3202 implements one or more aspects of the embodiments described above. Or the embodiments are associated with a processor bus 3210 (e.g. Intel Quick Path Interconnect (QPI) or other known high performance computing interconnect), a high bandwidth memory path 3218 to memory 3220, a point-to-point link to graphics accelerator 3212 (e.g. a Peripheral Component Interconnect express (PCIe) compliant fabric), a controller hub interconnect 3222, an I/O or other interconnect (e.g. USB, PCI, PCIe) for coupling the other illustrated components. Some examples of such components include the audio controller 3236, firmware hub (flash BIOS) 3228, wireless transceiver 3226, data storage 3224, legacy I/O controller 3210 containing user input and keyboard interfaces 3242, serial expansion port 3238 such as Universal Serial Bus (USB), and network controller 3234. The data storage device 3224 can comprise a hard disk drive, a floppy disk drive, a CD-ROM device, a flash memory device, or other mass storage device.

Figure 33:
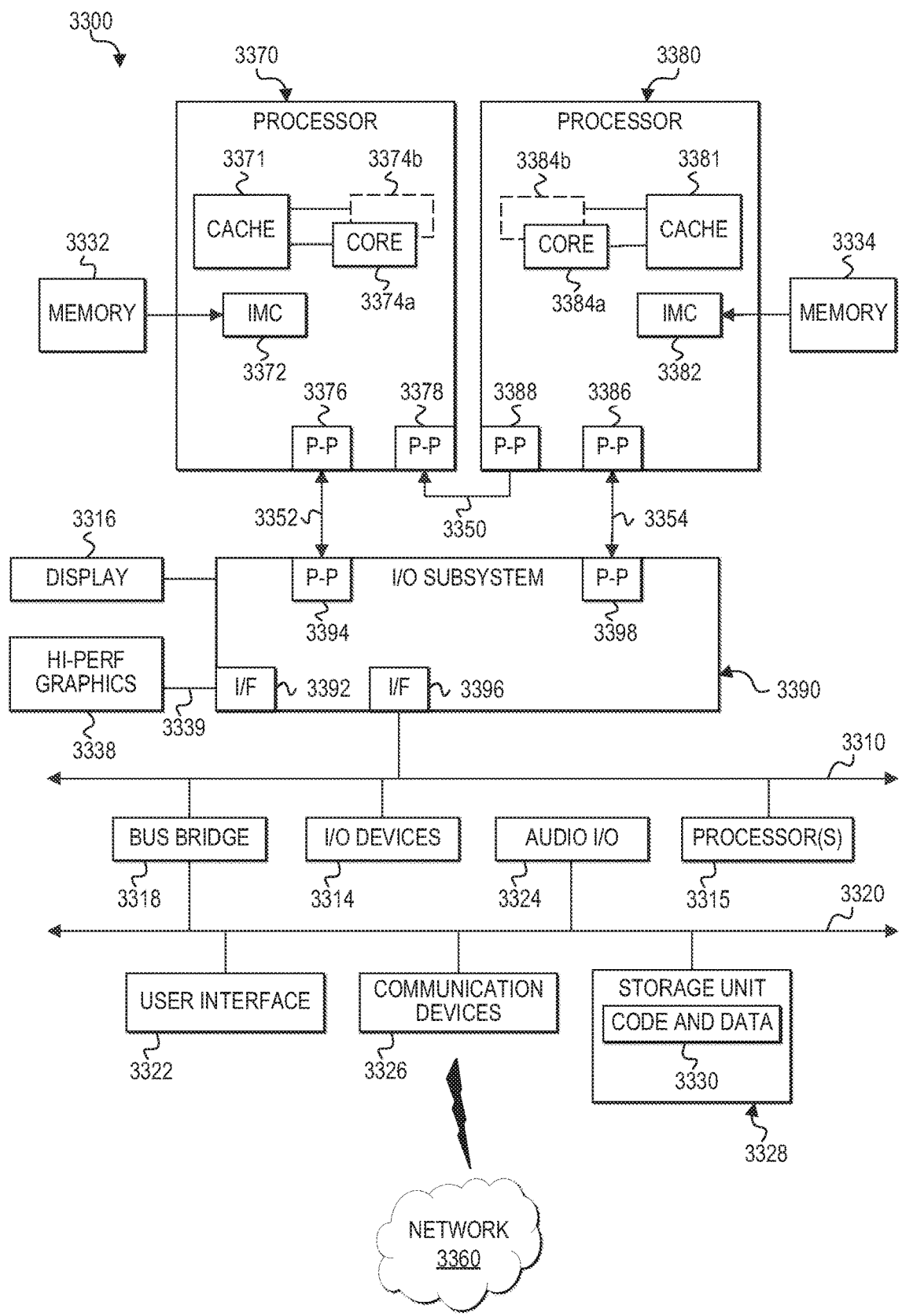
FIG. 33 is a block diagram of an example computer architecture according to at least one embodiment of the present disclosure according to one or more embodiments.

FIG. 33 illustrates another computing system 3300 that is arranged in a point-to-point (PtP) configuration according to an embodiment, where one or more interconnects implement one or more features in accordance with at least one embodiment of the present disclosure. In particular, FIG. 33 shows a system where processors, memory, and input/output devices are interconnected by a number of point-to-point interfaces. Generally, one or more of the computing systems or computing devices described herein (e.g., initiating devices 710, 1110, 1710, 2710, target device 730, 1130, 1730, 2730, etc.) may be configured in the same or similar manner as computing system 3300.

Processors 3370 and 3380 may be implemented as single core processors 3374a and 3384a or multi-core processors 3374a-3374b and 3384a-3384b. Processors 3370 and 3380 may each include a cache 3371 and 3381 used by their respective core or cores. A shared cache (not shown) may be included in either processors or outside of both processors yet connected with the processors via P-P interconnect, such that either or both processors' local cache information may be stored in the shared cache if a processor is placed into a low power mode.

Processors 3370 and 3380 may also each include integrated memory controller logic (MC) 3372 and 3382 to communicate with memory elements 3332 and 3334, which may be portions of main memory locally attached to the respective processors. In alternative embodiments, memory controller logic 3372 and 3382 may be discrete logic separate from processors 3370 and 3380. Memory elements 3332 and/or 3334 may store various data to be used by processors 3370 and 3380 in achieving operations and functionality outlined herein.

Processors 3370 and 3380 may be any type of processor, such as those discussed in connection with other figures. Processors 3370 and 3380 may exchange data via a point-to-point (PtP) interface 3350 using point-to-point interface circuits 3378 and 3388, respectively. Processors 3370 and 3380 may each exchange data with an input/output (I/O) subsystem 3390 via individual point-to-point interfaces 3352 and 3354 using point-to-point interface circuits 3376, 3386, 3394, and 3398. I/O subsystem 3390, which may be a chipset in at least one embodiment, may exchange data with a high-performance graphics circuit 3338 via a high-performance graphics interface 3339, using an interface circuit 3392, which could be a PtP interface circuit. In one embodiment, the high-performance graphics circuit 3338 is a special-purpose processor, such as, for example, a high-throughput MIC processor, a network or communication processor, compression engine, graphics processor, GPGPU, embedded processor, or the like. I/O subsystem 3390 may also communicate with a display 3316 for displaying data that is viewable by a human user. In alternative embodiments, any or all of the PtP links illustrated in FIG. 33 could be implemented as a multi-drop bus rather than a PtP link.

I/O subsystem 3390 may be in communication with a bus 3310 via an interface circuit 3396. Bus 3310 may have one or more devices that communicate over it, such as a bus bridge 3318 and I/O devices 3314. Via a bus 3310, bus bridge 3318 may be in communication with other devices such as a user interface 3322 (such as a keyboard, mouse, touchscreen, or other input devices), communication devices 3326 (such as modems, network interface devices, or other types of communication devices that may communicate through a computer network 3360), audio I/O devices 3324, and/or a data storage device 3328. Data storage device 3328 may store code and data 3330, which may be executed by processors 3370 and/or 3380. In alternative embodiments, any portions of the bus architectures could be implemented with one or more PtP links.

The computer system depicted in FIG. 33 is a schematic illustration of an embodiment of a computing system that may be utilized to implement various embodiments discussed herein. It will be appreciated that various components of the system depicted in FIG. 33 may be combined in a system-on-a-chip (SoC) architecture or in any other suitable configuration capable of achieving the functionality and features of examples and implementations provided herein.

Computer program code for carrying out at least some of the operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, apparatuses, computer-readable media, methods and computer program products according to various embodiments of the present disclosure. In this regard, each block in the flowchart or block diagrams may represent a module, segment, or portion of code and/or hardware, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

One or more embodiments may be implemented as a computer process, a computing system, or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements that are specifically claimed. The description of the present disclosure has been presented for purposes of illustration and description but is not intended to be exhaustive or limited to the disclosure in the form disclosed. Many modifications and variations will be apparent to those of ordinary skill without departing from the scope and spirit of the disclosure. The embodiments are chosen and described in order to best explain the principles of the disclosure and the practical application, and to enable others of ordinary skill in the art to understand the disclosure for embodiments with various modifications as are suited to the particular use contemplated.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

OTHER NOTES AND EXAMPLES

The following examples pertain to embodiments in accordance with this specification. The system, apparatus, method, and machine readable storage medium embodiments can include one or a combination of the following examples:

Example A1 provides an apparatus, a system, one or more computer-readable storage mediums, a method, and/or hardware-, firmware-, and/or software-based logic, where the Example of A1 comprises a first device comprising circuitry, the first device to: using an end-to-end protocol, secure a transaction in a first secure stream based at least in part on a transaction type of the transaction, where the first secure stream is separate from a second secure stream; and send the transaction secured in the first secure stream to a second device over a link established between the first device and the second device, wherein the transaction is to traverse one or more intermediate devices from the first device to the second device.

In Example A2, the subject matter of Example A1 can optionally include the transaction being one of two or more transactions associated with the first secure stream, and where the two or more transactions are to be received by the second device in a same order that the first device is to send the two or more transactions.

In Example A3, the subject matter of any one of Examples A1-A2 can optionally include a second secure stream being based, at least in part, on a second transaction type, where two or more other transactions associated with the second secure stream are to be received by the second device in a same order that the first device is to send the two or more other transactions.

In Example A4, the subject matter of any one of Examples A1-A3 can optionally include the transaction comprising: encrypted data; a header including routing information for the transaction; and secure stream information including an indication of whether the transaction originated from a trusted entity at the first device.

In Example A5, the subject matter of Example A4 can optionally include where the first device is further to compute an integrity code value over at least the secure stream information, the encrypted data, and the header, and add the integrity code value to the transaction, where the integrity code value is to be computed based, at least in part, on a first encryption counter assigned to the first secure stream.

In Example A6, the subject matter of any one of Examples A4-A5, can optionally include where the first device is further to: insert the header and the secure stream information in the transaction in an unencrypted form, and generate the encrypted data based, at least in part, on a first encryption key assigned to the first secure stream.

In Example A7, the subject matter of any one of Examples A4-A6 can optionally include where the first device is to store the secure stream information in a prefix of a transaction layer packet of the transaction, one of one or more headers of the transaction layer packet, a payload of the transaction layer packet, or a security layer added to the transaction layer packet.

In Example A8, the subject matter of any one of Examples A4-A7 can optionally include: a trusted bit indicating whether the transaction originated from the trusted entity at the first device, and a counter bit indicating whether the transaction includes a counter value representing a number of posted transactions sent by the first device to the second device since a last non-posted transaction or a last completion transaction was sent by the first device to the second device.

In Example A9, the subject matter of any one of Examples A1-A8 can optionally include where, based on the transaction type of the transaction being a non-posted transaction type or a completion transaction type, the first device is further to obtain a value of a first counter; and insert the value of the first counter in the transaction, where the value of the first counter represents a number of posted transactions sent by the first device to the second device since a last non-posted transaction or a last completion transaction was sent by the first device to the second device.

In Example A10, the subject matter of any one of Examples A1-A8 can optionally include where, based on the transaction type of the transaction being a posted transaction type, the first device is further to increment a second counter value that represents a number of posted transactions sent by the first device to the second device since a last non-posted transaction or a last completion transaction was sent by the first device to the second device.

Example C1 provides an apparatus, a system, one or more computer-readable storage mediums, a method, and/or hardware-, firmware-, and/or software-based logic, where the Example of C1 comprises instructions that are executable to cause a machine to: receive, at a first device, a transaction from a second device over a link established between the first device and a second device, where the transaction is to traverse one or more intermediate devices from the second device to the first device; and determine that the transaction is secured in a first secure stream according to an end-to-end protocol, where the transaction is secured in the first secure stream based, at least in part, on a transaction type of the transaction.

In Example C2, the subject matter of Example C1 can optionally include the transaction being one of two or more transactions associated with the first secure stream, where the instructions are executable to cause a machine further to receive, at the first device, the two or more transactions from the second device in a same order that the second device is to send the two or more transactions.

In Example C3, the subject matter of any one of Examples C1-C2 can optionally include a second secure stream being based, at least in part, on a second transaction type, where the instructions are executable to cause a machine further to receive, at the first device, two or more other transactions associated with the second secure stream in a same order that the second device is to send the two or more other transactions.

In Example C4, the subject matter of any one of Examples C1-C3 can optionally include the transaction comprising encrypted data; a header including routing information for the transaction; and secure stream information including an indication of whether the transaction originated from a trusted entity at the second device.

In Example C5, the subject matter of Example C4 can optionally include the instructions being executable to cause the machine further to verify integrity of the transaction by: computing an integrity code value over at least the secure stream information, the header, and the encrypted data; and comparing the integrity code value to another integrity code value in the transaction.

In Example C6, the subject matter of any one of Examples C4-C5 can optionally include where the header and the secure stream information are contained in the transaction in an unencrypted form, and where the instructions are executable to cause a machine further to decrypt the encrypted data based, at least in part, on a first decryption key assigned to the first secure stream.

In Example C7, the subject matter of any one of Examples C4-C6 can optionally include the secure stream information being contained in a prefix of a transaction layer packet of the transaction, one of one or more headers of the transaction layer packet, a payload of the transaction layer packet, or a security layer added to the transaction layer packet.

In Example C8, the subject matter of any one of Examples C4-C7 can optionally include: a trusted bit indicating whether the transaction originated from the trusted entity at the second device, and a counter bit indicating whether the transaction includes a counter value representing a number of posted transactions sent by the second device to the first device since a last non-posted transaction or a last completion transaction was sent by the second device to the first device.

In Example C9, the subject matter of any one of Examples C1-C8 can optionally include where, based on the transaction type of the transaction being a non-posted transaction type or a completion transaction type, the instructions are executable to cause the machine further to obtain a value of a first counter from the transaction; decrement a value of a second counter in the first device by the value of the first counter; and based on determining that the value of the second counter is less than zero, terminate a session associated with the transaction, where the value of the first counter represents a number of posted transactions sent by the second device to the first device since a last non-posted transaction or a last completion transaction was sent by the second device to the first device, and the value of the second counter represents a number of posted transactions received by the first device from the second device since a last non-posted transaction or a last completion transaction was received by the first device from the second device.

Example S1 provides an apparatus, a system, one or more computer-readable storage mediums, a method, and/or hardware-, firmware-, and/or software-based logic, where the Example of S1 comprises a first endpoint including a transmitter; and a second endpoint including a receiver to receive a transaction from the first endpoint via a link and one or more intermediate devices, where the first endpoint is to: determine a transaction type of the transaction; and insert, in the transaction, secure stream information including an indication that the transaction is secured in a first secure stream, wherein the first secure stream is based at least in part on the transaction type of the transaction.

In Example S2, the subject matter of Example S1 the transaction being one of two or more transactions associated with the first secure stream, where the first endpoint is further to send the two or more transactions to the second endpoint in a particular order, and where the second endpoint is further to receive the two or more transactions from the first endpoint in the particular order.

In Example S3, the subject matter of any one of Examples S1-S2 can optionally include a second secure stream being based, at least in part, on a second transaction type, where the second endpoint is further to receive two or more other transactions associated with the second secure stream in a same order that the first endpoint is to send the two or more other transactions.

In Example S4, the subject matter of any one of Examples S1-S3 can optionally include the transaction comprising encrypted data, and a header including routing information for the transaction.

In Example S5, the subject matter of Examples S4 can optionally include where the first endpoint is to secure the transaction in the first secure stream by: computing a first integrity code value over at least the secure stream information, the header, and the encrypted data; and adding the first integrity code value to the transaction.

In Example S6, the subject matter of any one of Examples S4-S5 can optionally include where the second endpoint is to verify integrity of the transaction by computing a second integrity code value over at least the secure stream information, the header, and the encrypted data in the transaction; and comparing the second integrity code value to the first integrity code value in the transaction.

In Example S7, the subject matter of any one of Examples S4-S6 can optionally include where the first endpoint is further to: insert the header and the secure stream information in the transaction in an unencrypted form; and generate the encrypted data based, at least in part, on a first encryption key assigned to the first secure stream.

In Example S8, the subject matter of any one of Examples S1-S7 can optionally include where, based on the transaction type of the transaction being a posted transaction type, the first endpoint is further to increment a first counter value that represents a number of posted transactions sent by the first endpoint to the second endpoint since a last non-posted transaction or a last completion transaction was sent by the first endpoint to the second endpoint In Example S9, the subject matter of any one of Examples S1-S7 can optionally include where, based on the transaction type of the transaction being a non-posted transaction type or a completion transaction type, the first endpoint is further to: obtain a value of a first counter; and insert the value of the first counter in the transaction, where the value of the first counter represents a number of posted transactions sent by the first endpoint to the second endpoint since a last non-posted transaction or completion transaction was sent by the first endpoint to the second endpoint.

In Example S10, the subject matter of Example S9 can optionally include where the second endpoint is further to: obtain the value of the first counter from the transaction; decrement a value of a second counter in the second endpoint by the value of the first counter obtained from the transaction; and based on determining the value of the second counter is less than zero, terminate a session associated with the transaction, where the value of the second counter represents a number of posted transactions received by the second endpoint from the first endpoint since a last non-posted transaction or a last completion transaction was received by the second endpoint from the first endpoint.

In Example S11, the subject matter of any one of Examples S1-S10 can optionally include where the first endpoint is to store the secure stream information in a prefix of a transaction layer packet of the transaction, one of one or more headers of the transaction layer packet, a payload of the transaction layer packet, or a security layer added to the transaction layer packet.

In Example S12, the subject matter of any one of Examples S1-S11 can optionally include where a first intermediate device of the one or more intermediate devices is to: receive the transaction; and based on determining that the transaction is secured in the first secure stream, determine whether to reorder the transaction for transmission based on restricted ordering rules, wherein the restricted ordering rules comprise: not allowing a posted transaction to pass another posted transaction; not allowing a non-posted transaction to pass a non-posted transaction; not allowing a non-posted transaction to pass a posted transaction; not allowing a completion transaction to pass a posted transaction; and not allowing a completion transaction to pass a completion transaction.

In Example S13, the subject matter of any one of Examples S1-S12 can optionally include: a trusted bit indicating whether the transaction originated from a first trusted entity at the first endpoint, and a counter bit indicating whether the transaction includes a counter value representing a number of posted transactions sent by the first endpoint to the second endpoint since a last non-posted transaction or a last completion transaction was sent by the first endpoint to the second endpoint.

In Example X1, the subject matter of any one of the preceding Examples can optionally include the first secure stream being based on one of a posted transaction type, a non-posted transaction type, or completion transaction type.

In Example X2, the subject matter of any one of the preceding Examples can optionally include the first secure stream being based on one of a non-posted transaction type or a combination of a posted transaction type and a completion transaction type.

In Example X3, the subject matter of any one of the preceding Examples can optionally include where the transaction is to include an indication of whether the end-to-end protocol is operating in a restricted ordering mode or an explicit counter mode.

In Example X4, the subject matter of any one of the preceding Examples can optionally include where the link is established based on a peripheral component interconnect express (PCIe) protocol and the end-to-end protocol.

An Example Y1 provides an apparatus, the apparatus comprising means for performing the method of any one of the preceding Examples.

In Example Y2, the subject matter of Example Y1 can optionally include that the means for performing the method comprises at least one processor and at least one memory element.

In Example Y3, the subject matter of any one of Examples X1-X3 can optionally include that the apparatus is one of a computing system or a system-on-a-chip.

The invention claimed is:

1. An apparatus, comprising:
a first device comprising circuitry, the first device to:
using an end-to-end protocol, secure a transaction in a first secure stream based at least in part on a first transaction type of a plurality of transaction types, wherein the first transaction type is one of a posted transaction type, a non-posted transaction type, or completion transaction type, wherein the first secure stream is separate from a second secure stream;
prior to the transaction being sent to a second device by the first device, encrypt a data portion of the transaction using an encryption key that is associated with the first transaction type and that is assigned to the first secure stream;
compute an integrity code value over at least the encrypted data portion and a header that includes routing information for the transaction;
add the integrity code value to the transaction; and
send the transaction secured in the first secure stream to the second device over a link established between the first device and the second device, wherein the transaction is to traverse one or more intermediate devices from the first device to the second device.

2. The apparatus of claim 1, wherein the second secure stream is based on one of a posted transaction type, a non-posted transaction type, or a completion transaction type.

3. The apparatus of claim 1, wherein the transaction is one of two or more transactions associated with the first transaction type and secured in the first secure stream based at least in part on the first transaction type, and wherein the two or more transactions are to be received by the second device in a same order that the first device is to send the two or more transactions.

4. The apparatus of claim 3, wherein the second secure stream is based, at least in part, on a second transaction type, wherein two or more other transactions are associated with the second transaction type and are secured in the second secure stream based at least in part on the second transaction type, wherein the two or more other transactions are to be received by the second device in a same order that the first device is to send the two or more other transactions.

5. The apparatus of claim 1, the transaction comprises:
secure stream information including an indication of whether the transaction originated from a trusted entity at the first device, wherein the integrity code value is to be computed over the secure stream information along with the encrypted data portion and the header.

6. The apparatus of claim 5,
wherein the integrity code value is to be computed based, at least in part, on a first encryption counter assigned to the first secure stream.

7. The apparatus of claim 5, wherein the first device is further to:
insert the header and the secure stream information in the transaction in an unencrypted form.

8. The apparatus of claim 5, wherein the first device is to store the secure stream information in a prefix of a transaction layer packet of the transaction, one of one or more headers of the transaction layer packet, a payload of the transaction layer packet, or a security layer added to the transaction layer packet.

9. The apparatus of claim 5, wherein the secure stream information comprises:
a trusted bit indicating whether the transaction originated from the trusted entity at the first device; and
a counter bit indicating whether the transaction includes a counter value representing a number of posted transactions sent by the first device to the second device since a last non-posted transaction or a last completion transaction was sent by the first device to the second device.

10. The apparatus of claim 1, wherein, based on the first transaction type of the transaction being a non-posted transaction type or a completion transaction type, the first device is further to:
obtain a value of a first counter; and
insert the value of the first counter in the transaction, wherein the value of the first counter represents a number of posted transactions sent by the first device to the second device since a last non-posted transaction or a last completion transaction was sent by the first device to the second device.

11. The apparatus of claim 1, wherein, based on the first transaction type of the transaction being a posted transaction type, the first device is further to:
increment a first counter that represents a number of posted transactions sent by the first device to the second device since a last non-posted transaction or a last completion transaction was sent by the first device to the second device.

12. The apparatus of claim 1, wherein the transaction is to include an indication of whether the end-to-end protocol is operating in a restricted ordering mode or an explicit counter mode.

13. The apparatus of claim 1, wherein the link between the first device and the second device is established based on a peripheral component interconnect express (PCIe) protocol and the end-to-end protocol.

14. One or more non-transitory computer-readable media with instructions stored thereon, wherein the instructions are executable to cause a machine to:
receive, at a first device, a transaction from a second device over a link established between the first device and the second device, wherein the transaction is to traverse one or more intermediate devices from the second device to the first device;
determine that the transaction is secured in a first secure stream of a plurality of secure streams according to an end-to-end protocol, wherein the transaction is secured in the first secure stream based, at least in part, on a transaction type of the transaction, wherein the transaction type is one of a posted transaction type, a non-posted transaction type, or a completion transaction type;
use a decryption key to decrypt encrypted data in the transaction, wherein the decryption key is associated with the transaction type of the transaction and is assigned to the first secure stream;
compute a first integrity code value over at least the encrypted data and a header that includes routing information for the transaction; and
verify integrity of the transaction based, at least in part, on the first integrity code value.

15. The one or more non-transitory computer-readable media of claim 14, wherein the transaction comprises:
the encrypted data;
the header including the routing information for the transaction; and
secure stream information including an indication of whether the transaction originated from a trusted entity at the second device.

16. The one or more non-transitory computer-readable media of claim 15, wherein
to verify the integrity of the transaction is to include:
computing an integrity code value over at least the secure stream information, the header, and the encrypted data; and
comparing the first integrity code value to another integrity code value received with the transaction, wherein the first integrity code value is to be computed over the secure stream information along with the encrypted data and the header.

17. The one or more non-transitory computer-readable media of claim 14, wherein, based on the transaction type of the transaction being a non-posted transaction type or a completion transaction type, wherein the instructions are executable to cause the machine further to:
obtain a value of a first counter from the transaction;
decrement a value of a second counter in the first device by the value of the first counter; and
based on determining that the value of the second counter is less than zero, terminate a session associated with the transaction, wherein the value of the first counter represents a number of posted transactions sent by the second device to the first device since a last non-posted transaction or a last completion transaction was sent by the second device to the first device, and the value of the second counter represents a number of posted transactions received by the first device from the second device since a last non-posted transaction or a last completion transaction was received by the first device from the second device.

18. A system, comprising:
a first endpoint including a transmitter; and
a second endpoint including a receiver to receive a transaction from the first endpoint via a link and one or more intermediate devices,
wherein the first endpoint is to:
determine a transaction type of the transaction, wherein the transaction type is one of a posted transaction type, a non-posted transaction type, or a completion transaction type;
insert, in the transaction, secure stream information indicating that the transaction is secured in a first secure stream of a plurality of secure streams, wherein the first secure stream is based at least in part on the transaction type of the transaction; and prior to the transaction being sent to the second endpoint from the first endpoint, encrypt a data portion of the transaction using an encryption key that is associated with the transaction type and that is assigned to the first secure stream, compute a first integrity code value over at least the secure stream information, the encrypted data portion, and a header that includes routing information for the transaction, and add the first integrity code value to the transaction.

19. The system of claim 18, wherein the transaction to be sent to the second endpoint comprises the encrypted data portion, the header, and the secure stream information.

20. The system of claim 19, wherein the second endpoint is to verify integrity of the transaction by:

computing a second integrity code value over at least the secure stream information, the header, and the encrypted data portion in the transaction; and comparing the second integrity code value to the first integrity code value in the transaction.

21. The system of claim 20, wherein the first endpoint is further to:

insert the header and the secure stream information in the transaction in an unencrypted form.

22. The system of claim 19, wherein a first intermediate device of the one or more intermediate devices is to:

receive the transaction; and based on determining that the transaction is secured in the first secure stream, determine whether to reorder the transaction for transmission based on restricted ordering rules, wherein the restricted ordering rules comprise:

not allowing a posted transaction to pass another posted transaction;

not allowing a non-posted transaction to pass a non-posted transaction;

not allowing a non-posted transaction to pass a posted transaction;

not allowing a completion transaction to pass a posted transaction; and not allowing a completion transaction to pass a completion transaction.

* * * * *